(12) United States Patent
Fonte et al.

(10) Patent No.: US 11,370,602 B2
(45) Date of Patent: **\*Jun. 28, 2022**

(54) RAPIDLY COOLING FOOD AND DRINKS

(71) Applicant: ColdSnap, Corp., Billerica, MA (US)

(72) Inventors: Matthew Fonte, Concord, MA (US);
Robert Devaney, Auburndale, MA (US); John Heymans, Hampstead, NH (US); Nicholas Fonte, Sudbury, MA (US); Ian McGinty, Chelmsford, MA (US)

(73) Assignee: ColdSnap, Corp., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,170

(22) Filed: Aug. 24, 2020

(65) Prior Publication Data

US 2021/0130083 A1 May 6, 2021

Related U.S. Application Data

(63) Continuation of application No. 16/591,975, filed on Oct. 3, 2019, now Pat. No. 10,752,432, which is a
(Continued)

(51) Int. Cl.
*B65D 85/804* (2006.01)
*F25D 25/00* (2006.01)
(Continued)

(52) U.S. Cl.
CPC ......... *B65D 85/8055* (2020.05); *A23G 9/224* (2013.01); *A23G 9/28* (2013.01); *A47J 43/07* (2013.01); *B01F 27/90* (2022.01); *B65D 17/28* (2018.01); *B65D 17/30* (2018.01); *B65D 85/60* (2013.01); *B65D 85/72* (2013.01); *B65D 85/78* (2013.01); *B65D 85/8046* (2013.01);
(Continued)

(58) Field of Classification Search
CPC .............. B65D 85/804; B65D 85/8043; B65D 85/8046; A47J 43/07; A47J 43/0705; A47J 43/0711; A47J 43/08; A47J 43/082; A23G 9/00–288; B01F 7/18; F25D 25/005; F25D 31/002; F25D 2400/28; F25D 2400/30
See application file for complete search history.

(56) References Cited

U.S. PATENT DOCUMENTS 1,438,523 A 12/1922 Duren
1,555,701 A 9/1925 Prichard et al.
(Continued)

FOREIGN PATENT DOCUMENTS

CN 203314023 12/2013
EP 0471904 2/1992
(Continued)

OTHER PUBLICATIONS

JP Office Action in Japanese Appln. No. 2019-518176, dated Jan. 6, 2021, 8 pages (with English translation).
(Continued)

*Primary Examiner* — Miguel A Diaz
(74) *Attorney, Agent, or Firm* — Fish & Richardson P.C.

(57) ABSTRACT

Systems and methods have demonstrated the capability of rapidly cooling the contents of pods containing the ingredients for food and drinks.

38 Claims, 51 Drawing Sheets

Related U.S. Application Data continuation of application No. 16/459,322, filed on Jul. 1, 2019, now Pat. No. 10,543,978, which is a continuation-in-part of application No. 16/104,758, filed on Aug. 17, 2018, now Pat. No. 10,334,868.

(60) Provisional application No. 62/831,600, filed on Apr. 9, 2019, provisional application No. 62/831,666, filed on Apr. 9, 2019, provisional application No. 62/831,646, filed on Apr. 9, 2019, provisional application No. 62/831,657, filed on Apr. 9, 2019, provisional application No. 62/801,587, filed on Feb. 5, 2019, provisional application No. 62/758,110, filed on Nov. 9, 2018.

(51) Int. Cl.
| | | |
|---|---|---|
| *F25D 31/00* | (2006.01) | |
| *B65D 17/30* | (2006.01) | |
| *B65D 17/28* | (2006.01) | |
| *A23G 9/22* | (2006.01) | |
| *A23G 9/28* | (2006.01) | |
| *B65D 85/60* | (2006.01) | |
| *B65D 85/72* | (2006.01) | |
| *B65D 85/78* | (2006.01) | |
| *B01F 27/90* | (2022.01) | |
| *A23G 9/12* | (2006.01) | |
| *A47J 43/07* | (2006.01) | |
| *B01F 101/13* | (2022.01) | |

(52) U.S. Cl.
CPC ......... *F25D 25/005* (2013.01); *F25D 31/002* (2013.01); *F25D 31/007* (2013.01); *A23G 9/12* (2013.01); *B01F 2101/13* (2022.01); *B65D 2231/027* (2013.01); *B65D 2585/6817* (2013.01); *F25D 2331/805* (2013.01); *F25D 2400/28* (2013.01)

(56) References Cited

U.S. PATENT DOCUMENTS

| | | |
|---|---|---|
| 1,944,114 A | 1/1934 | Snowlund |
| 2,350,534 A | 6/1944 | Arthur |
| 2,518,758 A | 8/1950 | Cook |
| 2,541,814 A | 2/1951 | Gaddini |
| 2,577,916 A | 12/1951 | Rollman |
| 3,061,280 A | 10/1962 | Kraft et al. |
| 3,393,900 A | 7/1968 | Wagner et al. |
| 3,635,147 A | 1/1972 | Lee |
| 3,896,959 A | 7/1975 | Roy |
| 3,914,673 A | 10/1975 | Wallin |
| 3,951,289 A | 4/1976 | Landen |
| 4,110,476 A | 8/1978 | Rhodes |
| 4,162,855 A | 7/1979 | Bender |
| 4,408,690 A | 10/1983 | Ferrero |
| 4,538,427 A | 9/1985 | Cavalli |
| 4,563,880 A | 1/1986 | Cipelletti |
| 4,568,192 A | 2/1986 | Kudermann |
| 4,573,329 A | 3/1986 | Cavalli |
| 4,632,566 A | 12/1986 | Masel et al. |
| 4,635,560 A | 1/1987 | Ballantyne |
| 4,664,529 A | 5/1987 | Cavalli |
| 4,784,886 A | 11/1988 | Wissgott |
| 4,796,440 A | 1/1989 | Shiotani et al. |
| 4,827,732 A | 5/1989 | Suyama et al. |
| 4,885,917 A * | 12/1989 | Spector .................. A23G 9/045 62/343 |
| 4,913,645 A | 4/1990 | Daouse et al. |
| 4,993,238 A | 2/1991 | Inagaki |
| 5,264,237 A | 11/1993 | Traitler et al. |
| 5,331,820 A | 7/1994 | Faries et al. |
| 5,343,710 A | 9/1994 | Cathenaut et al. |
| 5,363,746 A | 11/1994 | Gordon |
| 5,435,143 A | 7/1995 | Heinrich |
| 5,447,036 A | 9/1995 | Heinrich |
| 5,533,800 A | 7/1996 | Stiegelmann et al. |
| 5,549,042 A | 8/1996 | Bukoschek et al. |
| 5,556,659 A | 9/1996 | De Pedro et al. |
| 5,568,729 A | 10/1996 | Heinrich et al. |
| 5,571,282 A | 11/1996 | Earle |
| 5,603,965 A | 2/1997 | Daouse |
| 5,692,633 A | 12/1997 | Gordon |
| 5,823,675 A | 10/1998 | Myerly |
| 5,834,739 A | 11/1998 | Lockwood et al. |
| 5,843,512 A | 12/1998 | Daouse et al. |
| 5,879,731 A | 3/1999 | Beckett et al. |
| 5,888,562 A | 3/1999 | Hansen et al. |
| 5,888,567 A | 3/1999 | Daouse |
| 5,932,275 A | 8/1999 | Nalur |
| 5,967,381 A | 10/1999 | Van Zeeland et al. |
| 6,004,606 A | 12/1999 | French et al. |
| 6,012,383 A | 1/2000 | Lande |
| 6,045,836 A | 4/2000 | Saunier et al. |
| 6,060,094 A | 5/2000 | Nalur |
| 6,071,546 A | 6/2000 | Nalur |
| 6,089,747 A | 7/2000 | Huang |
| 6,174,157 B1 | 1/2001 | Daouse et al. |
| 6,194,014 B1 | 2/2001 | Busse et al. |
| 6,210,739 B1 | 4/2001 | Nalur |
| 6,220,047 B1 | 4/2001 | Vogel et al. |
| 6,221,409 B1 | 4/2001 | Bueno Ceresuela |
| 6,251,455 B1 | 6/2001 | Thomas |
| 6,251,456 B1 | 6/2001 | Maul et al. |
| 6,267,073 B1 | 7/2001 | Busse et al. |
| 6,272,974 B1 | 8/2001 | Pascotti et al. |
| 6,280,783 B1 | 8/2001 | Blaschke et al. |
| 6,284,294 B1 | 9/2001 | French et al. |
| 6,299,923 B1 | 10/2001 | Meziane |
| 6,338,863 B1 | 1/2002 | Amiel et al. |
| 6,340,488 B1 | 1/2002 | French et al. |
| 6,379,724 B1 | 4/2002 | Best et al. |
| 6,399,134 B1 | 6/2002 | Best et al. |
| 6,413,563 B1 | 7/2002 | Blaschke et al. |
| 6,431,395 B1 | 8/2002 | San Martin et al. |
| 6,479,085 B1 | 11/2002 | Archibald |
| 6,524,634 B2 | 2/2003 | Busse et al. |
| 6,524,635 B1 | 2/2003 | Aebi |
| 6,531,169 B2 | 3/2003 | Best et al. |
| 6,548,097 B1 | 4/2003 | Best et al. |
| 6,565,902 B2 | 5/2003 | Ruano Del Campo et al. |
| 6,579,375 B2 | 6/2003 | Beckett et al. |
| 6,592,928 B2 | 7/2003 | Makela et al. |
| 6,616,963 B1 | 9/2003 | Zerby et al. |
| 6,623,784 B2 | 9/2003 | Zerby et al. |
| 6,627,239 B1 | 9/2003 | Gavie et al. |
| 6,645,538 B2 | 11/2003 | Best et al. |
| 6,689,406 B2 | 2/2004 | Kuehl et al. |
| 6,713,101 B2 | 3/2004 | Lometillo et al. |
| 6,726,944 B2 | 4/2004 | Blaschke et al. |
| 6,739,475 B2 | 5/2004 | San Martin et al. |
| 6,758,056 B1 | 7/2004 | Cathenaut et al. |
| 6,790,467 B2 | 9/2004 | Kostival et al. |
| 6,818,238 B2 | 11/2004 | Napolitano et al. |
| 6,820,765 B2 | 11/2004 | Pahl |
| 6,824,808 B2 | 11/2004 | Best et al. |
| 6,835,406 B1 | 12/2004 | Wurzel et al. |
| 6,861,082 B2 | 3/2005 | Laffont et al. |
| 6,890,577 B2 | 5/2005 | Vaghela et al. |
| 6,936,794 B2 | 8/2005 | Zhang et al. |
| 6,942,885 B2 | 9/2005 | Ross et al. |
| 6,971,248 B1 | 12/2005 | Wiggs |
| 7,211,283 B2 | 5/2007 | Jones et al. |
| 7,314,307 B2 | 1/2008 | Cai |
| 7,407,681 B2 | 8/2008 | Marchon et al. |
| 7,451,613 B2 | 11/2008 | Barraclough et al. |
| 7,513,213 B2 | 4/2009 | Mange et al. |
| 7,619,188 B2 | 11/2009 | Oghafua et al. |
| 7,650,834 B2 | 1/2010 | Bravo |
| 7,658,960 B2 | 2/2010 | Thomas et al. |
| 7,727,573 B2 | 6/2010 | Vaghela et al. |
| 7,730,831 B2 | 6/2010 | Mange et al. |

(56) References Cited

U.S. PATENT DOCUMENTS

| | | |
|---|---|---|
| 7,736,681 B2 | 6/2010 | Belzowski et al. |
| 7,754,260 B2 | 7/2010 | Kruik et al. |
| 7,918,334 B2 | 4/2011 | Gaetano et al. |
| 8,182,853 B2 | 5/2012 | Puaud et al. |
| 8,273,392 B2 | 9/2012 | Ho et al. |
| 8,347,808 B2 | 1/2013 | Belzowski et al. |
| 8,425,967 B2 | 4/2013 | Vaghela et al. |
| 8,459,497 B2 | 6/2013 | Milan et al. |
| 8,628,811 B2 | 1/2014 | Panyam et al. |
| 8,685,477 B2 | 4/2014 | Almblad et al. |
| 8,720,493 B2 | 5/2014 | Dose et al. |
| 8,777,057 B2 | 7/2014 | Fiedler |
| 8,784,091 B2 | 7/2014 | Henriet et al. |
| 8,840,943 B2 | 9/2014 | Amend |
| 8,844,426 B2 | 9/2014 | Ochoa et al. |
| 8,877,179 B2 | 11/2014 | Mercenier et al. |
| 8,906,437 B2 | 12/2014 | Green et al. |
| 8,936,821 B2 | 1/2015 | Ummadi et al. |
| 8,940,352 B2 | 1/2015 | Ambrogi et al. |
| 8,960,992 B2 | 2/2015 | de Jong |
| 8,960,999 B1 | 2/2015 | Ochoa et al. |
| 8,980,354 B2 | 3/2015 | Harlaux-Pasquier et al. |
| 9,155,322 B2 | 10/2015 | Ricco et al. |
| 9,232,811 B2 | 1/2016 | Panyam et al. |
| 9,242,387 B2 | 1/2016 | Amend et al. |
| 9,253,993 B2 | 2/2016 | Ummadi et al. |
| 9,346,611 B1 | 5/2016 | Roberts et al. |
| 9,351,503 B2 | 5/2016 | Amend et al. |
| 9,351,504 B2 | 5/2016 | Ricco et al. |
| 9,448,006 B2 | 9/2016 | Kulkarni et al. |
| 9,572,358 B2 | 2/2017 | Whitehouse |
| 9,573,726 B2 | 2/2017 | Danesin et al. |
| 9,591,865 B2 | 3/2017 | Ravji et al. |
| 9,826,756 B2 | 11/2017 | Ummadi et al. |
| 9,861,114 B2 | 1/2018 | Lallemand et al. |
| 9,888,706 B2 | 2/2018 | Ummadi et al. |
| 9,913,486 B2 | 3/2018 | Nalur |
| 10,039,298 B2 | 8/2018 | Noth et al. |
| 10,058,833 B2 | 8/2018 | Bloch |
| 10,111,447 B2 | 10/2018 | Noth et al. |
| 10,117,445 B2 | 11/2018 | Imer |
| 10,149,487 B2 | 12/2018 | Shuntich |
| 10,279,973 B2 | 5/2019 | Butscher et al. |
| 10,314,320 B2 | 6/2019 | Roberts et al. |
| 10,334,868 B2 | 7/2019 | Fonte |
| 10,358,284 B2 | 7/2019 | Fonte |
| 10,368,680 B2 | 8/2019 | Ryan |
| 10,426,180 B1 | 10/2019 | Fonte |
| 10,543,978 B1 | 1/2020 | Fonte et al. |
| 10,612,835 B2 | 4/2020 | Fonte et al. |
| 10,782,049 B1 | 9/2020 | Fonte et al. |
| 10,830,529 B2 | 11/2020 | Fonte et al. |
| 10,897,916 B2 | 1/2021 | Fonte |
| 10,973,240 B1 | 4/2021 | Fonte |
| 11,021,319 B2 | 6/2021 | Fonte |
| 11,033,044 B1 | 6/2021 | Fonte et al. |
| 11,109,610 B2 | 9/2021 | Fonte et al. |
| 2001/0035016 A1 | 11/2001 | Weber et al. |
| 2001/0052294 A1 | 12/2001 | Schmed |
| 2002/0001644 A1 | 1/2002 | Busse et al. |
| 2002/0034572 A1 | 3/2002 | Blaschke et al. |
| 2002/0166870 A1 | 11/2002 | Martin et al. |
| 2002/0182300 A1 | 12/2002 | Groh et al. |
| 2003/0000240 A1 | 1/2003 | Pahl |
| 2003/0012864 A1 | 1/2003 | Gerber |
| 2003/0017244 A1 | 1/2003 | Blaschke et al. |
| 2003/0035876 A1 | 2/2003 | Kostival et al. |
| 2003/0084898 A1 | 5/2003 | Beckett et al. |
| 2003/0134025 A1 | 7/2003 | Vaghela et al. |
| 2004/0058037 A1 | 3/2004 | Masuda et al. |
| 2004/0161503 A1 | 8/2004 | Malone et al. |
| 2004/0211201 A1 | 10/2004 | Bischel et al. |
| 2004/0219269 A1 | 11/2004 | Cathenaut et al. |
| 2005/0098561 A1 | 5/2005 | Schwoebel |
| 2005/0178796 A1 | 8/2005 | Schraiber |
| 2005/0189375 A1 | 9/2005 | McGill |
| 2005/0193896 A1 | 9/2005 | McGill |
| 2005/0229622 A1 | 10/2005 | Franck et al. |
| 2005/0279219 A1 | 12/2005 | Turi |
| 2006/0090654 A1 | 5/2006 | Mange et al. |
| 2006/0110507 A1 | 5/2006 | Yoakinn et al. |
| 2006/0110515 A1 | 5/2006 | Waletzko et al. |
| 2006/0254429 A1 | 11/2006 | Sinton |
| 2006/0255066 A1 | 11/2006 | Damiano et al. |
| 2006/0263490 A1* | 11/2006 | Wall ................ A23G 9/20 426/101 |
| 2006/0266751 A1 | 11/2006 | Ali et al. |
| 2006/0280826 A1 | 12/2006 | Mange |
| 2007/0144357 A1 | 6/2007 | Rivera |
| 2007/0160722 A1 | 7/2007 | Best et al. |
| 2007/0172562 A1 | 7/2007 | Medina Quintanilla |
| 2007/0177455 A1 | 8/2007 | Renfro |
| 2007/0181604 A1 | 8/2007 | Rusch |
| 2007/0202231 A1 | 8/2007 | Ambrogi et al. |
| 2007/0275131 A1 | 11/2007 | Bertini et al. |
| 2008/0066483 A1 | 3/2008 | Klier et al. |
| 2008/0102172 A1 | 5/2008 | Capelle et al. |
| 2008/0113069 A1 | 5/2008 | Green et al. |
| 2008/0140437 A1 | 6/2008 | Russo et al. |
| 2008/0206404 A1 | 8/2008 | Green et al. |
| 2008/0206426 A1 | 8/2008 | Rousset et al. |
| 2008/0226771 A1 | 9/2008 | Cathenaut et al. |
| 2008/0239867 A1 | 10/2008 | Gilbert |
| 2008/0282723 A1 | 11/2008 | Perrier et al. |
| 2009/0017149 A1 | 1/2009 | Richman |
| 2009/0090254 A1 | 4/2009 | Rusch |
| 2009/0147618 A1 | 6/2009 | Kovacic et al. |
| 2009/0179042 A1 | 7/2009 | Milan et al. |
| 2009/0191318 A1 | 7/2009 | Cocchi et al. |
| 2009/0223386 A1* | 9/2009 | Edwards ............ B01F 7/32 99/455 |
| 2009/0269452 A1 | 10/2009 | Dufort |
| 2009/0291170 A1 | 11/2009 | Roussel et al. |
| 2009/0304866 A1 | 12/2009 | Bovetto et al. |
| 2010/0034937 A1 | 2/2010 | Schmitt et al. |
| 2010/0068340 A1 | 3/2010 | Wille et al. |
| 2010/0068354 A1 | 3/2010 | Roberson et al. |
| 2010/0124599 A1 | 5/2010 | Saikali et al. |
| 2010/0132310 A1 | 6/2010 | Dose et al. |
| 2010/0189866 A1 | 7/2010 | Denger |
| 2010/0196551 A1 | 8/2010 | Harlaux-Pasquier et al. |
| 2010/0203202 A1 | 8/2010 | Quessette et al. |
| 2010/0203215 A1 | 8/2010 | Russo |
| 2010/0206220 A1 | 8/2010 | Belzowski et al. |
| 2010/0206875 A1 | 8/2010 | Bratsch |
| 2010/0209562 A1 | 8/2010 | Henriet et al. |
| 2010/0209571 A1 | 8/2010 | Vaghela et al. |
| 2010/0269534 A1 | 10/2010 | Kumakiri et al. |
| 2010/0285178 A1 | 11/2010 | Labbe et al. |
| 2011/0000872 A1 | 1/2011 | Aneas |
| 2011/0003041 A1 | 1/2011 | Garbi et al. |
| 2011/0027427 A1 | 2/2011 | Panyam et al. |
| 2011/0088558 A1 | 4/2011 | Farrel et al. |
| 2011/0217425 A1 | 9/2011 | Puaud et al. |
| 2011/0229608 A1 | 9/2011 | Plessier et al. |
| 2011/0262600 A1 | 10/2011 | McGill |
| 2011/0311703 A1 | 12/2011 | Ummadi et al. |
| 2012/0096875 A1 | 4/2012 | Ravji et al. |
| 2012/0096876 A1 | 4/2012 | Ravji et al. |
| 2012/0100271 A1 | 4/2012 | Leas et al. |
| 2012/0138621 A1 | 6/2012 | Bratsch |
| 2012/0201932 A1 | 8/2012 | Kihnke |
| 2012/0320707 A1 | 12/2012 | Planet et al. |
| 2013/0008321 A1 | 1/2013 | Bravo |
| 2013/0045310 A1 | 2/2013 | Ricco et al. |
| 2013/0052308 A1 | 2/2013 | Palzer et al. |
| 2013/0074535 A1 | 3/2013 | Schmidt |
| 2013/0101702 A1 | 4/2013 | Nalur |
| 2013/0122176 A1 | 5/2013 | Ummadi et al. |
| 2013/0129896 A1 | 5/2013 | Ummadi et al. |
| 2013/0129897 A1 | 5/2013 | Lallemand et al. |
| 2013/0136842 A1 | 5/2013 | Ummadi et al. |
| 2013/0149421 A1 | 6/2013 | Vaghela et al. |
| 2013/0152620 A1 | 6/2013 | Ugolini |

(56) References Cited

U.S. PATENT DOCUMENTS

| | | |
|---|---|---|
| 2013/0206771 A1 | 8/2013 | Arnold et al. |
| 2013/0216660 A1 | 8/2013 | Green et al. |
| 2013/0236581 A1 | 9/2013 | Mercenier et al. |
| 2013/0259975 A1 | 10/2013 | Schaffer-Lequart et al. |
| 2013/0323393 A1 | 12/2013 | Olmos et al. |
| 2013/0340456 A1 | 12/2013 | Hoare et al. |
| 2014/0000302 A1 | 1/2014 | Cocchi et al. |
| 2014/0004230 A1 | 1/2014 | Ricco et al. |
| 2014/0033969 A1 | 2/2014 | Leas et al. |
| 2014/0065270 A1 | 3/2014 | Huynh-Ba et al. |
| 2014/0083879 A1 | 3/2014 | Ulstad |
| 2014/0099422 A1 | 4/2014 | Panyam et al. |
| 2014/0141147 A1 | 5/2014 | Dopfer et al. |
| 2014/0161940 A1 | 6/2014 | Aviles et al. |
| 2014/0178534 A1 | 6/2014 | Amend et al. |
| 2014/0197195 A1 | 7/2014 | Peuker et al. |
| 2014/0242229 A1 | 8/2014 | Whitehouse |
| 2014/0255558 A1 | 9/2014 | Amend et al. |
| 2014/0272016 A1 | 9/2014 | Nowak |
| 2014/0335232 A1 | 11/2014 | Halachmi |
| 2014/0335255 A1 | 11/2014 | Jung et al. |
| 2014/0370173 A1 | 12/2014 | Gunes et al. |
| 2015/0017286 A1 | 1/2015 | Ural et al. |
| 2015/0064330 A1 | 3/2015 | Ummadi et al. |
| 2015/0099050 A1 | 4/2015 | Ummadi et al. |
| 2015/0128619 A1 | 5/2015 | Wild |
| 2015/0140193 A1 | 5/2015 | Desai et al. |
| 2015/0157040 A1 | 6/2015 | Althaus et al. |
| 2015/0157042 A1 | 6/2015 | Amend et al. |
| 2015/0164106 A1 | 6/2015 | Ricco et al. |
| 2015/0166222 A1 | 6/2015 | Danesin et al. |
| 2015/0201646 A1 | 7/2015 | Olmos et al. |
| 2015/0245638 A1 | 9/2015 | Ummadi et al. |
| 2015/0282502 A1 | 10/2015 | Ummadi et al. |
| 2015/0289538 A1 | 10/2015 | Ummadi et al. |
| 2015/0289540 A1 | 10/2015 | Imer |
| 2015/0296831 A1 | 10/2015 | Noth et al. |
| 2015/0296833 A1 | 10/2015 | Ummadi et al. |
| 2015/0327571 A1 | 11/2015 | Amend |
| 2015/0351426 A1 | 12/2015 | Ricco et al. |
| 2015/0351430 A1 | 12/2015 | Pipe et al. |
| 2016/0135479 A1 | 5/2016 | Ummadi et al. |
| 2016/0192675 A1 | 7/2016 | Abu-Ali |
| 2016/0213026 A1 | 7/2016 | Lepagnol et al. |
| 2016/0214787 A1 | 7/2016 | Iotti |
| 2016/0235089 A1 | 8/2016 | Ricco et al. |
| 2016/0255858 A1 | 9/2016 | Noth et al. |
| 2016/0270424 A1 | 9/2016 | Noth et al. |
| 2016/0278401 A1 | 9/2016 | Noth et al. |
| 2016/0309739 A1 | 10/2016 | Chandrsekaran |
| 2016/0309740 A1 | 10/2016 | Bunce et al. |
| 2016/0309741 A1 | 10/2016 | Zhou et al. |
| 2016/0309742 A1 | 10/2016 | Ma et al. |
| 2016/0316778 A1 | 11/2016 | Nagy et al. |
| 2016/0316784 A1 | 11/2016 | Chandrasekaran |
| 2016/0338378 A1 | 11/2016 | Ummadi et al. |
| 2016/0347525 A1 | 12/2016 | Butscher et al. |
| 2017/0000162 A1 | 1/2017 | Lallemand et al. |
| 2017/0042182 A1 | 2/2017 | Olmos et al. |
| 2017/0042183 A1 | 2/2017 | Puaud et al. |
| 2017/0042184 A1 | 2/2017 | Olmos et al. |
| 2017/0079305 A1 | 3/2017 | Barniol Gutierrez et al. |
| 2017/0183210 A1 | 6/2017 | Wyatt et al. |
| 2017/0188600 A1 | 7/2017 | Scharfman et al. |
| 2017/0215456 A1 | 8/2017 | Noth et al. |
| 2017/0217648 A1 | 8/2017 | Bouzaid et al. |
| 2017/0225879 A1 | 8/2017 | Stein et al. |
| 2017/0265495 A1 | 9/2017 | Amend |
| 2017/0275086 A1 | 9/2017 | Perentes et al. |
| 2017/0275088 A1 | 9/2017 | Bouzaid et al. |
| 2017/0280745 A1 | 10/2017 | Herbert et al. |
| 2017/0318833 A1 | 11/2017 | Curschellas et al. |
| 2017/0318995 A1 | 11/2017 | Rai |
| 2017/0326749 A1 | 11/2017 | Amend |
| 2017/0332656 A1 | 11/2017 | Amend |
| 2017/0339976 A1 | 11/2017 | Amend |
| 2017/0360061 A1 | 12/2017 | Fonte |
| 2017/0367371 A1 | 12/2017 | Lebleu et al. |
| 2018/0008087 A1 | 1/2018 | Miller et al. |
| 2018/0042258 A1 | 2/2018 | Roberts et al. |
| 2018/0042279 A1 | 2/2018 | Kerler et al. |
| 2018/0064127 A1 | 3/2018 | Chisholm et al. |
| 2018/0064131 A1 | 3/2018 | Noth |
| 2018/0064132 A1 | 3/2018 | Noth |
| 2018/0084800 A1 | 3/2018 | Noth |
| 2018/0092378 A1 | 4/2018 | Webering et al. |
| 2018/0141011 A1 | 5/2018 | Mou |
| 2018/0146695 A1 | 5/2018 | Amend et al. |
| 2018/0146699 A1 | 5/2018 | Vafeiadi et al. |
| 2018/0177545 A1 | 5/2018 | Noth |
| 2018/0199760 A1 | 7/2018 | Rai |
| 2018/0213816 A1 | 8/2018 | Amend |
| 2018/0263274 A1 | 9/2018 | Ray et al. |
| 2018/0271115 A1 | 9/2018 | Ray et al. |
| 2019/0021548 A1 | 1/2019 | Eisner |
| 2019/0029248 A1 | 1/2019 | Cutting |
| 2019/0053513 A1 | 2/2019 | Halachmi |
| 2019/0053514 A1 | 2/2019 | Fonte et al. |
| 2019/0239534 A1 | 8/2019 | Halachmi |
| 2019/0254307 A1 | 8/2019 | Noth et al. |
| 2019/0269148 A1 | 9/2019 | Bouzaid et al. |
| 2019/0270555 A1 | 9/2019 | Noth et al. |
| 2019/0291947 A1 | 9/2019 | Kruger |
| 2019/0320679 A1 | 10/2019 | Halachmi |
| 2019/0325182 A1 | 10/2019 | Noth et al. |
| 2019/0329948 A1 | 10/2019 | Ritzenhoff et al. |
| 2019/0344955 A1 | 11/2019 | Fonte |
| 2019/0357564 A1 | 11/2019 | Yang et al. |
| 2020/0055664 A1 | 2/2020 | Fonte et al. |
| 2020/0056814 A1 | 2/2020 | Fonte et al. |
| 2020/0056835 A1 | 2/2020 | Fonte et al. |
| 2020/0146311 A1 | 5/2020 | Halachmi |
| 2020/0292212 A1 | 9/2020 | Fonte et al. |
| 2020/0292229 A1 | 9/2020 | Fonte et al. |
| 2020/0315206 A1 | 10/2020 | Fonte |
| 2020/0326124 A1 | 10/2020 | Fonte et al. |
| 2020/0333056 A1 | 10/2020 | Ito et al. |
| 2021/0002066 A1 | 1/2021 | Fonte |
| 2021/0002067 A1 | 1/2021 | Fonte |
| 2021/0003342 A1 | 1/2021 | Fonte et al. |
| 2021/0007370 A1 | 1/2021 | Fonte |
| 2021/0032015 A1 | 2/2021 | Fonte |
| 2021/0084930 A1 | 3/2021 | Fonte |
| 2021/0127706 A1 | 5/2021 | Fonte |
| 2021/0212337 A1 | 7/2021 | Fonte et al. |
| 2021/0212338 A1 | 7/2021 | Fonte et al. |

FOREIGN PATENT DOCUMENTS

| | | |
|---|---|---|
| EP | 1009678 | 6/2000 |
| EP | 1139837 | 10/2001 |
| EP | 1415543 | 5/2004 |
| EP | 1907300 | 4/2008 |
| EP | 2266418 | 12/2010 |
| EP | 2281464 | 2/2011 |
| EP | 2679100 | 1/2014 |
| EP | 2775855 | 9/2014 |
| EP | 3044125 | 7/2016 |
| EP | 3160870 | 5/2017 |
| FR | 2501080 | 9/1982 |
| JP | H11507295 A | 6/1999 |
| JP | 2002/068304 A | 3/2002 |
| JP | 2005/318869 | 11/2005 |
| WO | WO 1996/001224 | 1/1996 |
| WO | WO 2004/054380 | 7/2004 |
| WO | WO 2015/077825 | 11/2006 |
| WO | WO 2010/103483 | 9/2010 |
| WO | WO 2013/121421 | 8/2013 |
| WO | WO 2015/063092 | 5/2015 |
| WO | WO 2015/063094 | 5/2015 |
| WO | WO 2015/077825 | 6/2015 |
| WO | WO 2016/079641 | 5/2016 |
| WO | WO 2016/081477 | 5/2016 |
| WO | WO 2017/087970 | 5/2017 |

(56) References Cited

FOREIGN PATENT DOCUMENTS

| WO | WO 2017/139395 | 8/2017 |
|---|---|---|
| WO | WO 2017/176580 | 10/2017 |
| WO | WO 2017/214357 | 12/2017 |
| WO | WO 2018/109765 | 6/2018 |
| WO | WO 2019/140251 | 7/2019 |
| WO | WO 2020039439 | 2/2020 |
| WO | WO 2020053859 | 3/2020 |
| WO | WO 2020089919 | 5/2020 |
| WO | WO 2020/163369 | 8/2020 |

OTHER PUBLICATIONS

PCT International Search Report and Written Opinion in International Appln. No. PCT/US2020/051664, dated Dec. 17, 2020, 44 pages.

Hosford et al., "The aluminum beverage can," Scientific American, Sep. 1, 1994, 271(3):48-53.

PCT International Search Report and Written Opinion in International Appln. No. PCT/US2021/013619, dated Jun. 2, 2021, 17 pages.

PCT International Preliminary Report on Patentability in International Appln. No. PCT/US2019/046946, dated Feb. 23, 2021, 16 pages.

PCT International Preliminary Report on Patentability in International Appln. No. PCT/US2019/046958, dated Feb. 23, 2021, 17 pages.

PCT International Preliminary Report on Patentability in International Appln. No. PCT/US2019/046954, dated Feb. 23, 2021, 14 pages.

Allpax, "Shaka Retorts 1300 and 1600," 2020, retrieved Apr. 16, 2020 from URL <https://www.allpax.com/products/production-shaka-retorts/>, 4 pages.

Arellano et al., "Online ice crystal size measurements during sorbet freezing by means of the focused beam reflectance measurement (FBRM) technology," Influence of Operating Conditions. Journal of Food Engineering, Nov. 1, 2012, 1;113(2):351-9.

Caldwell et al., "A low-temperature scanning electron microscopy study of ice cream. II. Influence of selected ingredients and processes," Food Structure, 1992; 11(1):2, 10 pages.

Cook et al., "Mechanisms of Ice Crystallization in Ice Cream production," Comprehensive Reviews in Food Science and Food safety, Mar. 2010, 9(2):213-22.

Design Integrated Technology, "Propellant Equipment Used by Arsenals Worldwide," 2016, retrieved on Apr. 16, 2020 from URL <bttps://www.ditusa.com/sc_helicone_mixers.php>, 3 pages.

Drewett et al., "Ice crystallization in a scraped surface freezer." Journal of Food Engineering, Feb. 1, 2007, 78(3):1060-6.

EP Extended Search Report in European Appln. No. 17814210.5, dated Jan. 24, 2020, pp. 1-3 of 12 pages.

Gonzalez-Ramirez et al., "Moments model for a continuous sorbet crystallization process," The 23rd HR International Congress of Refrigeration, Refrigeration for Sustainable Development, Prague, Czech Republic, Aug. 2011, 21-6.

Hagiwara et al., "Effect of sweetener, stabilizer, and storage temperature on ice recrystallization in ice cream." Journal of Dairy Science, May 1, 1996, 79(5):735-44.

Ice Cream Science, "How Long Does Homemade Ice Cream Last in the Freezer," Jun. 3, 2016, retrieved Apr. 16, 2020 form URL <http://icecreamscience.com/long-ice-cream-last-freezer/>, 18 pages.

Ice Cream Science, "Ice Crystals in Ice Cream," Oct. 20, 2016. retrieved on Apr. 16, 2020 from URL <http://icecreamscience.com/ice-crystals-in-ice-cream/>, 18 pages.

Inoue et al., "Modeling of the effect of freezer conditions on the principal constituent parameters of ice cream by using response surface methodology." Journal of Dairy Science, May 1, 2008. 91(5):1722-32.

PCT Authorized Officer Gwenaelle Llorca, European Patent Office, International Application No. PCT/US2019/013286, "Invitation to Pay Additional Fees and, Where Applicable, Protest Fee", International Searching Authority, Apr. 4, 2019, pp. 1-16 of 19 pages.

PCT International Search Report and Written Opinion in International Appln. No. PCT/US17/37972, dated Oct. 27, 2017, 16 pages.

PCT International Search Report and Written Opinion in International Appln. No. PCT/US19/13286, dated May 31, 2019, 21 pages.

PCT International Search Report and Written Opinion in International Appln. No. PCT/US2019/013286, dated Jan. 11, 2019, 21 pages.

PCT International Search Report and Written Opinion in International Appln. No. PCT/US2019/046946, dated Jan. 24, 2020, 24 pages.

PCT International Search Report and Written Opinion in International Appln. No. PCT/US2019/046954, dated Nov. 21, 2019, 20 pages.

PCT Invitation to Pay Additional Fees in International Appln. No. PCT/US2019/046946, dated Dec. 2, 2019, 19 pages.

Reichart, "Speed of Dasher and Scraper as Affecting the Quality of Ice Cream and Sherbet," Journal of Dairy Science, Mar. 1, 1931, 14(2):107-15.

Shaka Process, "Higher Quality Ambient Foods," 2018, retrieved Apr. 16, 2020 from URL <http://shakaprocess.com/>, 2 pages.

Tetra Pak Homogenizers, "Ice Cream Homogenization for Sounds Performance," 2014, retrieved Apr. 16, 2020 from URL <https://assets.tetrapak.com/static/documents/tetra_pak_homogenizers_br_63880_low.pdf>, 4 pages.

US Notice of Allowance in U.S. Appl. No. 16/592,031, dated Jan. 10, 2020, 8 pages.

Xiao-Wim, "This New Kitchen Gadget Makes Fro-Yo in Minutes", by Bloomberg, Aug. 8, 2017, 4 pages, http://fortune.com/2017/08/08/wim-frozen-yogurt-minutes/ Oct. 12, 2018.

EP European Office Action by European Appln. No. 19762064.4, dated Oct. 25, 2021, 10 pages.

EP European Search Report in European Appln. No. 21181499.1, dated Nov. 3, 2021, 14 pages.

PCT International Search Report and Written Opinion in International Appln. No. PCT/US2021/035260, dated Oct. 1, 2021, 18 pages.

* cited by examiner

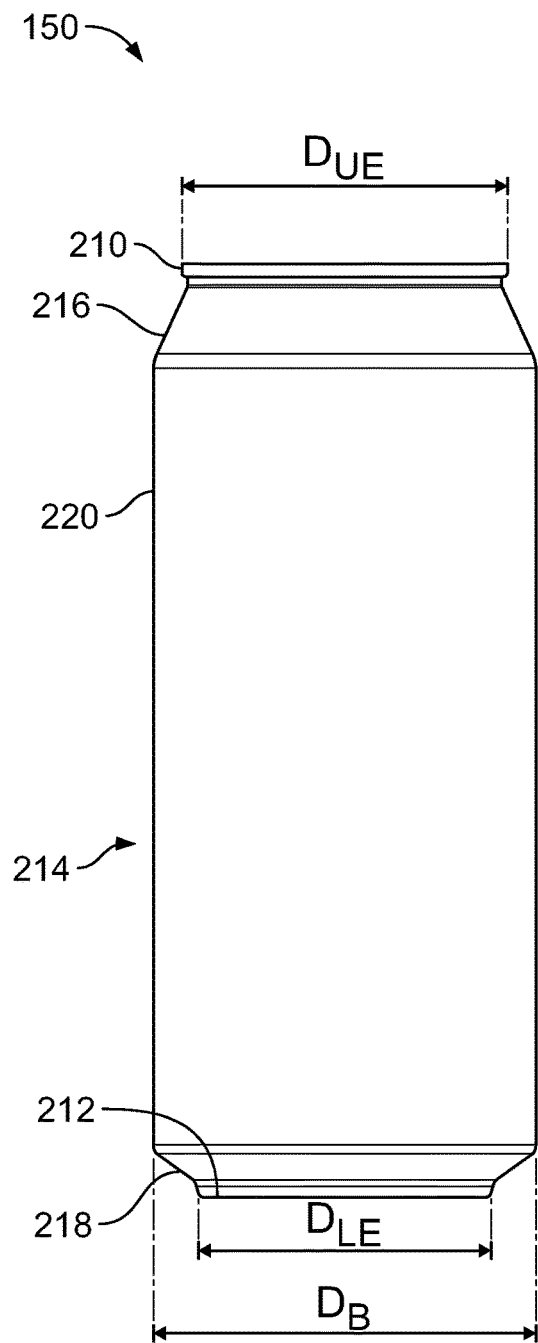
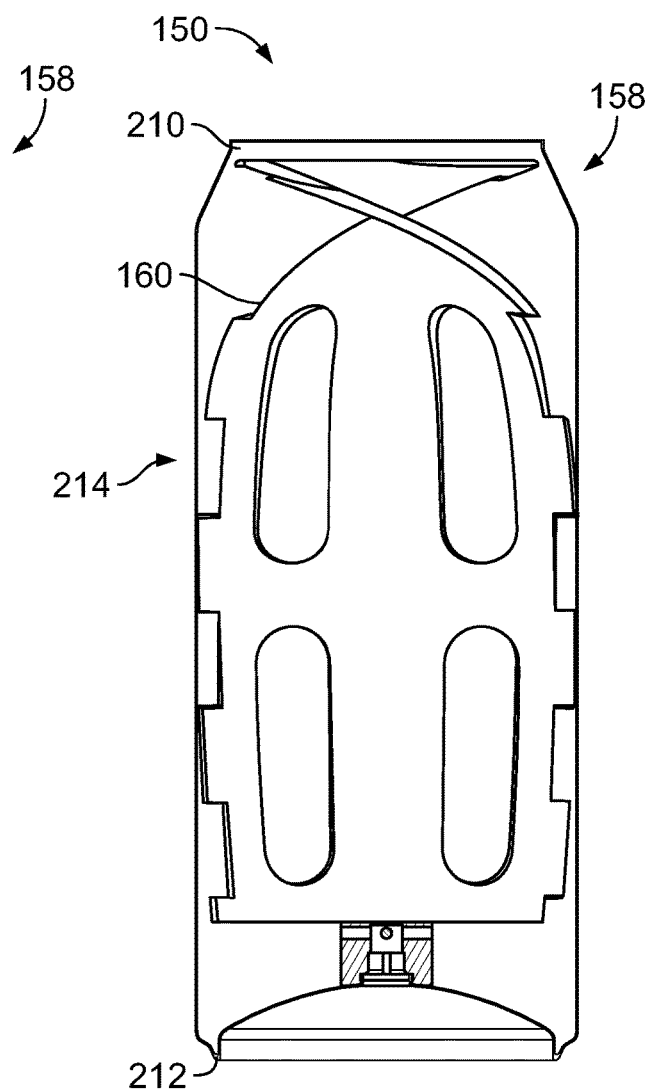
FIG. 6A
FIG. 6B

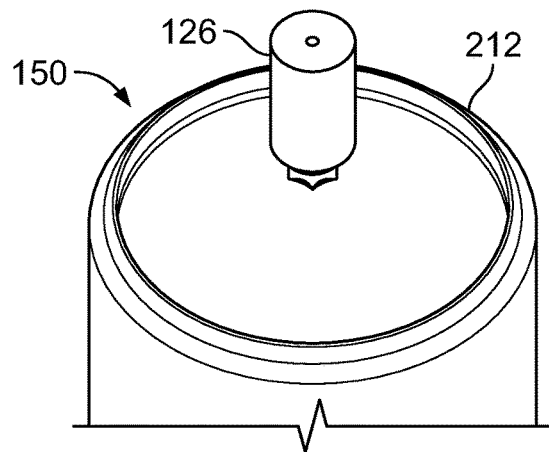
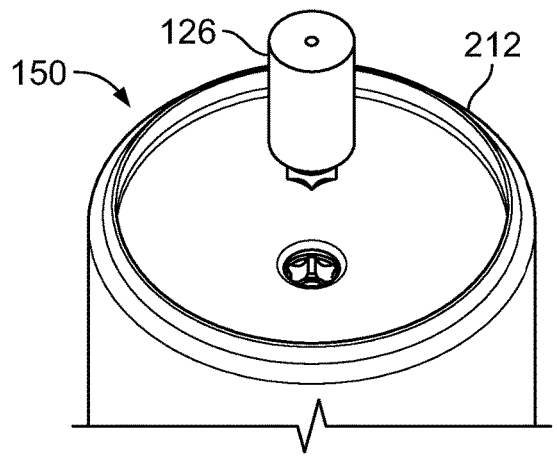
FIG. 7A        FIG. 7B
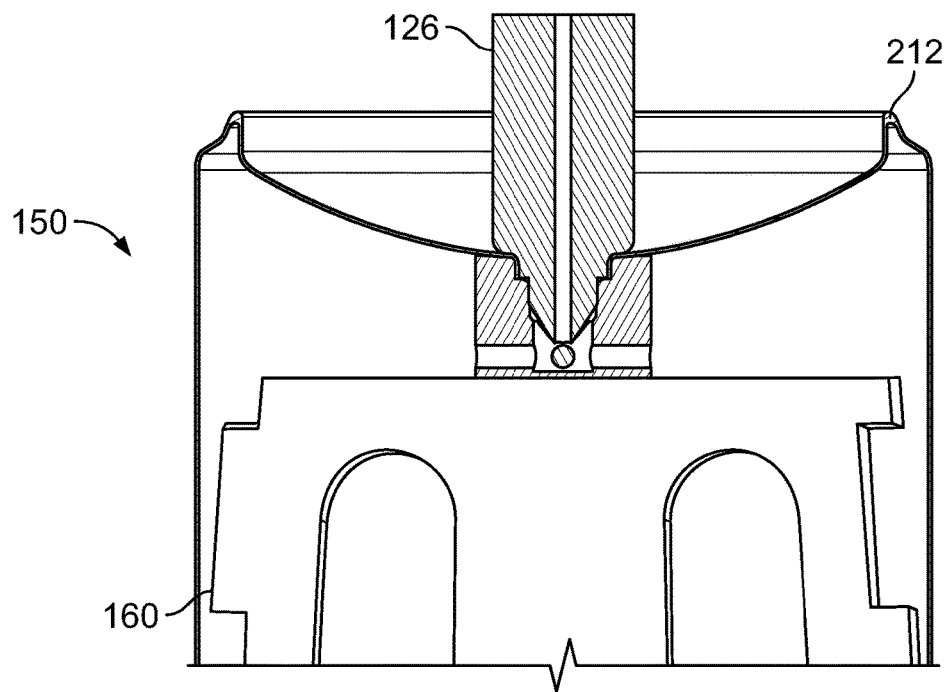
FIG. 7C

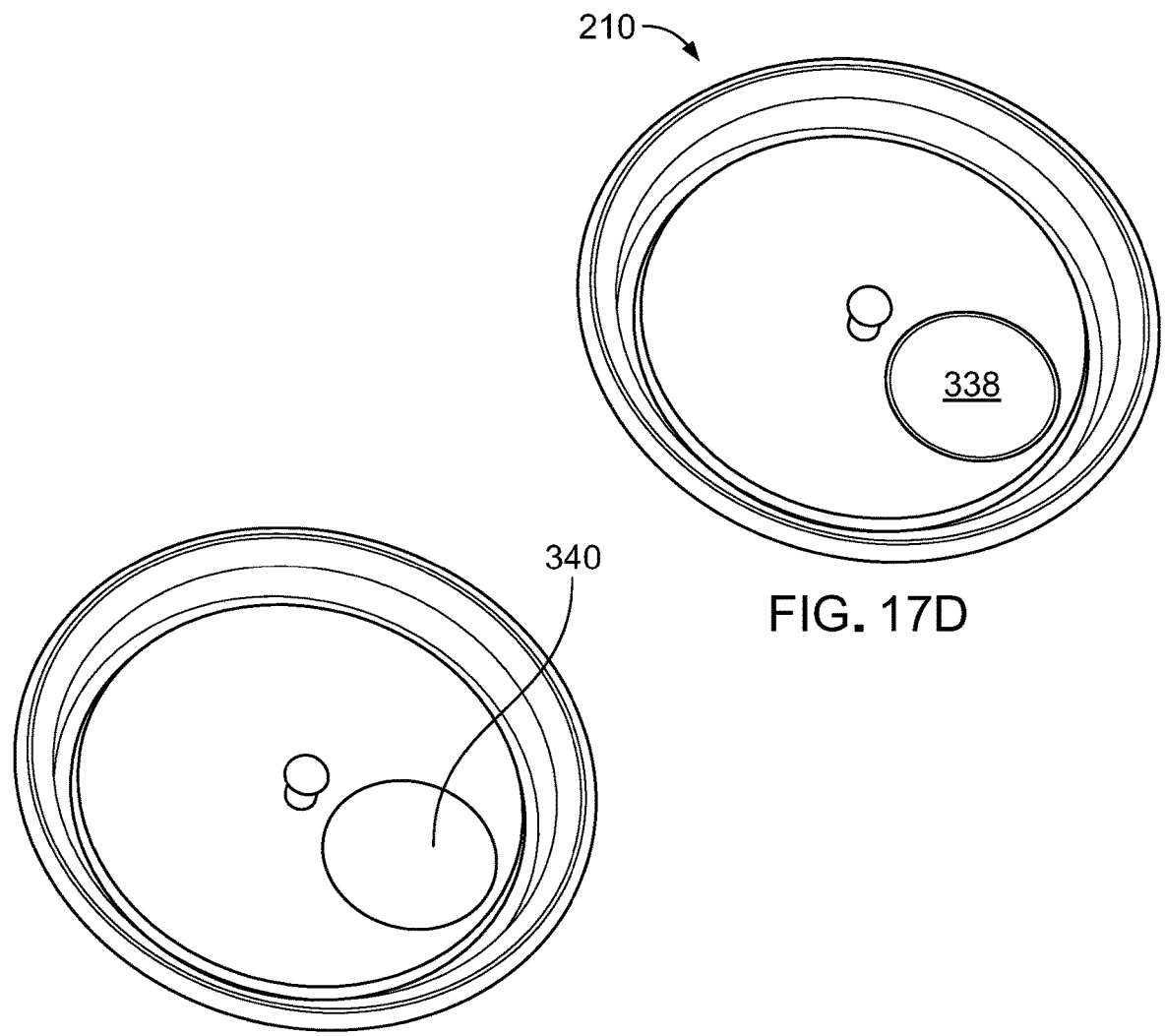
FIG. 17D
FIG. 17E
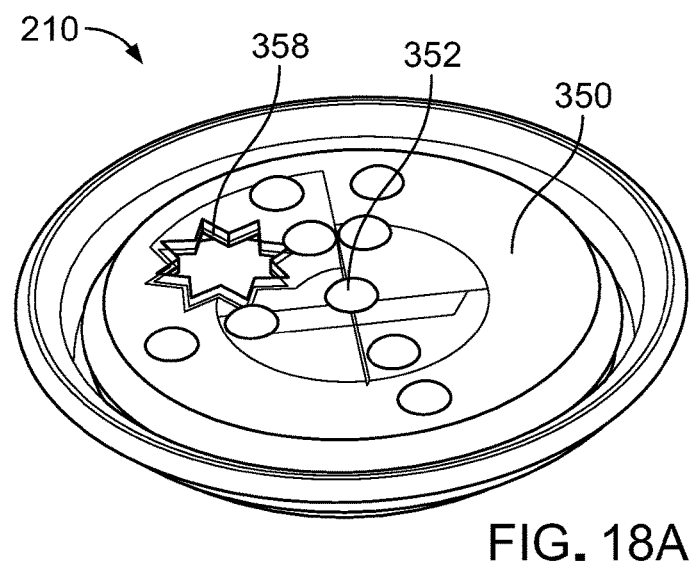
FIG. 18A

RAPIDLY COOLING FOOD AND DRINKS

RELATED APPLICATIONS

This patent application is a continuation of U.S. patent application Ser. No. 16/591,975, filed Oct. 3, 2019, which is a continuation of U.S. patent application Ser. No. 16/459,322, filed Jul. 1, 2019, now U.S. Pat. No. 10,543,978, which is a continuation-in-part of U.S. patent application Ser. No. 16/104,758, filed on Aug. 17, 2018, now U.S. Pat. No. 10,334,868, and claims the benefit of provisional patent applications U.S. Ser. No. 62/758,110, filed on Nov. 9, 2018; U.S. Ser. No. 62/801,587, filed on Feb. 5, 2019; U.S. Ser. No. 62/831,657, filed on Apr. 9, 2019; U.S. Ser. No. 62/831,600, filed on Apr. 9, 2019; U.S. Ser. No. 62/831,646, filed on Apr. 9, 2019; and U.S. Ser. No. 62/831,666, filed on Apr. 9, 2019, all of which are hereby incorporated herein by reference in their entirety.

TECHNICAL FIELD

This disclosure relates to systems and methods for rapidly cooling food and drinks.

BACKGROUND

Beverage brewing system have been developed that rapidly prepare single servings of hot beverages. Some of these brewing systems rely on single use pods to which water is added before brewing occurs. The pods can be used to prepare hot coffees, teas, cocoas, and dairy-based beverages.

Home use ice cream makers can be used to make larger batches (e.g., 1.5 quarts or more) of ice cream for personal consumption. These ice cream maker appliances typically prepare the mixture by employing a hand-crank method or by employing an electric motor that is used, in turn, to assist in churning the ingredients within the appliance. The resulting preparation is often chilled using a pre-cooled vessel that is inserted into the machine.

SUMMARY

This specification describes systems and methods for rapidly cooling food and drinks. Some of these systems and methods can cool food and drinks in a container inserted into a counter-top or installed machine from room temperature to freezing in less than two minutes. For example, the approach described in this specification has successfully demonstrated the ability make soft-serve ice cream from room-temperature pods in approximately 90 seconds. This approach has also been used to chill cocktails and other drinks including to produce frozen drinks. These systems and methods are based on a refrigeration cycle with low startup times and a pod-machine interface that is easy to use and provides extremely efficient heat transfer. Some of the pods described are filled with ingredients in a manufacturing line and subjected to a sterilization process (e.g., retort, aseptic packaging, ultra-high temperature processing (UHT), ultra-heat treatment, ultra-pasteurization, or high pressure processing (HPP)). HPP is a cold pasteurization technique by which products, already sealed in its final package, are introduced into a vessel and subjected to a high level of isostatic pressure (300-600 megapascals (MPa) (43,500-87,000 pounds per square inch (psi)) transmitted by water. The pods can be used to store ingredients including, for example, dairy products at room temperature for long periods of time (e.g., 9-12 months) following sterilization.

Cooling is used to indicate the transfer of thermal energy to reduce the temperature, for example, of ingredients contained in a pod. In some cases, cooling indicates the transfer of thermal energy to reduce the temperature, for example, of ingredients contained in a pod to below freezing.

Some pods containing at least one ingredient to form a cold food or drink include: a metal body with a closed end, an open end opposite the closed end, and a sidewall extending from the closed end to define an interior cavity of the body; at least one paddle disposed in the interior cavity of the body and rotatable relative to the body; and a base extending across the open end of the body, the base sealed to the sidewall of the body, the base including a protrusion with a stem that extends between a head and a foot, the stem having a smaller cross-section than the head and the foot, the base comprising a weakened section extending around the protrusion.

Some cans containing at least one ingredient to form a cold food or drink include: a metal body with an axis, a closed end, an open end opposite the closed end, and a sidewall extending from the closed end to define an interior cavity of the body, the open end of the body having a radius that is less than an average radius of the body; at least one paddle extending laterally farther from the axis of the body than the radius of the open end of the body, the at least one paddle disposed in the interior cavity of the body and rotatable relative to the body; and a base extending across the open end of the body, the base sealed to the sidewall of the body, the base defining an opening extending through the base Some pods for forming a cold food or drink include: a body with an axis, a first end, a second end opposite the first end, and a sidewall extending from the first end to define an interior cavity of the body open at the second end, the second end of the body having a radius that is less than an average radius of the body; at least one paddle extending a distance farther from the axis of the body that is greater than the radius of the open end of the body, the scraper disposed in the interior cavity of the body; and a base extending across the open end of the body, the base sealed to the sidewall of the body, the base defining an opening extending through the base.

Some pods containing at least one ingredient to form a cold food or drink include: a body with a first end, a second end opposite the first end, and a sidewall extending from the first end to define an interior cavity of the body open at the second end, the second end of the body having a radius that is less than an average radius of the body; a mixing paddle having at least one blade; a base extending across the open end of the body, the base sealed to the sidewall of the body, the base defining an opening extending through the base; and a cap attached to the body, the cap extending over at least part of the base and rotatable around the axis of the mixing paddle relative to the base, the cap defining an opening extending through the cap.

Pods and cans can include one or more of the following features.

In some embodiments, the body and the base of pods form a can. In some cases, the base includes a protrusion extending outward relative to adjacent portions of the base, the protrusion having a stem that extends between a head and a foot, the stem having a smaller cross-section than the head and the foot, the base comprising a weakened section extending around the protrusion.

In some embodiments, pods and cans include a cap attached to the body, the cap extending over at least part of the base and rotatable per relative to the base, the cap defining an opening extending through the cap. In some cases, the cap is rotatable around the axis of the body. In some cases, cans and pods also include a plug closing the opening extending through the base. In some cases, the plug comprises a slide disposed between the cap and the base, the slide rotatable relative to the base. In some cases, the plug comprises a foil seal and the cap is positioned to engage and remove the foil seal from the opening defined extending through the base on rotation of the cap.

In some embodiments, pods and cans include a peel-off lid extending over the cap. In some cases, the at least one blade is a plurality of blades. In some cases, each blade has two or more different angles of inclination relative to a plane perpendicular to the axis of the body. In some cases, the plurality of paddles are configured to be resilient enough to resume an original shape after being compressed to fit through the open end of the body. In some cases, the at least one paddle has grooves in an outer edge, the grooves sized to receive a rim of the open end of the body to enable insertion of the scraper into the interior cavity of the body by rotation of the scraper with the rim in the grooves.

In some embodiments, pods and cans include a vessel containing pressurized gas disposed in the interior cavity of the body. In some cases, the pod is internally pressurized to at least 20 psi.

In some embodiments, pods and cans include between 3 and 10 ounces of the at least one ingredient.

The systems and methods described in this specification can provide a number of advantages. Some embodiments of these systems and methods can provide single servings of cooled food or drink. This approach can help consumers with portion control. Some embodiments of these systems and methods can provide consumers the ability to choose their single-serving flavors, for example, of soft serve ice cream. Some embodiments of these systems and methods incorporate shelf-stable pods that do not require pre-cooling, pre-freezing or other preparation. Some embodiments of these systems and methods can generate frozen food or drinks from room-temperature pods in less than two minutes (in some cases, less than one minute). Some embodiments of these systems and methods do not require post-processing clean up once the cooled or frozen food or drink is generated. Some embodiments of these systems and methods utilize aluminum pods that are recyclable.

The details of one or more embodiments of these systems and methods are set forth in the accompanying drawings and the description below. Other features, objects, and advantages of these systems and methods will be apparent from the description and drawings, and from the claims.

DESCRIPTION OF FIGURES

FIG. 6A is a side view of a pod. FIG. 6B is a schematic side view of the pod and a mixing paddle disposed in the pod.

FIGS. 7A and 7B are perspective views of a pod and an associated drive shaft. FIG. 7C is a cross-section of a portion of the pod with the drive shaft engaged with a mixing paddle in the pod.

FIGS. 17D and 17E are perspective views of the first end of the pod.

FIG. 18A is a perspective view of a rotatable base on the first end of a pod.

Like reference symbols in the various drawings indicate like elements.

DETAILED DESCRIPTION

This specification describes systems and methods for rapidly cooling food and drinks. Some of these systems and methods use a counter-top or installed machine to cool food and drinks in a container from room temperature to freezing in less than two minutes. For example, the approach described in this specification has successfully demonstrated the ability make soft-serve ice cream, frozen coffees, frozen smoothies, and frozen cocktails, from room temperature pods in approximately 90 seconds. This approach can also be used to chill cocktails, create frozen smoothies, frozen protein and other functional beverage shakes (e.g., collagen-based, energy, plant-based, non-dairy, CBD shakes), frozen coffee drinks and chilled coffee drinks with and without nitrogen in them, create hard ice cream, create milk shakes, create frozen yogurt and chilled probiotic drinks. These systems and methods are based on a refrigeration cycle with low startup times and a pod-machine interface that is easy to use and provides extremely efficient heat transfer. Some of the pods described can be sterilized (e.g., using retort sterilization) and used to store ingredients including, for example, dairy products at room temperature for up to 18 months.

Figure 1A:
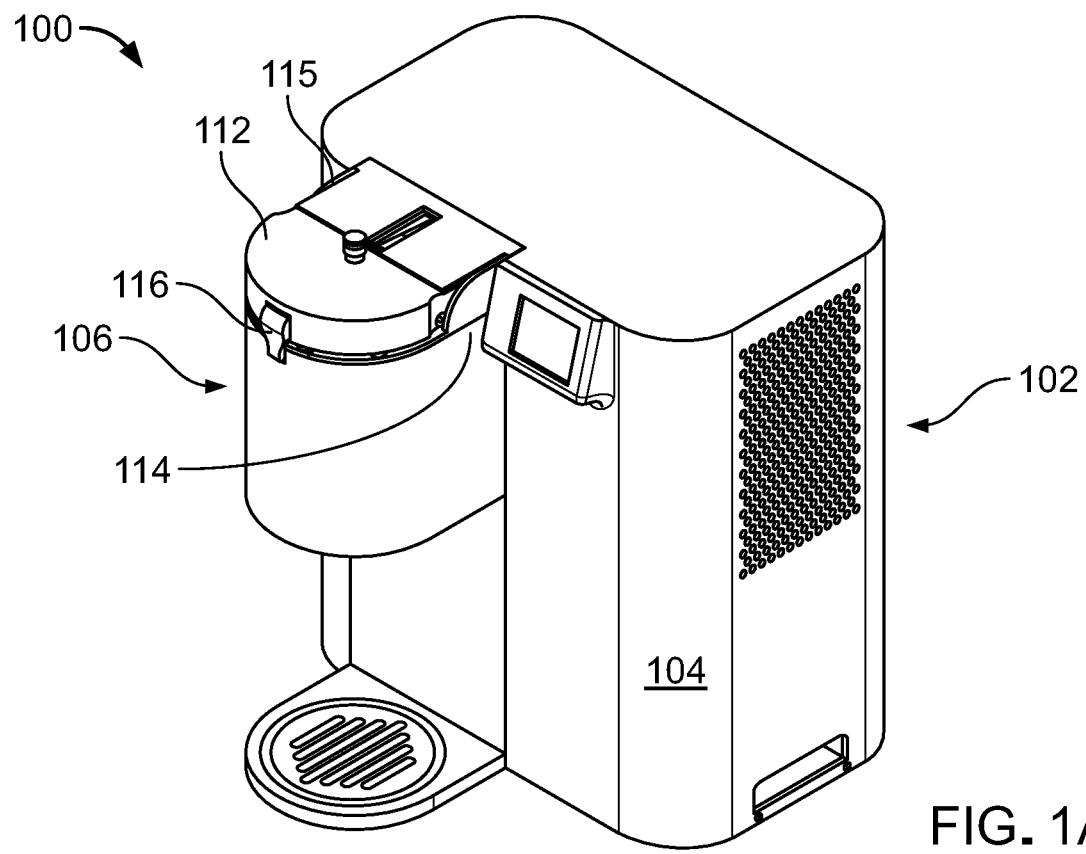
FIG. 1A is a perspective view of a machine for rapidly cooling food and drinks.
Figure 1B:
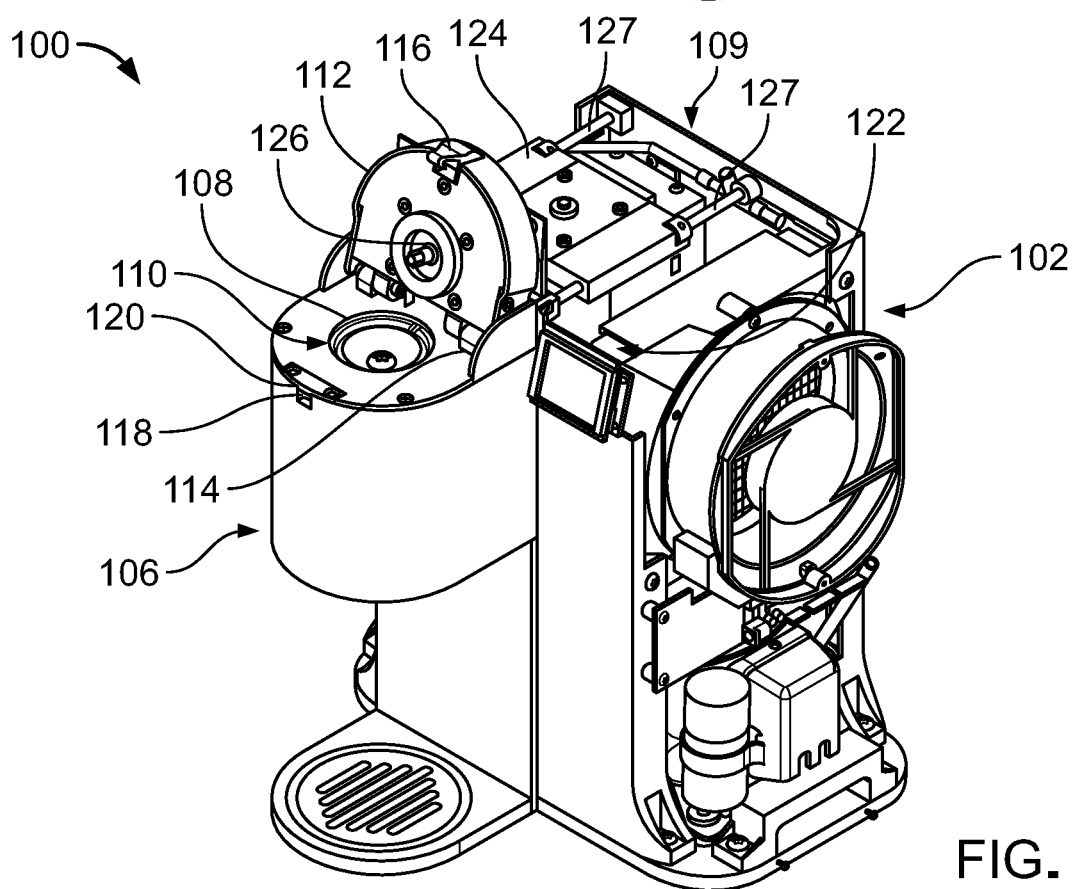
FIG. 1B shows the machine without its housing.

FIG. 1A is a perspective view of a machine 100 for cooling food or drinks. FIG. 1B shows the machine without its housing. The machine 100 reduces the temperature of ingredients in a pod containing the ingredients. Most pods include a mixing paddle used to mix the ingredients before dispensing the cooled or frozen products. The machine 100 includes a body 102 that includes a compressor, condenser, fan, evaporator, capillary tubes, control system, lid system and dispensing system with a housing 104 and a pod-machine interface 106. The pod-machine interface 106 includes an evaporator 108 of a refrigeration system 109 whose other components are disposed inside the housing 104. As shown on FIG. 1B, the evaporator 108 defines a receptacle 110 sized to receive a pod.

A lid 112 is attached to the housing 104 via a hinge 114. The lid 112 can rotate between a closed position covering the receptacle 110 (FIG. 1A) and an open position exposing the receptacle 110 (FIG. 1B). In the closed position, the lid 112 covers the receptacle 110 and is locked in place. In the machine 100, a latch 116 on the lid 112 engages with a latch recess 118 on the pod-machine interface 106. A latch sensor 120 is disposed in the latch recess 118 to determine if the latch 116 is engaged with the latch recess 118. A processor 122 is electronically connected to the latch sensor 120 and recognizes that the lid 112 is closed when the latch sensor 120 determines that the latch 116 and the latch recess 118 are engaged.

An auxiliary cover 115 rotates upward as the lid 112 is moved from its closed position to its open position. A slot in the auxiliary cover 115 receives a handle of the lid 112 during this movement. Some auxiliary covers slide into the housing when the lid moves into the open position.

In the machine 100, the evaporator 108 is fixed in position with respect to the body 102 of the machine 100 and access to the receptacle 110 is provided by movement of the lid 112. In some machines, the evaporator 108 is displaceable relative to the body 102 and movement of the evaporator 108 provides access to the receptacle 110.

A motor 124 disposed in the housing 104 is mechanically connected to a drive shaft 126 that extends from the lid 112. When the lid 112 is in its closed position, the drive shaft 126 extends into the receptacle 110 and, if a pod is present, engages with the pod to move a paddle or paddles within the pod. The processor 122 is in electronic communication with the motor 124 and controls operation of the motor 124. In some machines, the shaft associated with the paddle(s) of the pod extends outward from the pod and the lid 112 has a rotating receptacle (instead of the drive shaft 126) mechanically connected to the motor 124.

Figure 1C:
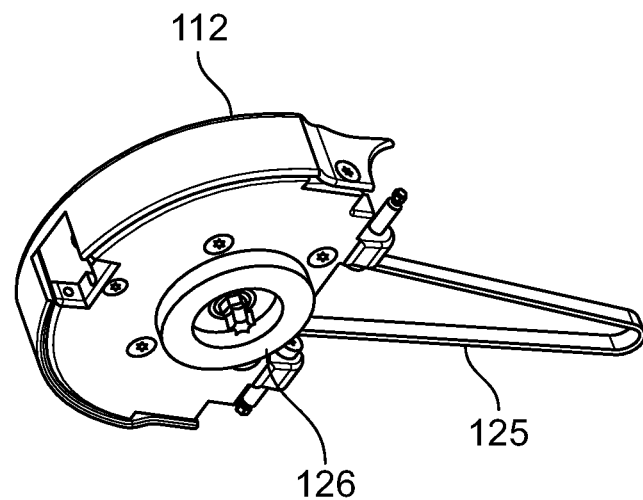
FIG. 1C is a perspective view of a portion of the machine of FIG. 1A.

FIG. 1C is perspective view of the lid 112 shown separately so the belt 125 that extends from motor 124 to the drive shaft 126 is visible. Referring again to FIG. 1B, the motor 124 is mounted on a plate that runs along rails 127. The plate can move approximately 0.25 inches to adjust the tension on the belt. During assembly, the plate slides along the rails. Springs disposed between the plate and the lid 112 bias the lid 112 away from the plate to maintain tension in the belt.

Figure 2A:
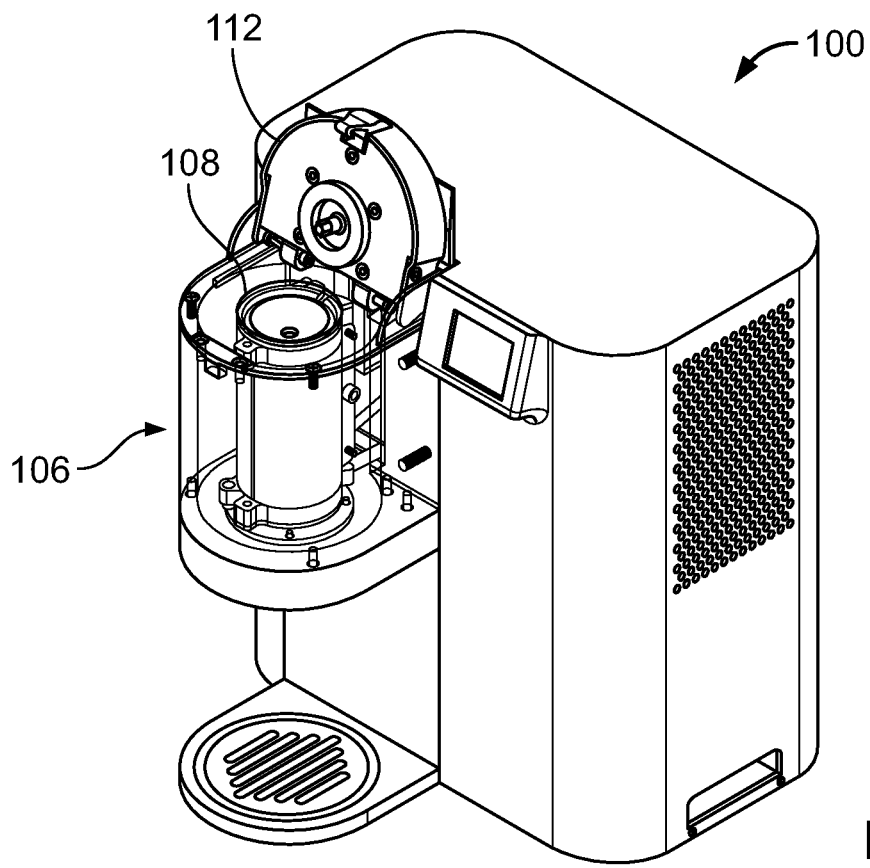
FIG. 2A is perspective view of the machine of FIG. 1A with the cover of the pod-machine interface illustrated as being transparent to allow a more detailed view of the evaporator to be seen.
Figure 2B:
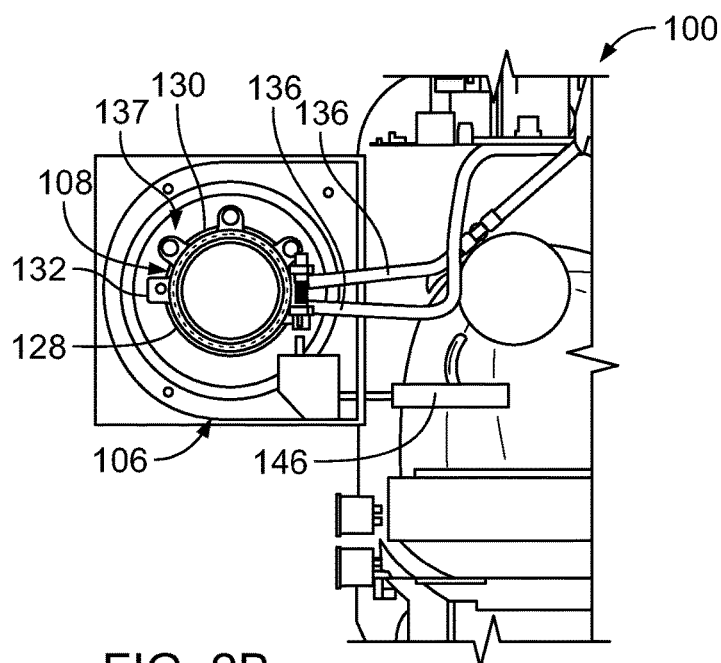
FIG. 2B is a top view of a portion of the machine without the housing and the pod-machine interface without the lid.
Figure 2C:
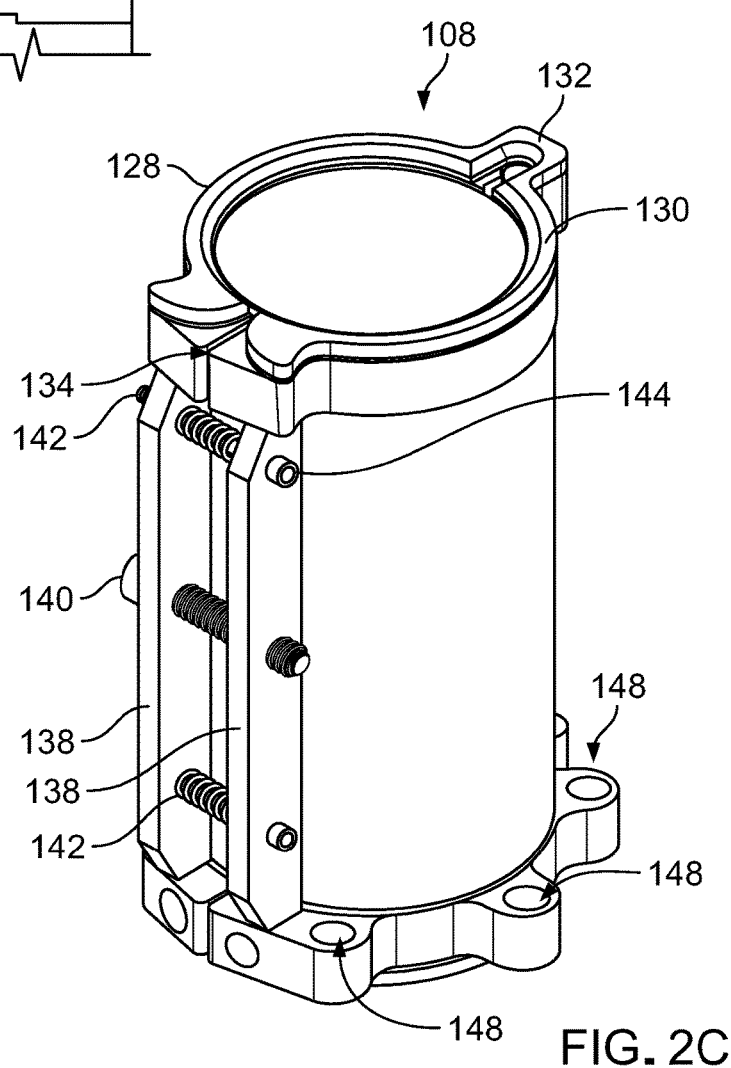
FIGS. 2C and 2D are, respectively, a perspective view and a side view of the evaporator.
Figure 2D:
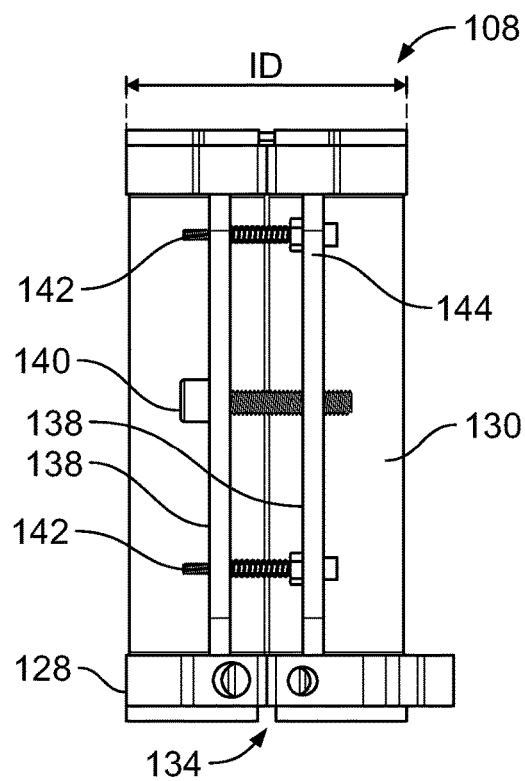

FIG. 2A is a perspective view of the machine 100 with the cover of the pod-machine interface 106 illustrated as being transparent to allow a more detailed view of the evaporator 108 to be seen. FIG. 2B is a top view of a portion of the machine 100 without housing 104 and the pod-machine interface 106 without the lid 112. FIGS. 2C and 2D are, respectively, a perspective view and a side view of the evaporator 108. The evaporator 108 is described in more detail in U.S. patent application Ser. No. 16/459,388 filed contemporaneously with this application and incorporated herein by reference in its entirety. This application also describes other evaporators and heat exchange systems that can be used in machines to cool food and drink in pods. Other pod-machine interfaces that can be used in this and other machines are described in U.S. patent application Ser. No. 16/459,176 filed contemporaneously with this application and incorporated herein by reference in its entirety.

The evaporator 108 has a clamshell configuration with a first portion 128 attached to a second portion 130 by a living hinge 132 on one side and separated by a gap 134 on the other side. Refrigerant flows to the evaporator 108 from other components of the refrigeration system through fluid channels 136 (best seen on FIG. 2B). The refrigerant flows through the evaporator 108 in internal channels through the first portion 128, the living hinge 132, and the second portion 130.

The space 137 (best seen on FIG. 2B) between the outer wall of the evaporator 108 and the inner wall of the casing of the pod-machine interface 106 is filled with an insulating material to reduce heat exchange between the environment and the evaporator 108. In the machine 100, the space 137 is filled with an aerogel (not shown). Some machines use other insulating material, for example, an annulus (such as an airspace), insulating foams made of various polymers, or fiberglass wool.

The evaporator 108 has an open position and a closed position. In the open position, the gap 134 provides an air gap between the first portion 128 and the second portion 130. In the machine 100, the first portion 128 and the second portion 130 are pressed together in the closed position. In some machines, the first and second portion are pressed towards each other and the gap is reduced, but still defined by a space between the first and second portions in the closed position.

The inner diameter ID of the evaporator 108 is slightly larger in the open position than in the closed position. Pods can be inserted into and removed from the evaporator 108 while the evaporator is in the open position. Transitioning the evaporator 108 from its open position to its closed position after a pod is inserted tightens the evaporator 108 around the outer diameter of the pod. For example, the machine 100 is configured to use pods with 2.085" outer diameter. The evaporator 108 has an inner diameter of 2.115" in the open position and an inner diameter inner diameter of 2.085" in the closed position. Some machines have evaporators sized and configured to cool other pods. The pods can be formed from commercially available can sizes, for example, "slim" cans with diameters ranging from 2.080 inches-2.090 inches and volumes of 180 milliliters (ml)-300 ml, "sleek" cans with diameters ranging from 2.250 inches-2.400 inches and volumes of 180 ml-400 ml and "standard" size cans with diameters ranging from 2.500 inches-2.600 inches and volumes of 200 ml-500 ml. The machine 100 is configured to use pods with 2.085 inches outer diameter. The evaporator 108 has an inner diameter of 2.115 inches in its open position and an inner diameter inner diameter of 2.085 inches in its closed position. Some machines have evaporators sized and configured to cool other pods. Standard cans are typically formed with a body having a closed end and sidewalls formed from a single piece of metal. Typically, the can is filled and then a separately formed base is attached across the open end of the body.

The closed position of evaporator 108 improves heat transfer between inserted pod 150 and the evaporator 108 by increasing the contact area between the pod 150 and the evaporator 108 and reducing or eliminating an air gap between the wall of the pod 150 and the evaporator 108. In some pods, the pressure applied to the pod by the evaporator 108 is opposed by the mixing paddles, pressurized gases within the pod, or both to maintain the casing shape of the pod.

In the evaporator 108, the relative position of the first portion 128 and the second portion 130 and the size of the gap 134 between them is controlled by two bars 138 connected by a bolt 140 and two springs 142. Each of the bars 138 has a threaded central hole through which the bolt 140 extends and two end holes engaging the pins 144. Each of the two springs 142 is disposed around a pin 144 that extends between the bars 138. Some machines use other systems to control the size of the gap 134, for example, circumferential cable systems with cables that extend around the outer diameter of the evaporator 108 with the cable being tightened to close the evaporator 108 and loosened to open the evaporator 108. In other evaporators, there are a plurality of bolts and end holes, one or more than two springs, and one or more than engaging pins.

One bar 138 is mounted on the first portion 128 of the evaporator 108 and the other bar 138 is mounted on the second portion 130 of the evaporator 108. In some evaporators, the bars 138 are integral to the body of the evaporator 108 rather than being mounted on the body of the evaporator. The springs 142 press the bars 138 away from each other. The spring force biases the first portion 128 and the second portion 130 of the evaporator 108 away from each at the gap 134. Rotation of the bolt 140 in one direction increases a force pushing the bars 138 towards each and rotation of the bolt in the opposite direction decreases this force. When the force applied by the bolt 140 is greater than the spring force, the bars 138 bring the first portion 128 and the second portion 130 of the evaporator together.

The machine 100 includes an electric motor 146 (shown on FIG. 2B) that is operable to rotate the bolt 140 to control the size of the gap 134. Some machines use other mechanisms to rotate the bolt 140. For example, some machines use a mechanical linkage, for example, between the lid 112 and the bolt 140 to rotate the bolt 140 as the lid 112 is opened and closed. Some machines include a handle that can be attached to the bolt to manually tighten or loosen the bolt. Some machines have a wedge system that forces the bars into a closed position when the machine lid is shut. This approach may be used instead of the electric motor 146 or can be provided as a backup in case the motor fails.

The electric motor 146 is in communication with and controlled by the processor 122 of the machine 100. Some electric drives include a torque sensor that sends torque measurements to the processor 122. The processor 122 signals to the motor to rotate the bolt 140 in a first direction to press the bars 138 together, for example, when a pod sensor indicates that a pod is disposed in the receptacle 110 or when the latch sensor 120 indicates that the lid 112 and pod-machine interface 106 are engaged. It is desirable that the clamshell evaporator be shut and holding the pod in a tightly fixed position before the lid closes and the shaft pierces the pod and engages the mixing paddle. This positioning can be important for drive shaft-mixing paddle engagement. The processor 122 signals to the electric drive to rotate the bolt 140 in the second direction, for example, after the food or drink being produced has been cooled/frozen and dispensed from the machine 100, thereby opening the evaporator gap 134 and allowing for easy removal of pod 150 from evaporator 108

The base of the evaporator 108 has three bores 148 (see FIG. 2C) which are used to mount the evaporator 108 to the floor of the pod-machine interface 106. All three of the bores 148 extend through the base of the second portion 130 of the evaporator 108. The first portion 128 of the evaporator 108 is not directly attached to the floor of the pod-machine interface 106. This configuration enables the opening and closing movement described above. Other configurations that enable the evaporator 108 opening and closing movement can also be used. Some machines have more or fewer than three bores 148. Some evaporators are mounted to components other than the floor of the pod-machine interface, for example, the dispensing mechanism.

FIGS. 3A-3F show components of the pod-machine interface 106 that are operable to open pods in the evaporator 108 to dispense the food or drink being produced by the machine 100. This is an example of one approach to opening pods but some machines and the associated pods use other approaches.

Figure 3A:
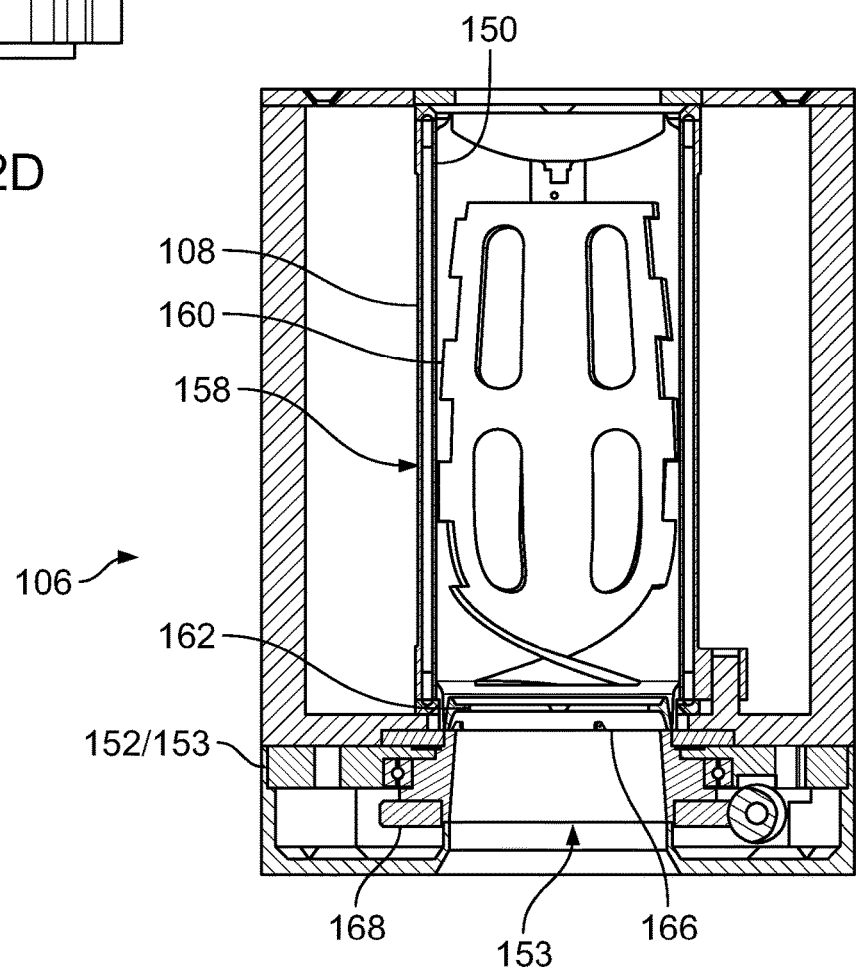
FIGS. 3A-3F show components of a pod-machine interface that are operable to open and close pods in the evaporator to dispense the food or drink being produced.
Figure 3B:
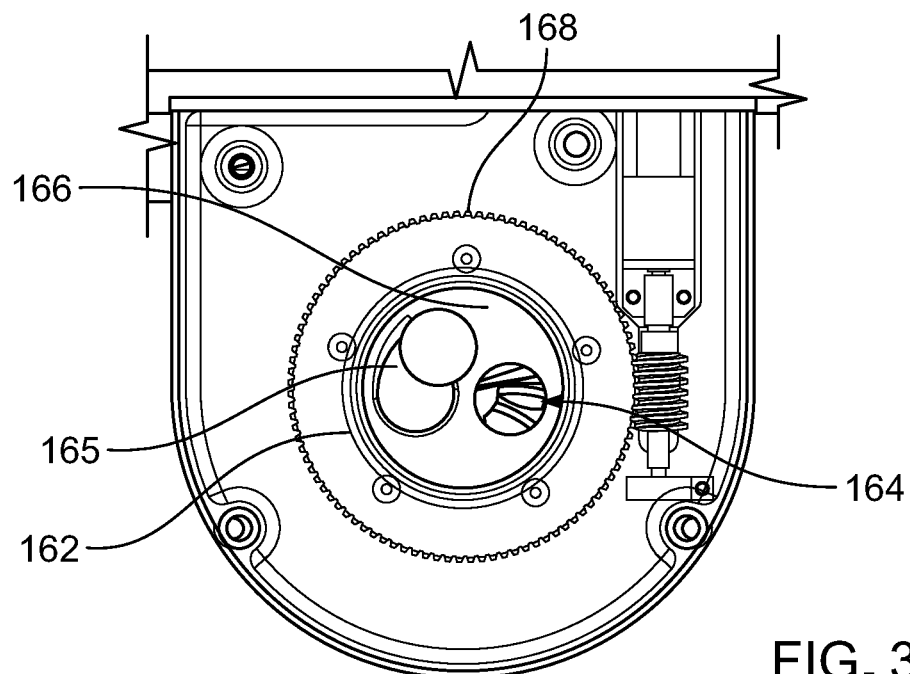
Figure 3C:
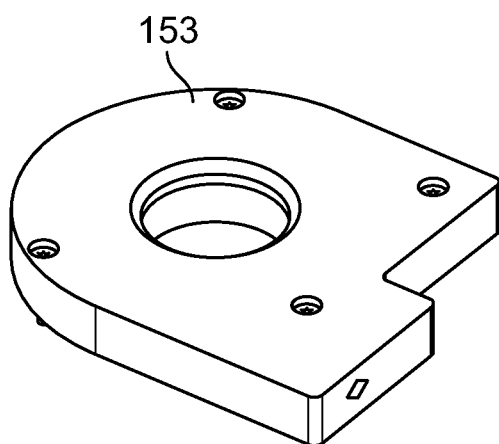
Figure 3D:
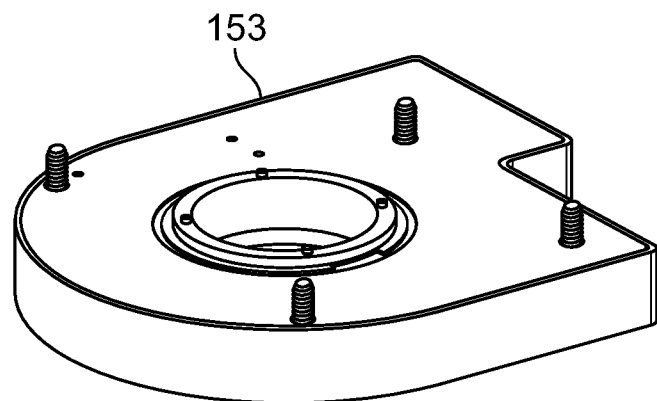
Figure 3E:
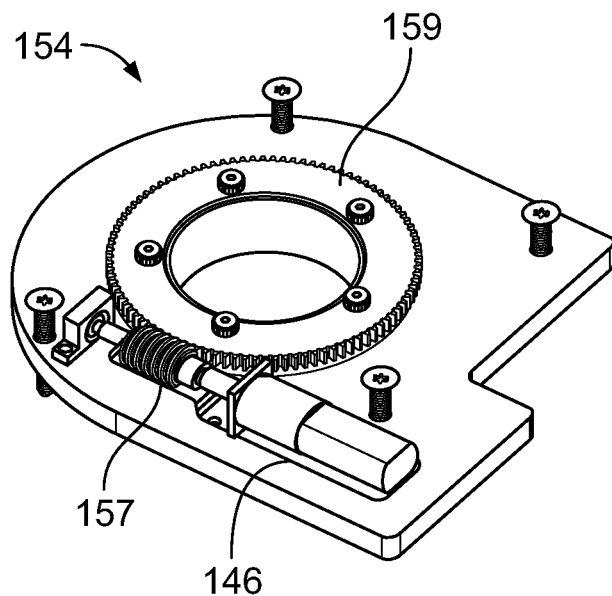
Figure 3F:
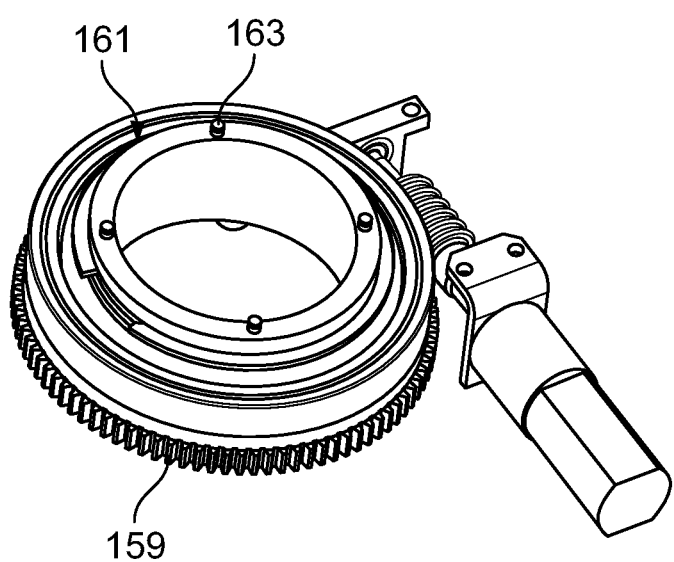

FIG. 3A is a partially cutaway schematic view of the pod-machine interface 106 with a pod 150 placed in the evaporator 108. FIG. 3B is a schematic plan view looking upwards that shows the relationship between the end of the pod 150 and the floor 152 of the pod-machine interface 106. The floor 152 of the pod-machine interface 106 is formed by a dispenser 153. FIGS. 3C and 3D are perspective views of a dispenser 153. FIGS. 3E and 3F are perspective views of an insert 154 that is disposed in the dispenser 153. The insert 154 includes an electric motor 146 operable to drive a worm gear 157 floor 152 of the pod-machine interface 106. The worm gear 157 is engaged with a gear 159 with an annular configuration. An annular member 161 mounted on the gear 159 extends from the gear 159 into an interior region of the pod-machine interface 106. The annular member 161 has protrusions 163 that are configured to engage with a pod inserted into the pod-machine interface 106 to open the pod. The protrusions 163 of the annular member 161 are four dowel-shaped protrusions. Some annular gears have more protrusions or fewer protrusions and the protrusions can have other shapes, for example, "teeth."

The pod 150 includes a body 158 containing a mixing paddle 160 (see FIG. 3A). The pod 150 also has a base 162 defining an aperture 164 and a cap 166 extending across the base 162 (see FIG. 3B). The base 162 is seamed/fixed onto the body 158 of the pod 150. The base 162 includes a protrusion 165. The cap 166 mounted over base 162 is rotatable around the circumference/axis of the pod 150. In use, when the product is ready to be dispensed from the pod 150, the dispenser 153 of the machine engages and rotates the cap 166 around the first end of the pod 150. Cap 166 is rotated to a position to engage and then separate the protrusion 165 from the rest of the base 162. The pod 150 and its components are described in more detail with respect to FIGS. 6A-10.

The aperture 164 in the base 162 is opened by rotation of the cap 166. The pod-machine interface 106 includes an electric motor 146 with threading that engages the outer circumference of a gear 168. Operation of the electric motor 146 causes the gear 168 to rotate. The gear 168 is attached to a annular member 161 and rotation of the gear 168 rotates the annular member 161. The gear 168 and the annular member 161 are both annular and together define a central bore through which food or drink can be dispensed from the pod 150 through the aperture 164 without contacting the gear 168 or the annular member 161. When the pod 150 is placed in the evaporator 108, the annular member 161 engages the cap 166 and rotation of the annular member 161 rotates the cap 166.

Figure 4:
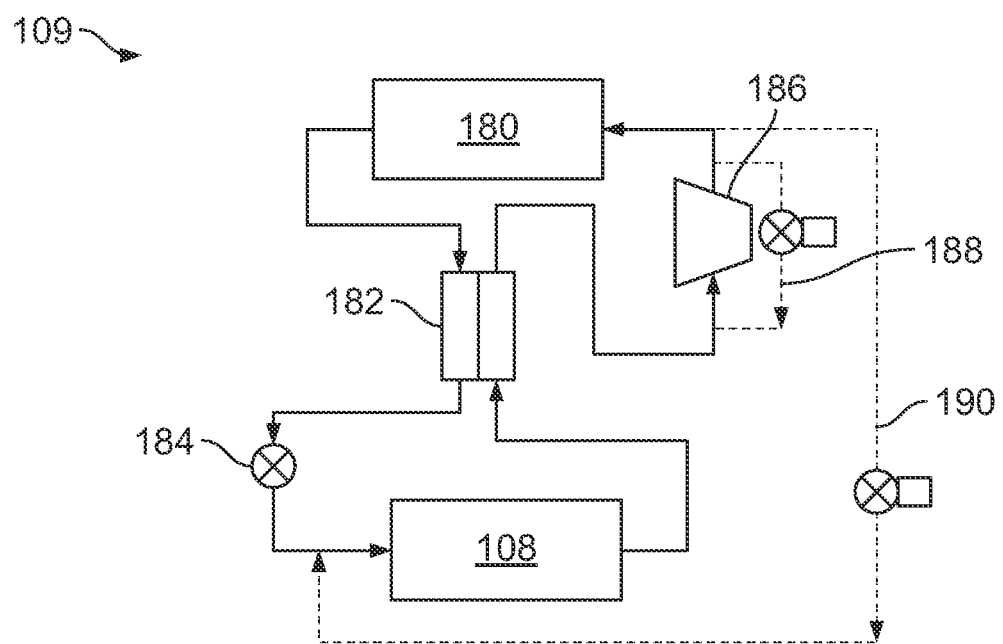
FIG. 4 is a schematic of a refrigeration system.

FIG. 4 is a schematic of the refrigeration system 109 that includes the evaporator 108. The refrigeration system also includes a condenser 180, a suction line heat exchanger 182, an expansion valve 184, and a compressor 186. High-pressure, liquid refrigerant flows from the condenser 180 through the suction line heat exchanger 182 and the expansion valve 184 to the evaporator 108. The expansion valve 184 restricts the flow of the liquid refrigerant fluid and lowers the pressure of the liquid refrigerant as it leaves the expansion valve 184. The low-pressure liquid then moves to the evaporator 108 where heat absorbed from a pod 150 and its contents in the evaporator 108 changes the refrigerant from a liquid to a gas. The gas-phase refrigerant flows from the evaporator 108 to the compressor 186 through the suction line heat exchanger 182. In the suction line heat exchanger 182, the liquid refrigerant cools gas-phase refrigerant before it enters the compressor 186. The refrigerant enters the compressor 186 as a low-pressure gas and leaves the compressor 186 as a high-pressure gas. The gas then flows to the condenser 180 where heat exchange cools and condenses the refrigerant to a liquid.

The refrigeration system 109 includes a first bypass line 188 and second bypass line 190. The first bypass line 188 directly connects the discharge of the compressor 186 to the inlet of the compressor 186. Diverting the refrigerant directly from the compressor discharge to the inlet can provide evaporator defrosting and temperature control without injecting hot gas to the evaporator that could reduce flow to the evaporator, increase the pressure in the evaporator and, in turn, raise the evaporator temperature above freezing. The first bypass line 188 also provides a means for rapid pressure equalization across the compressor 186, which allows for rapid restarting (i.e., freezing one pod after another quickly). The second bypass line 190 enables the application of warm gas to the evaporator 108 to defrost the evaporator 108.

Figure 5A:
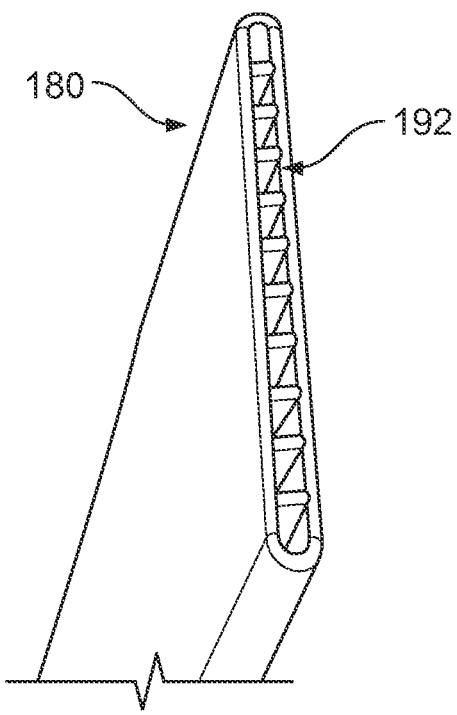
FIGS. 5A and 5B are views of a prototype of a condenser.
Figure 5B:
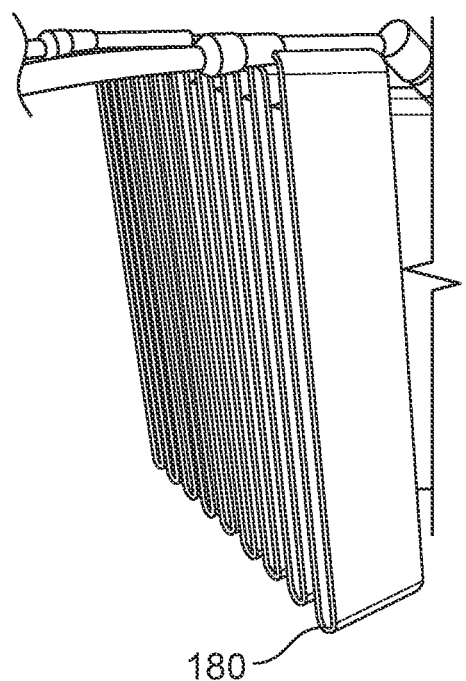

FIGS. 5A and 5B are views of a prototype of the condenser 180. The condenser has internal channels 192. The internal channels 192 increase the surface area that interacts with the refrigerant cooling the refrigerant quickly. These images show micro-channel tubing which are used because they have small channels which keeps the coolant velocity up and are thin wall for good heat transfer and have little mass to prevent the condenser for being a heat sink.

FIGS. 6A and 6B show an example of a pod 150 for use with the machine 100 described with respect to FIGS. 1A-3F. FIG. 6A is a side view of the pod 150. FIG. 6B is a schematic side view of the pod 150 and the mixing paddle 160 disposed in the body 158 of the pod 150.

The pod 150 is sized to fit in the receptacle 110 of the machine 100. The pods can be sized to provide a single serving of the food or drink being produced. Typically, pods have a volume between 6 and 18 fluid ounces. The pod 150 has a volume of approximately 8.5 fluid ounces.

The body 158 of the pod 150 is a can that contains the mixing paddle 160. The body 158 extends from a first end 210 at the base to a second end 212 and has a circular cross-section. The first end 210 has a diameter $D_{UE}$ that is slightly larger than the diameter $D_{LE}$ of the second end 212. This configuration facilitates stacking multiple pods 200 on top of one another with the first end 210 of one pod receiving the second end 212 of another pod.

A wall 214 connects the first end 210 to the second end 212. The wall 214 has a first neck 216, second neck 218, and a barrel 220 between the first neck 216 and the second neck 218. The barrel 220 has a circular cross-section with a diameter $D_B$. The diameter $D_B$ is larger than both the diameter $D_{UE}$ of the first end 210 and the diameter $D_{LE}$ of the second end 212. The first neck 216 connects the barrel 220 to the first end 210 and slopes as the first neck 216 extends from the smaller diameter $D_{UE}$ to the larger diameter $D_B$ the barrel 220. The second neck 218 connects the barrel 220 to the second end 212 and slopes as the second neck 218 extends from the larger diameter $D_B$ of the barrel 220 to the smaller diameter $D_{LE}$ of the second end 212. The second neck 218 is sloped more steeply than the first neck 216 as the second end 212 has a smaller diameter than the first end 210.

This configuration of the pod 150 provides increased material usage; i.e., the ability to use more base material (e.g., aluminum) per pod. This configuration further assists with the columnar strength of the pod.

The pod 150 is designed for good heat transfer from the evaporator to the contents of the pod. The body 158 of the pod 150 is made of aluminum and is between 5 and 50 microns thick. The bodies of some pods are made of other materials, for example, tin, stainless steel, and various polymers such as Polyethylene terephthalate (PTE).

Pod 150 may be made from a combination of different materials to assist with the manufacturability and performance of the pod. In one embodiment, the pod walls and the second end 212 may be made of Aluminum 3104 while the base may be made of Aluminum 5182.

In some pods, the internal components of the pod are coated with a lacquer to prevent corrosion of the pod as it comes into contact with the ingredients contained within pod. This lacquer also reduces the likelihood of "off notes" of the metal in the food and beverage ingredients contained within pod. For example, a pod made of aluminum may be internally coated with one or a combination of the following coatings: Sherwin Williams/Valspar V70Q11, V70Q05, 32SO2AD, 40Q60AJ; PPG Innovel 2012-823, 2012-820C; and/or Akzo Nobel Aqualure G1 50. Other coatings made by the same or other coating manufacturers may also be used.

Some mixing paddles are made of similar aluminum alloys and coated with similar lacquers/coatings. For example, Whitford/PPG coating 8870 may be used as a coating for mixing paddles. The mixing paddle lacquer may have additional non-stick and hardening benefits for mixing paddle.

FIGS. 7A-7C illustrate the engagement between the drive shaft 126 of the machine 100 and the mixing paddle 160 of a pod 150 inserted in the machine 100. FIGS. 7A and 7B are perspective views of the pod 150 and the drive shaft 126. In use, the pod 150 is inserted into the receptacle 110 of the evaporator 108 with the first end 210 of the pod 150 downward. This orientation exposes the second end 212 of the pod 150 to the drive shaft 126 as shown in FIG. 7A. Closing the lid 112 (see FIG. 1A) presses the drive shaft 126 against the second end 212 of the pod 150 with sufficient force that the drive shaft 126 pierces the second end 212 of the pod 150. FIG. 7B shows the resulting hole exposing the mixing paddle 160 with the drive shaft 126 offset for ease of viewing. FIG. 7C is a cross-section of a portion of the pod 150 with the drive shaft 126 engaged with the mixing paddle 160 after the lid is closed. Typically, there is not a tight seal between the drive shaft 126 and the pod 150 so that air can flow in as the frozen confection is evacuating/dispensing out the other end of the pod 150. In an alternative embodiment, there is a tight seal such that the pod 150 retains pressure in order to enhance contact between the pod 150 and evaporator 108.

Some mixing paddle contain a funnel or receptacle configuration that receives the punctured end of the second end of the pod when the second end is punctured by driveshaft.

Figure 8:
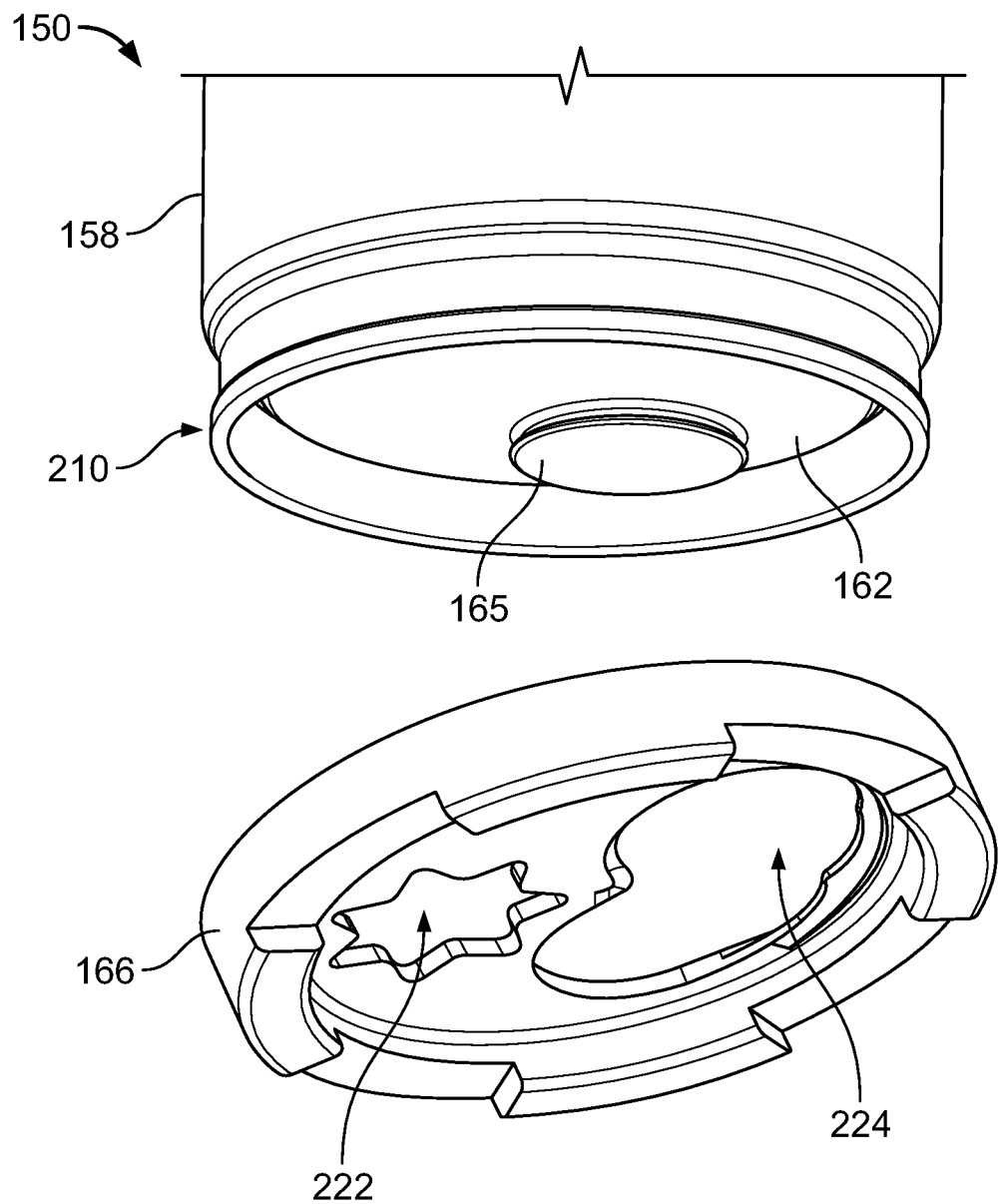
FIG. 8 shows a first end of a pod with its cap spaced apart from its base for ease of viewing.

FIG. 8 shows the first end 210 of the pod 150 with the cap 166 spaced apart from the base 162 for ease of viewing. FIGS. 9A-9G illustrate rotation of the cap 166 around the first end 210 of the pod 150 to cut and carry away protrusion 165 of base 162 and expose aperture 164 extending through the base 162.

The base 162 is manufactured separately from the body 158 of the pod 150 and then attached (for example, by crimping or seaming) to the body 158 of the pod 150 covering an open end of the body 158. The protrusion 165 of the base 162 can be formed, for example, by stamping, deep drawing, or heading a sheet of aluminum being used to form the base. The protrusion 165 is attached to the remainder of the base 162, for example, by a weakened score line 173. The scoring can be a vertical score into the base of the aluminum sheet or a horizontal score into the wall of the protrusion 165. For example, the material can be scored from an initial thickness of 0.008 inches to 0.010 inches to a post-scoring thickness of 0.001 inches-0.008 inches. In an alternative embodiment, there is no post-stamping scoring but rather the walls are intentionally thinned for ease of rupture. In another version, there is not variable wall thickness but rather the cap 166 combined with force of the machine dispensing mechanism engagement are enough to cut the 0.008 inches to 0.010 inches wall thickness on the protrusion 165. With the scoring, the protrusion 165 can be lifted and sheared off the base 162 with 5-75 pounds of force, for example between 15-40 pounds of force.

The cap 166 has a first aperture 222 and a second aperture 224. The first aperture approximately matches the shape of the aperture 164. The aperture 164 is exposed and extends through the base 162 when the protrusion 165 is removed. The second aperture 224 has a shape corresponding to two overlapping circles. One of the overlapping circles has a shape that corresponds to the shape of the protrusion 165 and the other of the overlapping circles is slightly smaller. A ramp 226 extends between the outer edges of the two overlapping circles. There is an additional 0.020" material thickness at the top of the ramp transition. This extra height helps to lift and rupture the protrusion's head and open the aperture during the rotation of the cap as described in more detail with reference to FIGS. 9A-9G.

Figure 9A:
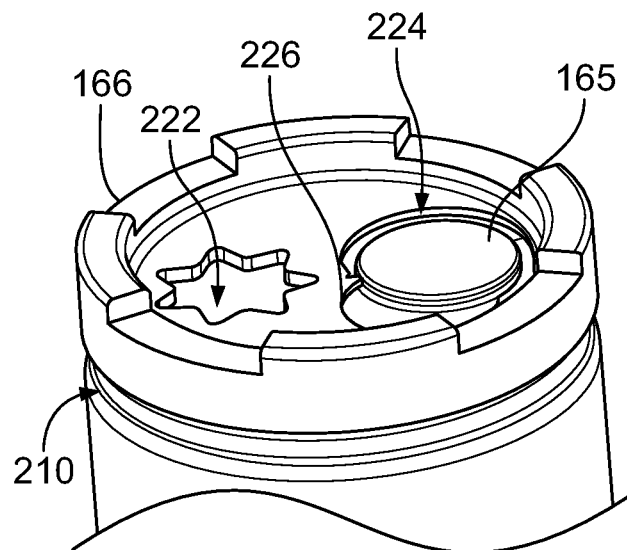
FIGS. 9A-9G illustrate rotation of a cap around the first end of the pod to open an aperture extending through the base.
Figure 9B:
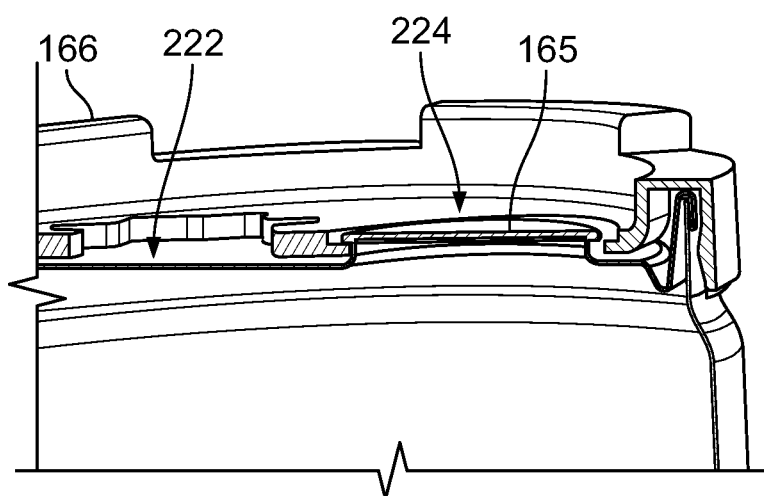
Figure 9C:
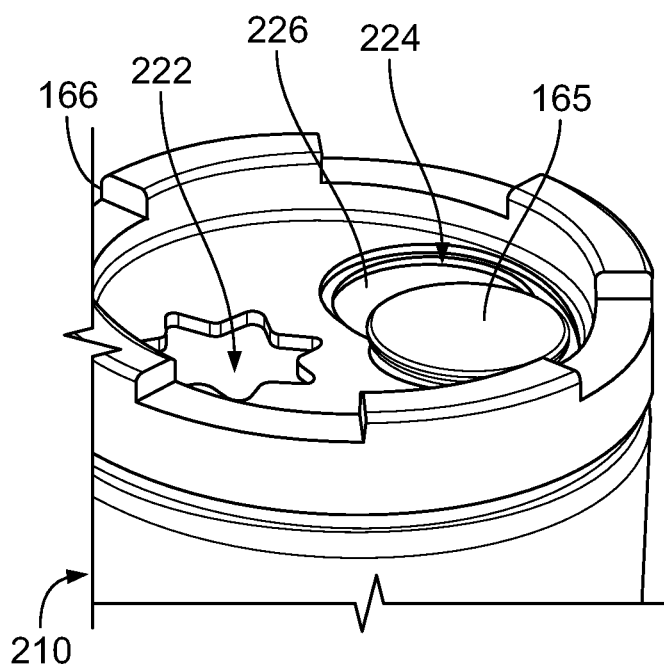
Figure 9D:
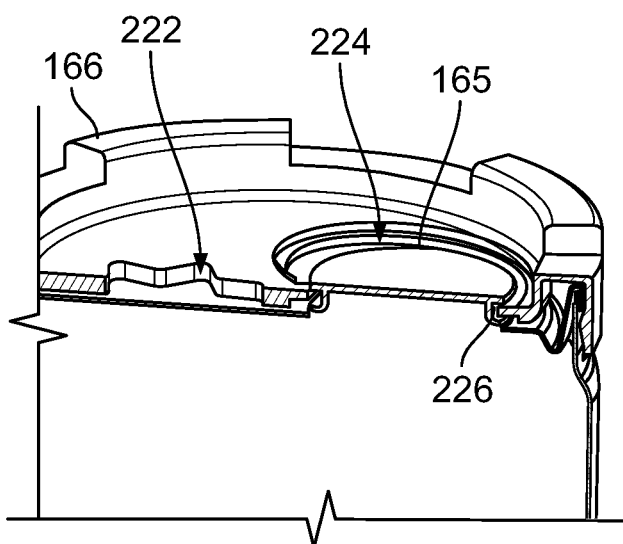
Figure 9E:
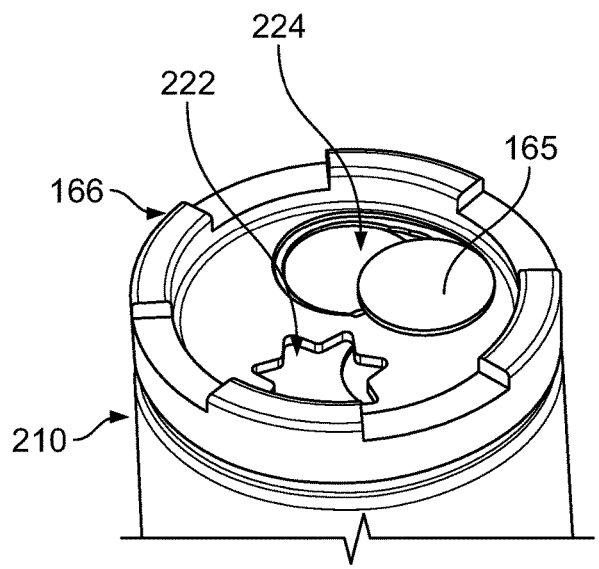
Figure 9F:
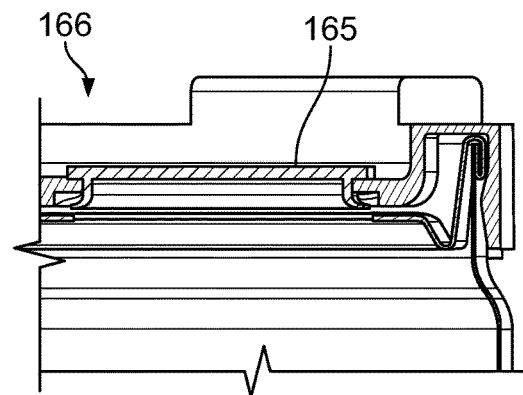
Figure 9G:
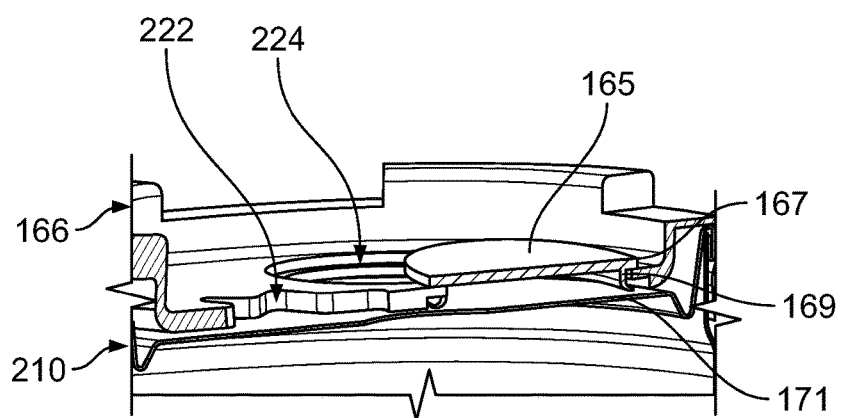

As shown in FIGS. 9A and 9B, the cap 166 is initially attached to the base 162 with the protrusion 165 aligned with and extending through the larger of the overlapping circles of the second aperture 224. When the processor 122 of the machine activates the electric motor 146 to rotate the gear 168 and the annular member 161, rotation of the cap 166 slides the ramp 226 under a lip of the protrusion 165 as shown in FIGS. 9C and 9D. Continued rotation of the cap 166 applies a lifting force that separates the protrusion 165 from the remainder of the base 162 (see FIGS. 9E-9G) and then aligns the first aperture 222 of the cap 166 with the aperture 164 in the base 162 resulting from removal of the protrusion 165.

Some pods include a structure for retaining the protrusion 165 after the protrusion 165 is separated from the base 162. In the pod 150, the protrusion 165 has a head 167, a stem 169, and a foot 171 (best seen in FIG. 9G). The stem 169 extends between the head 167 and the foot 171 and has a smaller cross-section that the head 167 and the foot 171. As rotation of the cap 166 separates the protrusion 165 from the remainder of the base 162, the cap 166 presses laterally against the stem 169 with the head 167 and the foot 171 bracketing the cap 166 along the edges of one of the overlapping circles of the second aperture 224. This configuration retains the protrusion 165 when the protrusion 165 is separated from the base 166. Such a configuration reduces the likelihood that the protrusion falls into the waiting receptacle that when the protrusion 165 is removed from the base.

Some pods include other approaches to separating the protrusion 165 from the remainder of the base 162. For example, in some pods, the base has a rotatable cutting mechanism that is riveted to the base. The rotatable cutting mechanism has a shape similar to that described relative to cap 166 but this secondary piece is riveted to and located within the perimeter of base 162 rather than being mounted over and around base 162. When the refrigeration cycle is complete, the processor 122 of the machine activates an arm of the machine to rotate the riveted cutting mechanism around a rivet. During rotation, the cutting mechanism engages, cuts and carries away the protrusion 165, leaving the aperture 164 of base 162 in its place.

In another example, some pods have caps with a sliding knife that moves across the base to remove the protrusion. The sliding knife is activated by the machine and, when triggered by the controller, slides across the base to separate, remove, and collect the protrusion 165. The cap 166 has a guillotine feature that, when activated by the machine, may slide straight across and over the base 162. The cap 166 engages, cuts, and carries away the protrusion 165. In another embodiment, this guillotine feature may be central to the machine and not the cap 166 of pod 150. In another embodiment, this guillotine feature may be mounted as a secondary piece within base 162 and not a secondary mounted piece as is the case with cap 166.

Some pods have a dispensing mechanism that includes a pop top that can be engaged and released by the machine. When the refrigeration cycle is complete, an arm of the machine engages and lifts a tab of the pod, thereby pressing the puncturing the base and creating an aperture in the base. Chilled or frozen product is dispensed through the aperture. The punctured surface of the base remains hinged to base and is retained inside the pod during dispensing. The mixing avoids or rotates over the punctured surface or, in another embodiment, so that the mixing paddle continues to rotate without obstruction. In some pop tops, the arm of the machine separates the punctured surface from the base.

Figure 10:
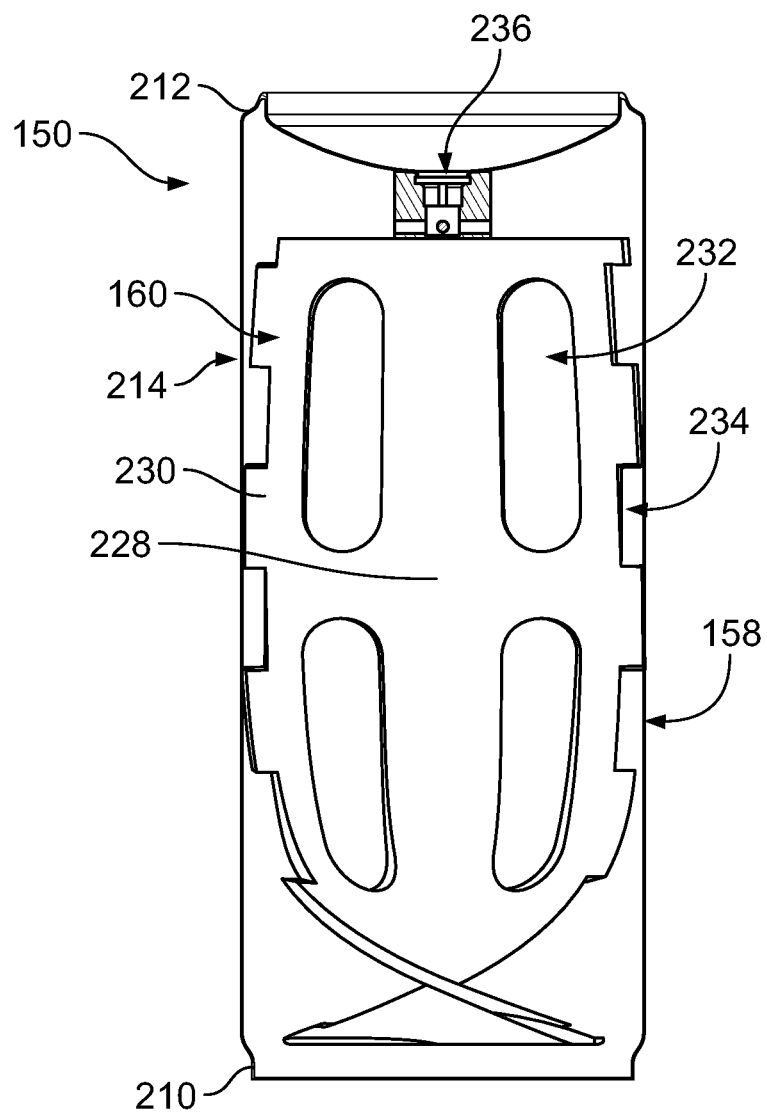
FIG. 10 is an enlarged schematic side view of a pod.

FIG. 10 is an enlarged schematic side view of the pod 150. The mixing paddle 160 includes a central stem 228 and two blades 230 extending from the central stem 228. The blades 230 are helical blades shaped to churn the contents of the pod 150 and to remove ingredients that adhere to inner surface of the body 158 of the pod 150. Some mixing paddles have a single blade and some mixing paddles have more than two mixing paddles.

Fluids (for example, liquid ingredients, air, or frozen confection) flow through openings 232 in the blades 230 when the mixing paddle 160 rotates. These openings reduce the force required to rotate the mixing paddle 160. This reduction can be significant as the viscosity of the ingredients increases (e.g., as ice cream forms). The openings 232 further assist in mixing and aerating the ingredients within the pod.

The lateral edges of the blades 230 define slots 234. The slots 234 are offset so that most of the inner surface of the body 158 is cleared of ingredients that adhere to inner surface of the body by one of the blades 230 as the mixing paddle 160 rotates. Although the mixing paddle is 160 wider than the first end 210 of the body 158 of the pod 150, the slots 234 are alternating slots that facilitate insertion of the mixing paddle 160 into the body 158 of the pod 150 by rotating the mixing paddle 160 during insertion so that the slots 234 are aligned with the first end 210. In another embodiment, the outer diameter of the mixing paddle are less than the diameter of the pod 150 opening, allowing for a straight insertion (without rotation) into the pod 150. In another embodiment, one blade on the mixing paddle has an outer-diameter that is wider than the second blade diameter, thus allowing for straight insertion (without rotation) into the pod 150. In this mixing paddle configuration, one blade is intended to remove (e.g., scrape) ingredients from the sidewall while the second, shorter diameter blade, is intended to perform more of a churning operation.

Some mixing paddles have one or more blades that are hinged to the central stem. During insertion, the blades can be hinged into a condensed formation and released into an expanded formation once inserted. Some hinged blades are fixed open while rotating in a first direction and collapsible when rotating in a second direction, opposite the first direction. Some hinged blades lock into a fixed, outward, position once inside the pod regardless of rotational directions. Some hinged blades are manually condensed, expanded, and locked.

The mixing paddle 160 rotates clockwise and removes frozen confection build up from the pod 214 wall. Gravity forces the confection removed from the pod wall to fall towards first end 210. In the counterclockwise direction, the mixing paddle 160 rotate, lift and churn the ingredients towards the second end 212. When the paddle changes direction and rotates clockwise the ingredients are pushed towards the first end 210. When the protrusion 165 of the base 162 is removed as shown and described with respect to FIG. 9D, clockwise rotation of the mixing paddle dispenses produced food or drink from the pod 150 through the aperture 164. Some paddles mix and dispense the contents of the pod by rotating a first direction. Some paddles mix by moving in a first direction and a second direction and dispense by moving in the second direction when the pod is opened.

The central stem 228 defines a recess 236 that is sized to receive the drive shaft 126 of the machine 100. The recess and drive shaft 126 have a square cross section so that the drive shaft 126 and the mixing paddle 160 are rotatably constrained. When the motor rotates the drive shaft 126, the drive shaft rotates the mixing paddle 160. In some embodiments, the cross section of the drive shaft is a different shape and the cross section of the recess is compatibly shaped. In some cases the drive shaft and recess are threadedly connected. In some pods, the recess contains a mating structure that grips the drive shaft to rotationally couple the drive shaft to the paddle.

Figure 11:
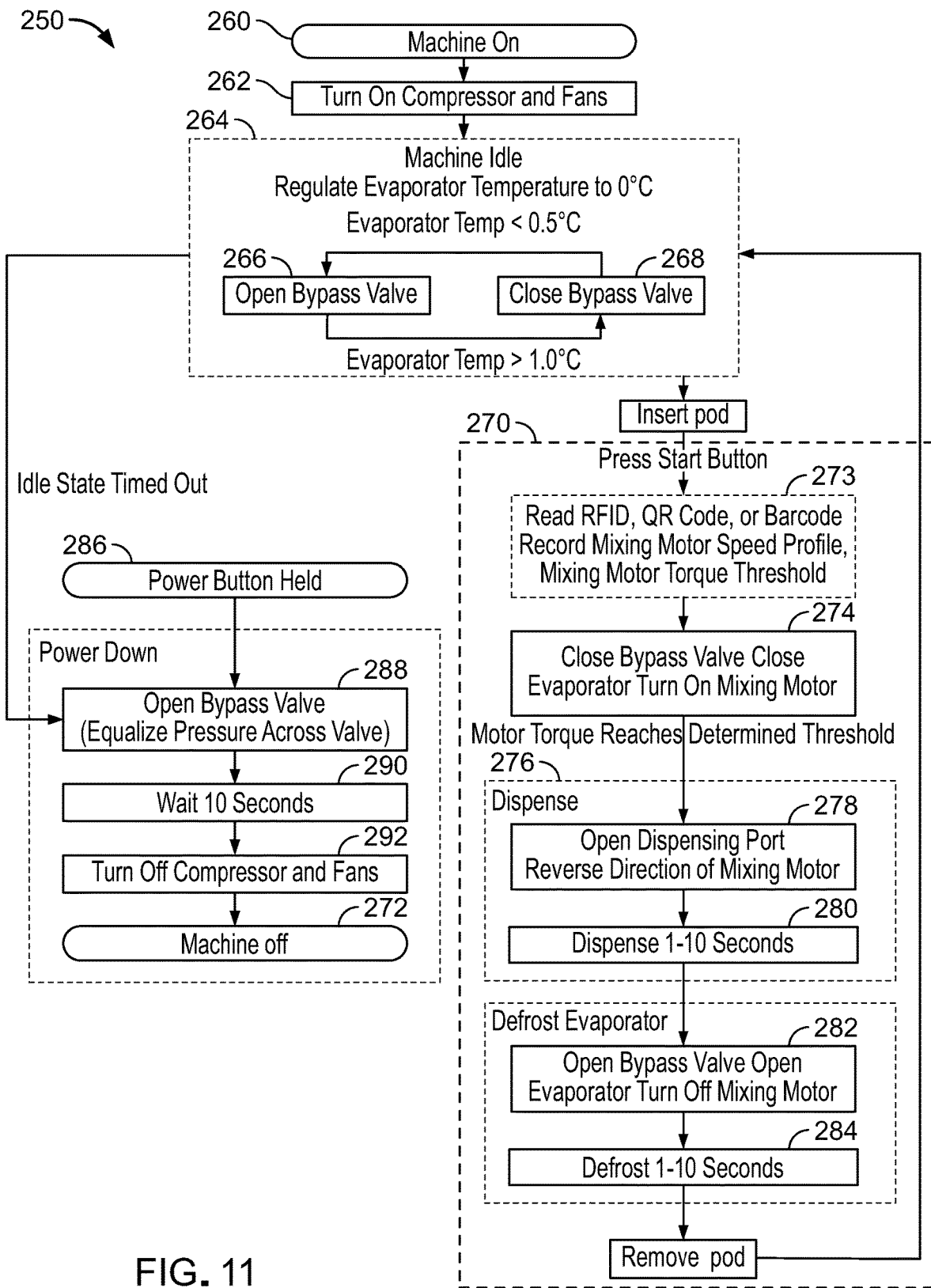
FIG. 11 is a flow chart of a method for operating a machine for producing cooled food or drinks.

FIG. 11 is a flow chart of a method 250 implemented on the processor 122 for operating the machine 100. The method 250 is described with references to refrigeration system 109 and machine 100. The method 250 may also be used with other refrigeration systems and machines. The method 250 is described as producing soft serve ice cream but can also be used to produce other cooled or frozen drinks and foods.

The first step of the method 250 is to turn the machine 100 on (step 260) and turn on the compressor 186 and the fans associated with the condenser 180 (step 262). The refrigeration system 109 then idles at regulated temperature (step 264). In the method 250, the evaporator 108 temperature is controlled to remain around 0.75° C. but may fluctuate by ±0.25° C. Some machines are operated at other idle temperatures, for example, from 0.75° C. to room temperature (22.0° C.). If the evaporator temperature is below 0.5° C., the processor 122 opens the bypass valve 190 to increase the heat of the system (step 266). When the evaporator temperature goes over 1° C., the bypass valve 190 is closed to cool the evaporator (step 268). From the idle state, the machine 100 can be operated to produce ice cream (step 270) or can shut down (step 272).

After inserting a pod, the user presses the start button. When the user presses the start button, the bypass valve 190 closes, the evaporator 108 moves to its closed position, and the motor 124 is turned on (step 274). In some machines, the evaporator is closed electronically using a motor. In some machines, the evaporator is closed mechanically, for example by the lid moving from the open position to the closed position. In some systems, a sensor confirms that a pod 150 is present in the evaporator 108 before these actions are taken.

Some systems include radio frequency identification (RFID) tags or other intelligent bar codes such as UPC bar or QR codes. Identification information on pods can be used to trigger specific cooling and mixing algorithms for specific pods. These systems can optionally read the RFID, QR code, or barcode and identify the mixing motor speed profile and the mixing motor torque threshold (step 273).

The identification information can also be used to facilitate direct to consumer marketing (e.g., over the internet or using a subscription model). This approach and the systems described in this specification enable selling ice cream thru e-commerce because the pods are shelf stable. In the subscription mode, customers pay a monthly fee for a predetermined number of pods shipped to them each month. They can select their personalized pods from various categories (e.g., ice cream, healthy smoothies, frozen coffees or frozen cocktails) as well as their personalized flavors (e.g., chocolate or vanilla).

The identification can also be used to track each pod used. In some systems, the machine is linked with a network and can be configured to inform a vendor as to which pods are being used and need to be replaced (e.g., through a weekly shipment). This method is more efficient than having the consumers go to the grocery store and purchase pods.

These actions cool the pod 150 in the evaporator 108 while rotating the mixing paddle 160. As the ice cream forms, the viscosity of the contents of the pod 150 increases. A torque sensor of the machine measures the torque of the motor 124 required to rotate the mixing paddle 160 within the pod 150. Once the torque of the motor 124 measured by a torque sensor satisfies a predetermined threshold, the machine 100 moves into a dispensing mode (276). The dispensing port opens and the motor 124 reverses direction (step 278) to press the frozen confection out of the pod 150. This continues for approximately 1 to 10 seconds to dispense the contents of the pod 150 (step 280). The machine 100 then switches to defrost mode (step 282). Frost that builds up on the evaporator 108 can reduce the heat transfer efficiency of the evaporator 108. In addition, the evaporator 108 can freeze to the pod 150, the first portion 128 and second portion 130 of the evaporator can freeze together, and/or the pod can freeze to the evaporator. The evaporator can be defrosted between cycles to avoid these issues by opening the bypass valve 170, opening the evaporator 108, and turning off the motor 124 (step 282). The machine then diverts gas through the bypass valve for about 1 to 10 seconds to defrost the evaporator (step 284). The machine is programmed to defrost after every cycle, unless a thermocouple reports that the evaporator 108 is already above freezing. The pod can then be removed. The machine 100 then returns to idle mode (step 264). In some machines, a thermometer measures the temperature of the contents of pod 150 and identifies when it is time to dispense the contents of the pod. In some machines, the dispensing mode begins when a predetermined time is achieved. In some machines, a combination of torque required to turn the mixing paddle, temperature of the pod, and/or time determines when it is time to dispense the contents of the pod.

If the idle time expires, the machine 100 automatically powers down (step 272). A user can also power down the machine 100 by holding down the power button (286). When powering down, the processor opens the bypass valve 190 to equalize pressure across the valve (step 288). The machine 100 waits ten seconds (step 290) then turns off the compressor 186 and fans (step 292). The machine is then off.

Figure 12A:
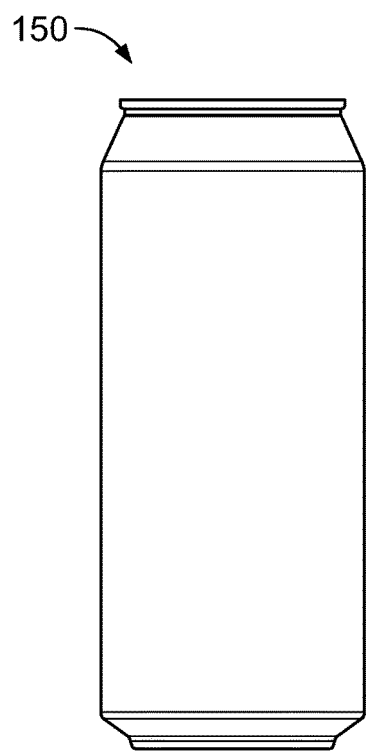
FIG. 12A is a front view of a pod that has a volume of twelve fluid ounces.
Figure 12B:
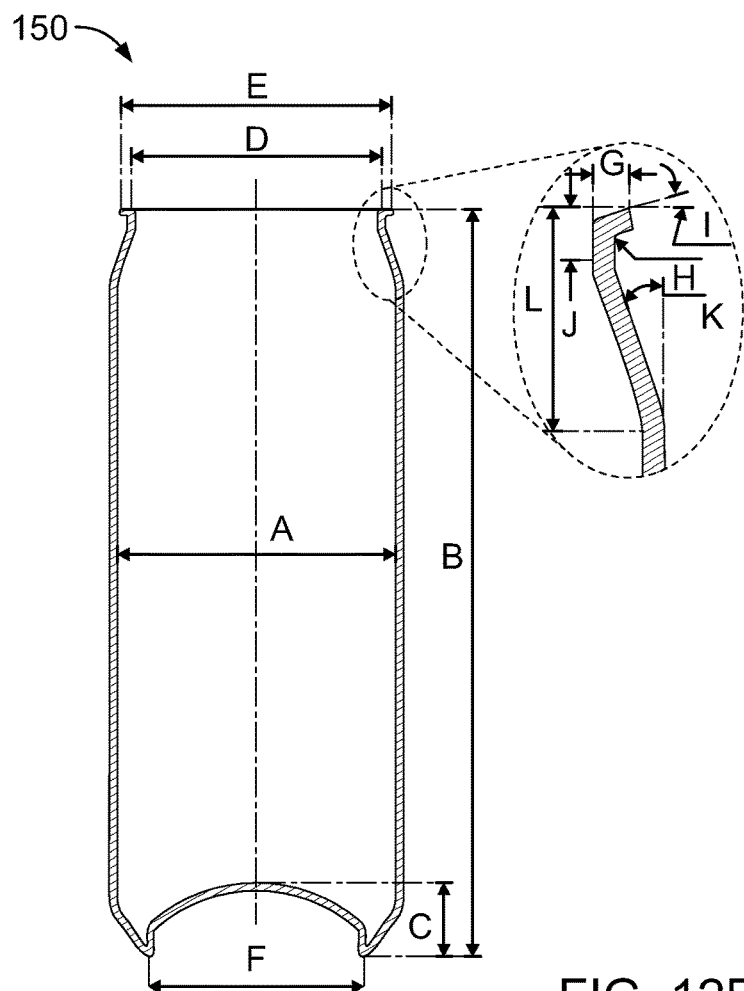
FIG. 12B is a schematic view of the pod of FIG. 12A.

FIG. 12A is a front view of a pod 150 that has a volume of eight fluid ounces. FIG. 12B is a cross-sectional view of the pod 150 that showing various features whose specifications are indicated on Table 1.

TABLE 1

| Item | Description | mm | +/− | inch | +/− |
|---|---|---|---|---|---|
| A | Outside Body Diameter | 53.070 | 0.01 | 2.0894 | 0.0004 |
| B | Factory Finished Can Height | 134.09 | 0.25 | 5.279 | 0.010 |
| C | Dome Depth | 9.70 | 0.13 | 0.382 | 0.005 |
| D | Neck Plug Diameter | 50.00 | 0.13 | 1.969 | 0.005 |
| E | Flange Diameter | 54.54 | max | 2.147 | max |
| F | Stand Diameter | 46.36 | ref | 1.825 | ref |
| G | Flange Width | 2.10 | 0.20 | 0.083 | 0.008 |
| H | Over Flange Radius | 1.55 | ref | 0.061 | ref |
| I | Flange Angle | 0-7 | deg | 0-7 | deg |
| J | Seaming Clearance | 3.05 | min | 0.120 | min |
| K | Neck Angle | 33.0 | deg | 33.0 | deg |
| L | Neck Height | 9.80 | ref | 0.386 | ref |
| 1 | Dome Reversal Pressure (min) | 6.32 | Bar | 93 | PSI |
| 2 | Axial Load Strength (min) | 85 | KG | 834 | N |
| 3 | Freeboard | 14.1 | ref | 0.56 | ref |
| 4 | Brimful Capacity (ml) | 279 | 3 | 279 | 3 |

Figure 12C:
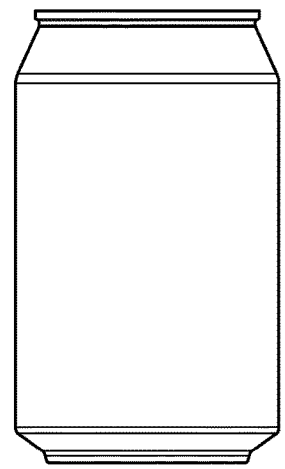
FIG. 12C is a front view of a pod that has a volume of eight fluid ounces.

Some pods have different volumes and/or shapes. For example, a pod 300 shown in FIG. 12C has a volume of eight fluid ounces. Other pods have a volume of 16 fluid ounces. Table 2 includes a variety of pod volumes and diameters.

TABLE 2

| Name | Volume (milliliters) | Volume (fluid ounces) | Diameter (Inches) |
|---|---|---|---|
| Standard Beverage Pod 1 | 250 | 8.45 | 2.500-2.600 |
| Standard Beverage Pod 2 | 330 | 11.15 | 2.500-2.600 |
| Standard Beverage Pod 3 | 355 | 12.00 | 2.500-2.600 |
| Standard Beverage Pod 4 | 375 | 12.68 | 2.500-2.600 |
| Standard Beverage Pod 5 | 440 | 14.87 | 2.500-2.600 |
| Standard Beverage Pod 6 | 500 | 16.90 | 2.500-2.600 |
| Slim Pod 1 | 200 | 6.76 | 2.085-2.200 |
| Slim Pod 2 | 250 | 8.45 | 2.085-2.200 |
| Slim Pod 3 | 300 | 10.14 | 2.085-2.200 |
| Sleek Pod 1 | 300 | 10.14 | 2.250-2.400 |
| Sleek Pod 2 | 350 | 11.15 | 2.250-2.400 |
| Sleek Pod 3 | 355 | 12.00 | 2.250-2.400 |

Figure 13A:
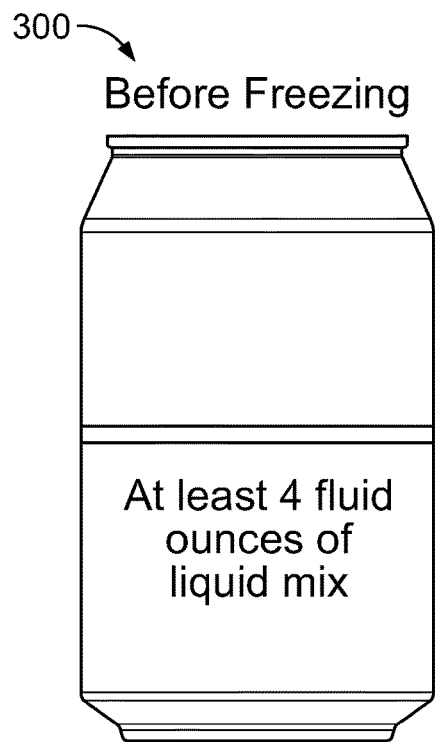
FIGS. 13A and 13B show the pod of FIG. 12B before and after freezing.
Figure 13B:
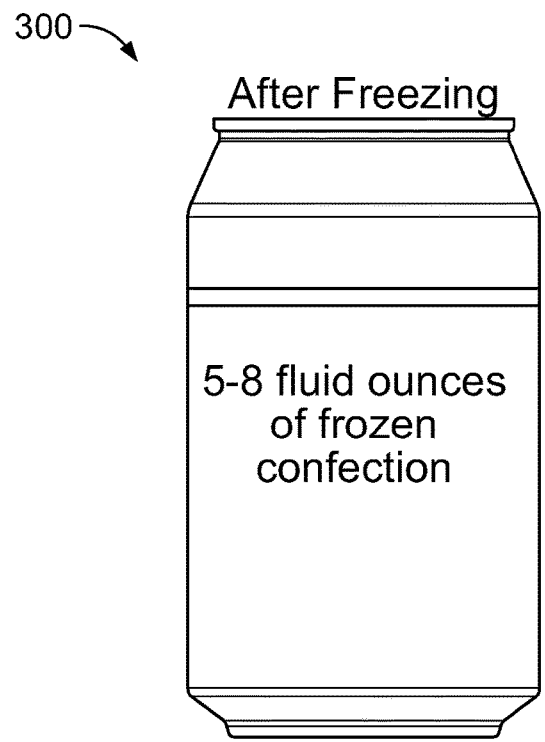

FIG. 13A shows the pod 300 before inserting the pod 300 into the evaporator 108 and FIG. 13B shows the pod 300 after cooling and before dispensing the contents of the pod 300. In FIG. 13A, the pod 300 includes four fluid ounces of liquid ingredients. The pod 300 can be stored at room temperature or refrigerated prior to insertion into the evaporator 108. After the pod 300 is inserted into the evaporator 108, mixed using the internal mixing paddle 160, and cooled to freeze the contents, "loft" associated with the aeration of the ingredients brings the overall volume of the pod contents to 5-8 fluid ounces.

Figure 14:
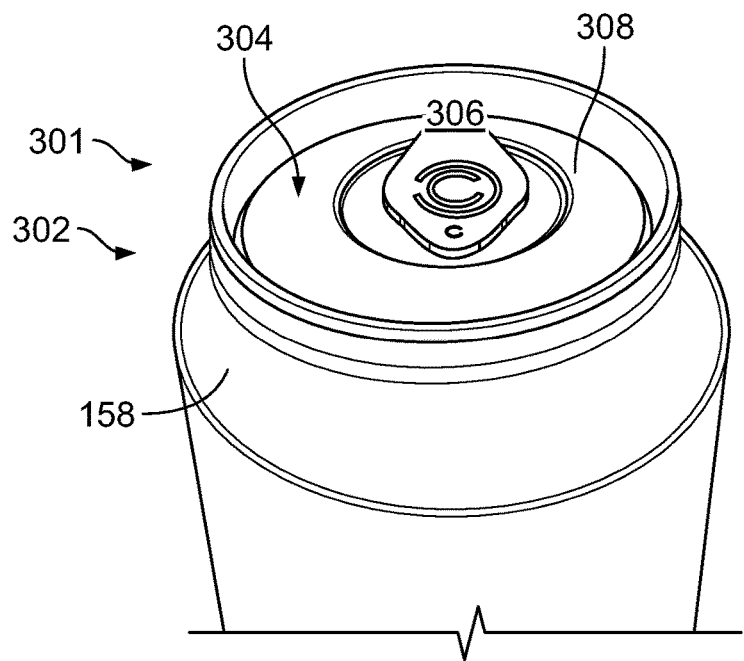
FIG. 14 is a perspective view of a first end of a pod with a detachable paddle interface.

FIG. 14 is a perspective view of the second end 302 of a pod 301. The pod 301 is substantially similar to the pod 150. However, the second end 302 of the pod 301 includes a paddle interface 304 that is detachable from the body 158. The pod 301 can then be recycled by separating the plastic mixing paddle (not shown) from the aluminum body of the pod. The paddle interface 304 detaches by rotating a flange 306 connected to the central stem of the mixing paddle. The flange 306 and central stem are translationally coupled but not rotationally coupled. Rotating the flange 306 unlocks the paddle from engagement with the pod 301. A user can then pull the paddle out through a central aperture 308 defined by the second end 302 of the pod 301.

Figure 15A:
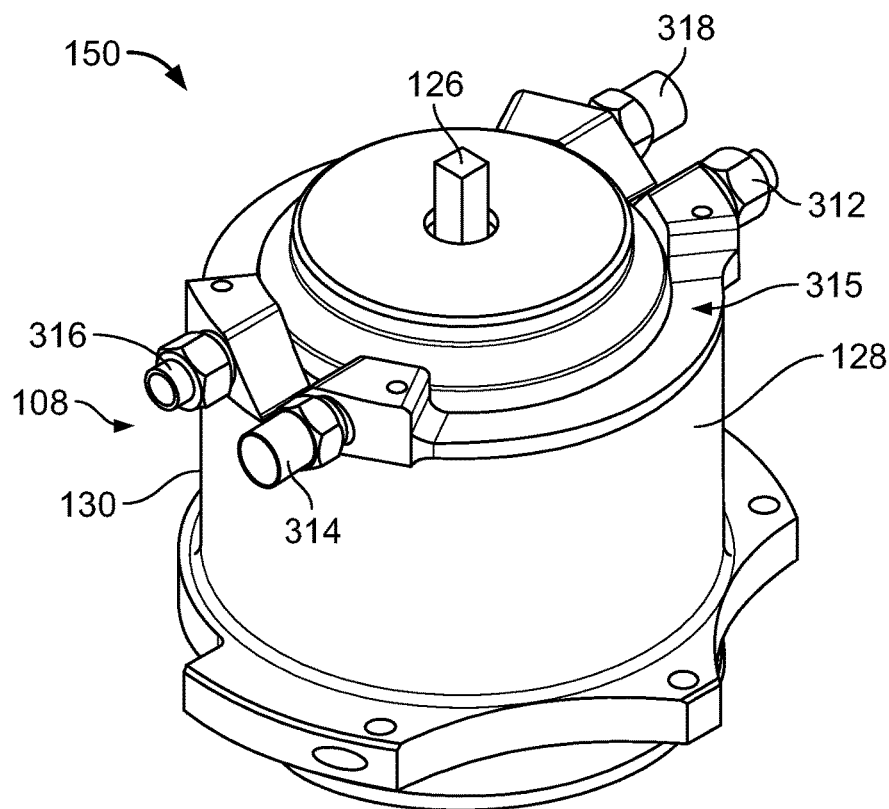
FIGS. 15A and 15B are, respectively a perspective view and a cross-sectional view of a pod in an evaporator.

FIG. 15A is a perspective view and a cross-sectional view of the pod 150 in the evaporator 108. In FIG. 15A, a cover 315 is disposed on the evaporator 108. The cover 315 includes a first fluid inlet 312, a first fluid outlet 314, a second fluid inlet 316, and a second fluid outlet 318. The first fluid inlet 312 and first fluid outlet 314 are fluidly connected by a first flow path defined by channels within the first portion 128. The second fluid inlet 316 and second fluid outlet 318 are fluidly connected by a second flow path defined by channels within the second portion 130. The first flow path and the second flow path are independent of each other.

Figure 15B:
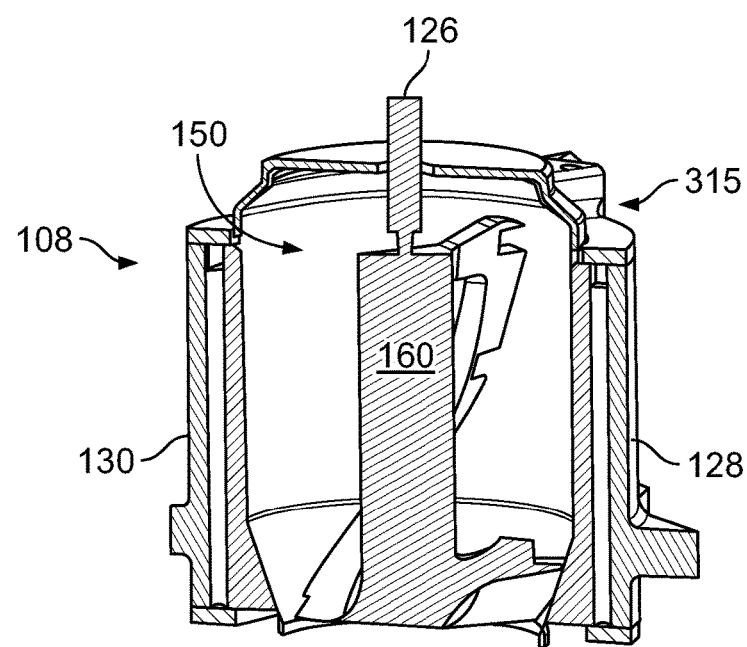

FIG. 15B is a cross-sectional view of the evaporator 108 and pod 150 with mixing paddle 160. The drive shaft 126 passes thru the second end 212 of the pod 150 and engages the paddle 160 when the evaporator 108 is in the closed position.

FIGS. 16-21G show various dispensing mechanisms and assemblies that can be mounted on or integrated into pods and/or mixing paddles. The dispensing mechanisms described expose an opening (e.g., a dispensing port or an aperture) to fluidly connect the environment with the interior of the pod.

Figure 16:
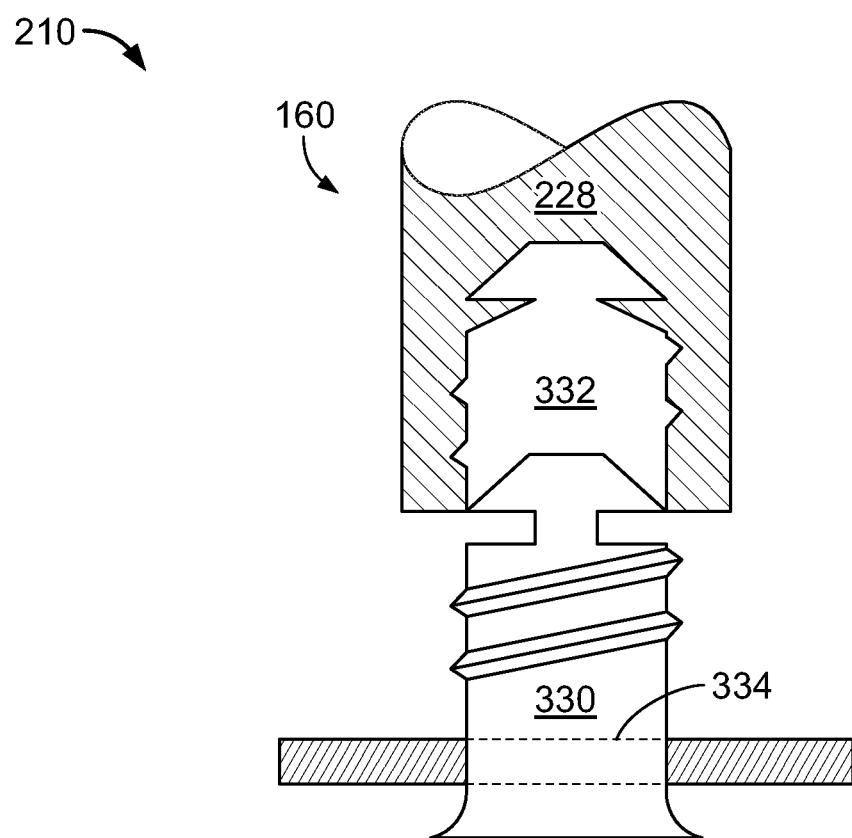
FIG. 16 is a schematic view illustrating a threaded plug and a complimentary threaded recess defined in the central stem of a mixing paddle.

FIG. 16 is a schematic view of system that includes a threaded plug 330 and a complimentary threaded recess 332 defined in the central stem 228 of a mixing paddle. The threaded plug 330 and threaded recess 332 rotate and translate relative to each other to open an aperture 334 defined in the first end 210 of the pod. The plug 330 abuts the stem 228 such that rotation in a counter-clockwise direction engages the threads on the plug 330 with the threaded recess 332. Further rotation of the central stem 228 pulls the plug 330 into the recess 332, eventually exposing the aperture 334 defined in the first end 210 of the pod. Counter-clockwise rotation of the paddle 160 churns the contents of the pod downwards, through the aperture 334. Clockwise rotation of the mixing paddle 160 churns the contents of the pod upwards, away from the aperture 334. Initially the plug 330 and recess 332 abut in such a manner that the when the paddle 160 rotates clockwise, the threaded plug 330 and the threaded recess 332 do not engage each other.

Figure 17A:
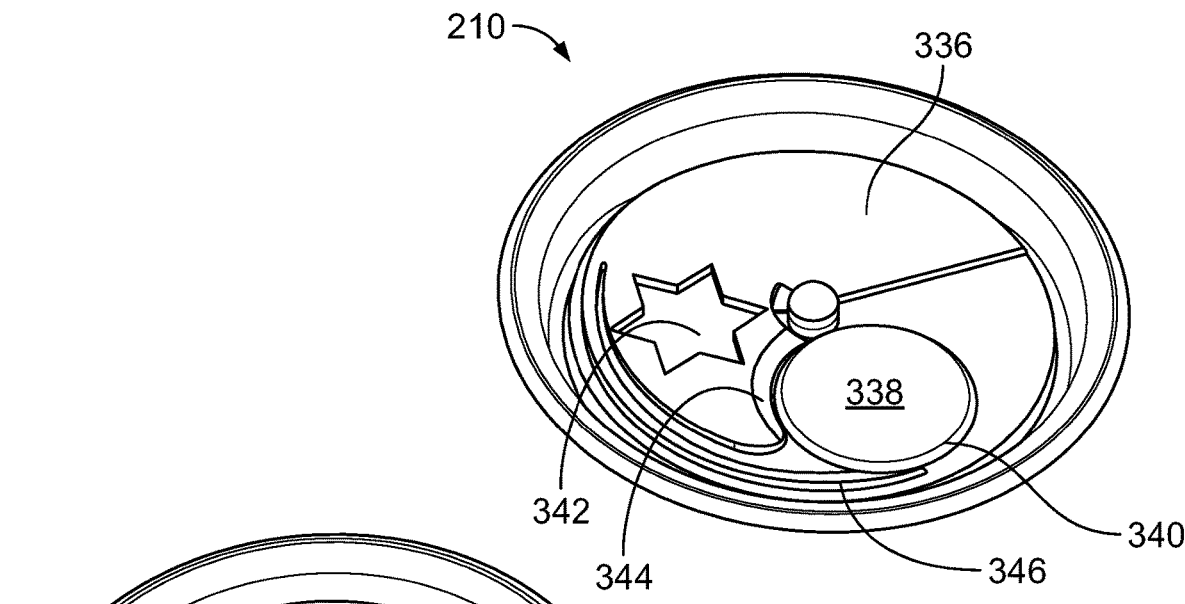
FIGS. 17A-17C are perspective views of a plate mounted to the first end of a pod.
Figure 17B:
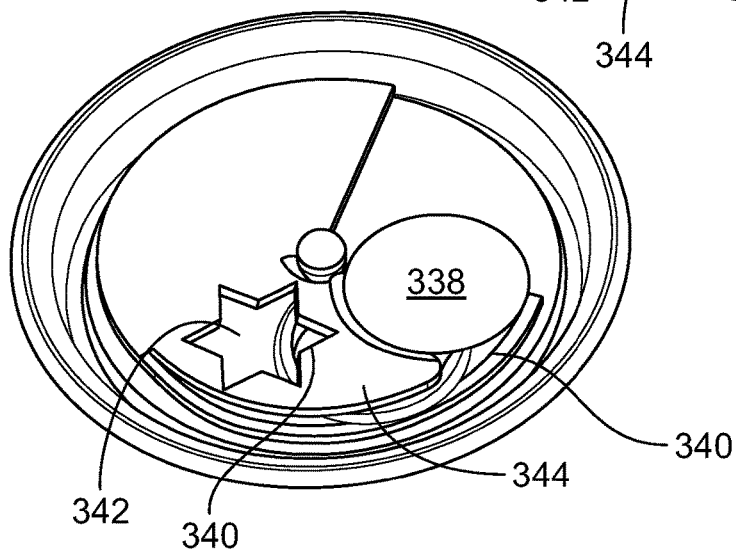
Figure 17C:
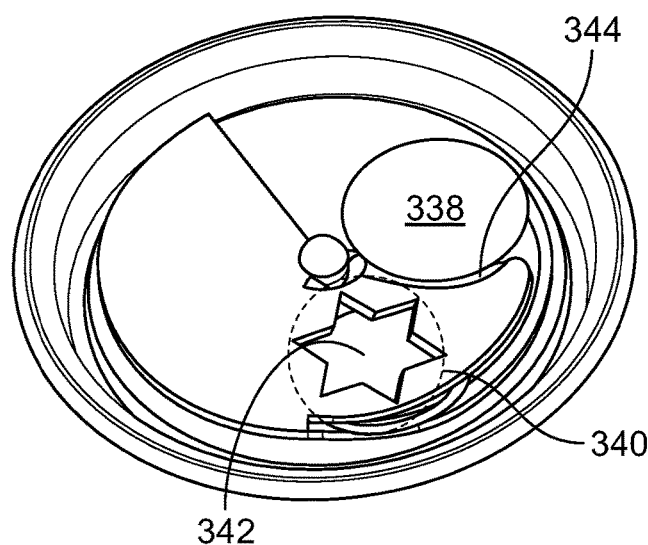

FIGS. 17A-17C are perspective views of a cap 336 rotatably mounted to the first end 210 of a pod. A foil seal 338 covers a dispensing port 340 defined in the first end 210 of the pod. The cap 336 defines an opening 342 sized similarly to the dispensing port 340. A scraper is used to remove the foil when it is time to dispense the contents of the pod. The cap 336 has a knife-edge 344 that functions as the scraper.

The cap 336 and foil 338 are initially positioned as shown in FIG. 17A. When the contents of the pod are ready to be dispensed, the machine 100 rotates the cap 336 in a counterclockwise direction. As the cap 336 rotates, the knife-edge 344 scrapes and detaches the foil seal 338 from first end 210, exposing the dispensing port 340 as shown in FIG. 17B. An arm 346 projects from the cap 336 to engage the detached seal 338 and keep it from falling into the food or drink being dispensed. The cap 336 continues to rotate in a counterclockwise direction until the dispensing port 340 and the opening 342 align, as shown in FIG. 17C. At this point, the paddle 160 rotates to churn the contents of the pod in a downward direction out the dispensing port 340.

FIGS. 17D and 17E show first end 210 of the pod without the cap 336. FIG. 17D shows the foil seal 338 covering the dispensing port 340. FIG. 17E is a perspective view of the first end 210 without the foil seal 338. The foil seal 338 seals the liquid, semi-solid, and/or solid contents of the pod during sterilization, transit, and storage. The diameter of the dispensing port 340 is about ⅝ of an inch. Some dispensing ports are other sizes (e.g., 0.2 to 1 inches in diameter).

Figure 18B:
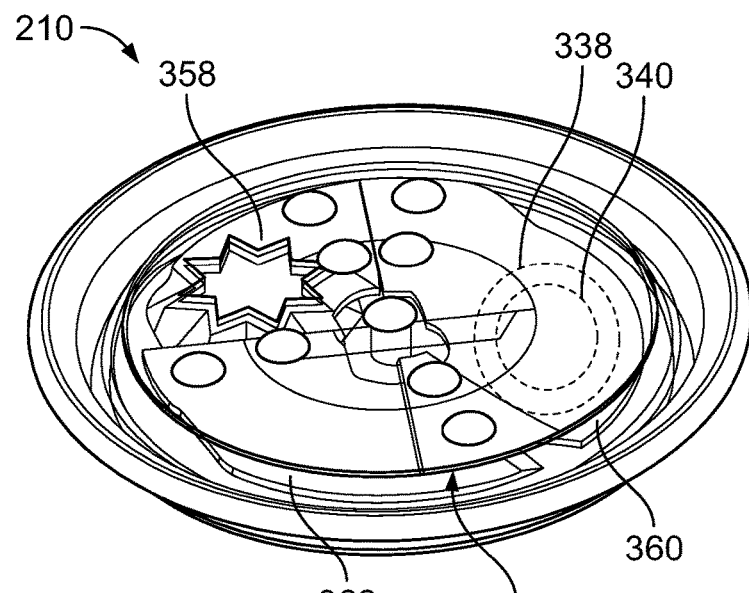
FIGS. 18B-18D are perspective views of the rotatable base.
Figure 18C:
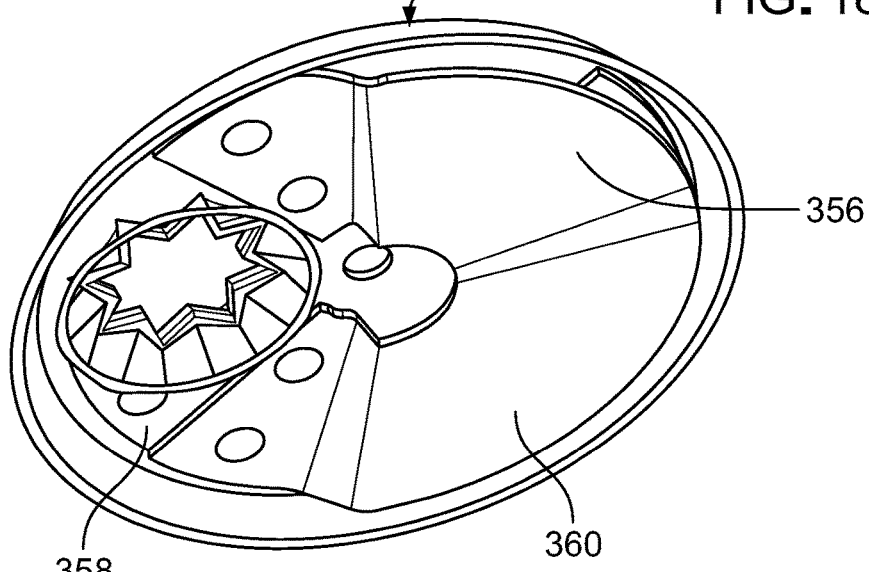
Figure 18D:
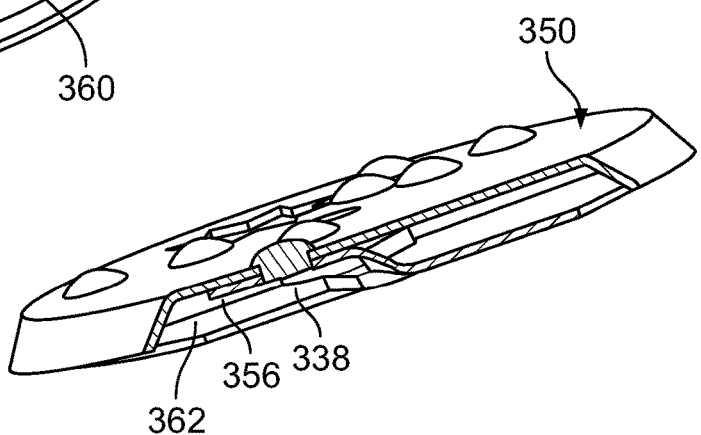

FIGS. 18A-18D are perspective views of the first end 210 of a pod with a rotatable cap 350. FIGS. 18B-18D are perspective views of the cap 350 shown in FIG. 18A. In these figures, the cap 350 is illustrated as being transparent to make it easier to describe the inner components are visible. Typically, caps are opaque.

The cap 350 is attached to the first end 210 of the pod using a rivet 352. The cap 350 covers the first end 210 of the pod and a foil seal 338 initially disposed covering the dispensing port 340 of the pod.

FIG. 18B shows a top perspective view of the cap 350 with a knife-edge 356, a nozzle 358, and a support plate 360. The knife-edge 356, support plate 360, and nozzle 358 are rotatably coupled to the cap 350 and move between a closed position to a dispensing position. The closed position of the cap 350 is shown in FIGS. 18A and 18B. The dispensing position is shown in FIG. 18C. In the closed position, the support plate 360 covers the dispensing port 340 and the foil seal. In the dispensing position, the nozzle 358 aligns with the dispensing port 340 and the foil seal 338 is disposed on an upper surface of the knife-edge 356.

The cap 350 rotates to move the nozzle 358, knife-edge 356, and support plate 360 from the initial position to the dispensing position. As the plate rotates, the knife scrapes the foil seal and removes the foil seal from its position covering the dispensing port 340. The cap 350 continues to rotate and the knife-edge 356 covers the dispensing port. The seal 338 moves up the knife-edge 356, guided by the support plate 360 and engages the knife-edge 356, as shown in FIG. 18D. The cap 350 rotates further and the nozzle 358 aligns with the dispensing port 340. The paddle 160 rotates in a direction that churns the contents of the pod downward towards the dispensing port 340. The support plate 360 serves strengthens and supports to the overall first end 210 during the sterilization process (e.g., retort or HPP) when internal and external pressures may otherwise cause the end to be compromised.

Figure 19A:
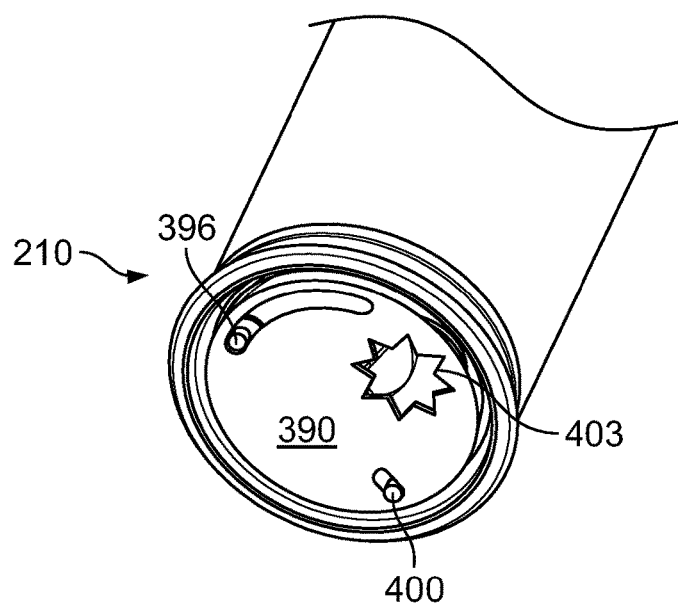
FIGS. 19A and 19B show a plate rotatably connected to the first end of a pod.
Figure 19B:
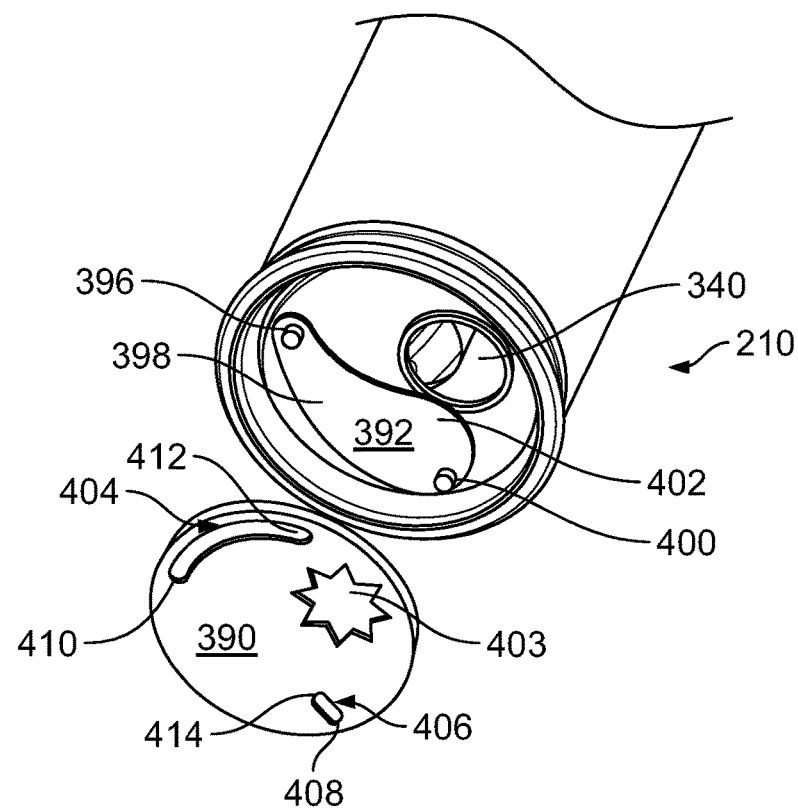

FIGS. 19A and 19B show a cap 389 including plate 390 and a slider 392. The cap 389 is rotatably connected to the first end 210 of a pod. The slider 392 is disposed between the plate 390 and the first end 210 of the pod. A hinge 396 fastens a first end 398 of the slider 392 to the first end 210 of the pod. A boss 400 extends from a second end 402 of the slider 392. The plate 390 defines an aperture 403, an arced guide track 404, and a linear guide track 406. The arced guide track 404 engages the hinge 396 of the first end 210 of the pod 150. The linear guide track 406 engages the boss 400 of the slider 392.

FIG. 19A shows the plate 390 and the slider 392 in an open position in which the aperture 403 is aligned and in fluid connection with the dispensing port 340. In the open position, the boss 400 is at a first end 408 of the linear guide track 406 and the hinge 396 is at a first end 410 of the arced guide track 404. In the closed position, the second end 402 of the slider 392 covers the dispensing port 340. The hinge 396 abuts a second end 412 of the arced guide track 404 and the boss 400 abuts a second end 414 of the linear guide track 406.

To move from the open position to the closed position, the plate 390 is rotated counterclockwise. The hinge 396 follows the arced guide track 404 from the first end 410 to the second end 412. The boss 400 also moves along the linear guide track 406 from the first end 408 to the second end 414. The rotation of the plate 390 moves the second end 402 of the slider 392 to cover the dispensing port 340. When the hinge 396 is at the second end 412 of the arced guide track 404, the slider 392 fully covers the dispensing port 340.

To move from the closed position to the open position, the plate 390 is rotated clockwise. The hinge 396 follows the arced guide track 404 from the second end 412 to the first end 410. The boss 400 also moves along the linear guide track 406 from the second end 414 to the first end 408. The clockwise rotation of the plate 390 moves the second end 402 of the slider 392 to expose the dispensing port 340. When the hinge 396 is at the first end 410 of the arced guide track 404, the aperture 403 is aligned and in fluid communication with the dispensing port 340, as shown in FIG. 19A.

Figure 20A:
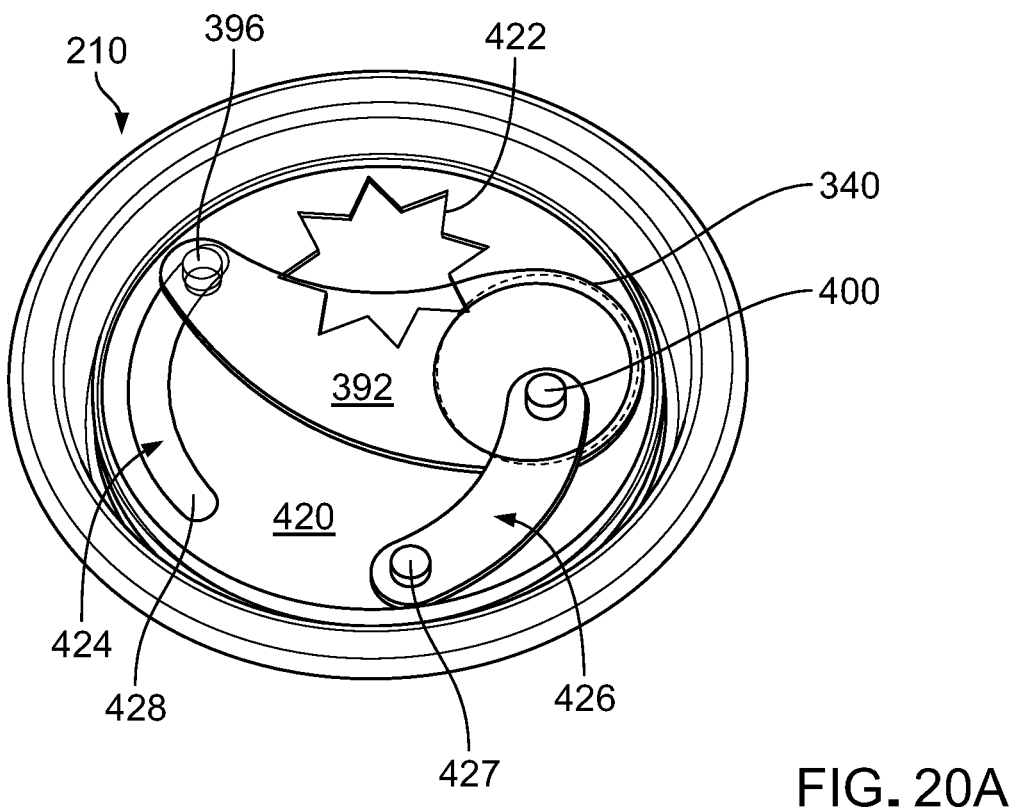
FIGS. 20A and 20B are views of a plate disposed on the first end of a pod.
Figure 20B:
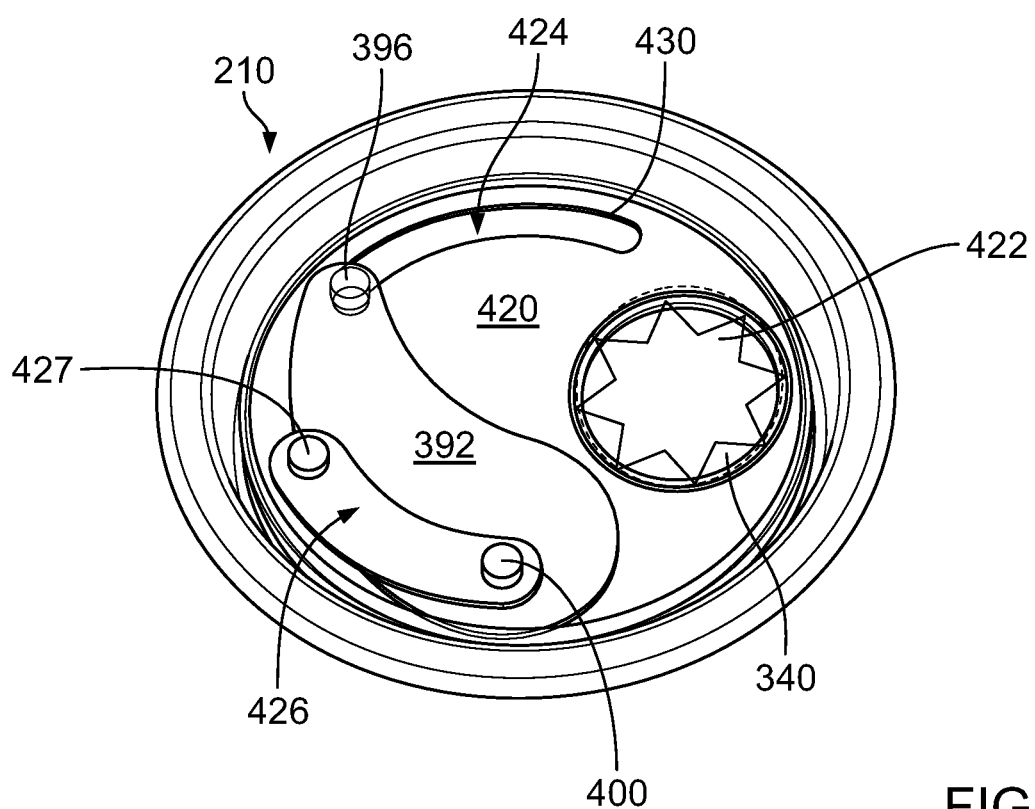

FIGS. 20A and 20B are views of a plate 420 disposed on the first end 210 of a pod. The plate defines an aperture 422 and an arced guide track 424. The slider 392 is disposed between the plate 420 and the first end 210 of the pod 150. A link arm 426 is disposed between the slider 392 and the plate 420. As described with reference to FIG. 19A, the slider 392 is connected to the first end 210 of the pod 150 by the hinge 396. The boss 400 extends from the slider 392 and acts as a hinge, rotatably and translationally connecting the second end 402 of the slider 392 to the link arm 426. The link arm 426 includes a projection 427 that acts as a hinge, rotationally and translationally connecting the plate 420 and the link arm 426.

FIG. 20A shows the plate 420, slider 392, and link arm 426 in the closed position. The second end 402 of the slider 392 covers the dispensing port 340. FIG. 20B shows the plate 420 in the open position, in which the aperture 422 is aligned and fluidly connected with the dispensing port 340.

The plate 420 operates similarly to plate 390. In the open position, the hinge 396 is positioned at a first end 428 of the arced guide track 424. In the closed position, the hinge 396 is positioned at a second end 430 of the arced guide track 424. The plate 420 rotates to move the arced guide track 424 relative to the hinge 396.

To move from the closed position, shown in FIG. 20A, to the open position, shown in FIG. 20B, the plate 420 rotates clockwise. The projection 427 rotates with the plate 420 and pulls the link arm 426 clockwise. The boss 400 that connects the link arm 426 to the slider 392 pulls the second end 402 of the slider 392 clockwise, exposing the dispensing port 340. The aperture 422 rotates clockwise to align with the dispensing port 340. When the hinge 396 abuts the first end 428 of the arced guide track 424, the aperture 422 is aligned with the dispensing port 340.

To move from the open position, shown in FIG. 20B, to the closed position, shown in FIG. 20A, the plate 420 rotates counterclockwise. The projection 427 rotates with the plate 420 and pushes the link arm 426 counterclockwise. The boss 400 that connects the link arm 426 to the slider 392 pushes the second end 402 of the slider 392 counterclockwise, covering the dispensing port 340 with the second end 402 of the slider 392. The aperture 422 rotates counterclockwise moving out of alignment with the dispensing port 340. When the hinge 396 abuts the second end 430 of the arced guide track 424, the second end 402 of the slider 392 covers the dispensing port 340.

Figure 21A:
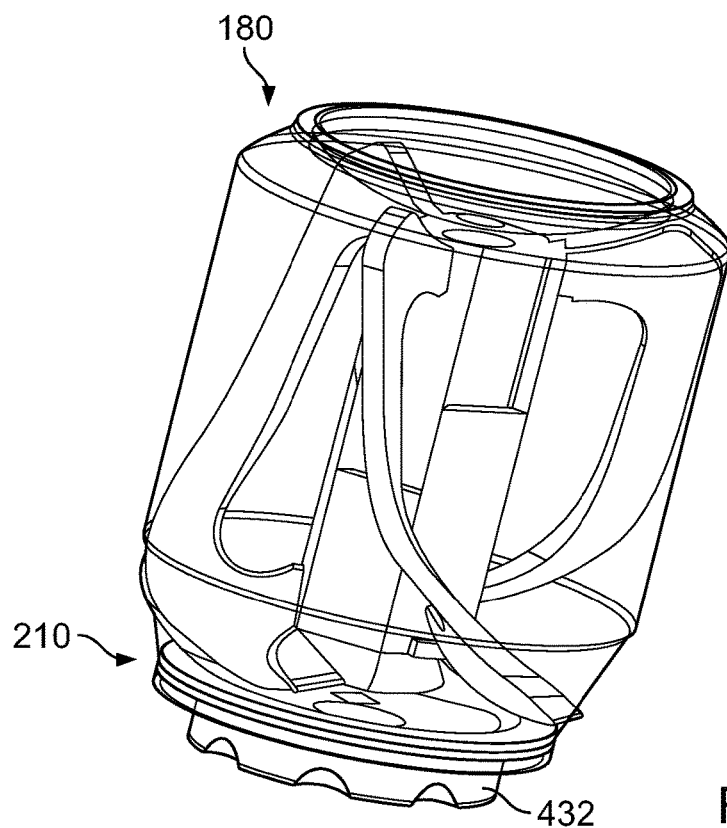
FIG. 21A is a perspective view of a pod with the second end connected to a cap and a slider disposed between the pod and the cap.

FIG. 21A is a perspective view of a pod 150 with the first end 210 connected to a cap 432 and a slider 434 disposed between the pod 150 and the cap 432. The slider 434 has a flat portion 436 and a plug portion 438. The plug portion 438 plugs the dispensing port 340 in the closed position. The cap 432 defines an aperture 440 that aligns with the dispensing port 340 in the open position.

Figure 21B:
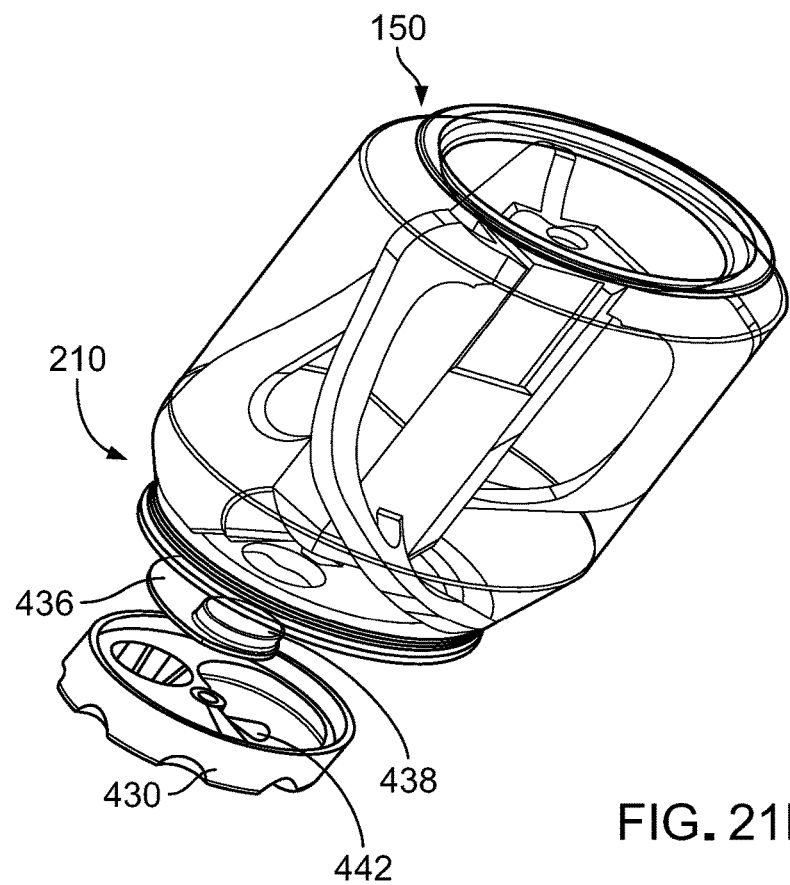
FIGS. 21B and 21C are exploded views of the pod, the cap, and the slider aligned to be in their closed position.
Figure 21C:
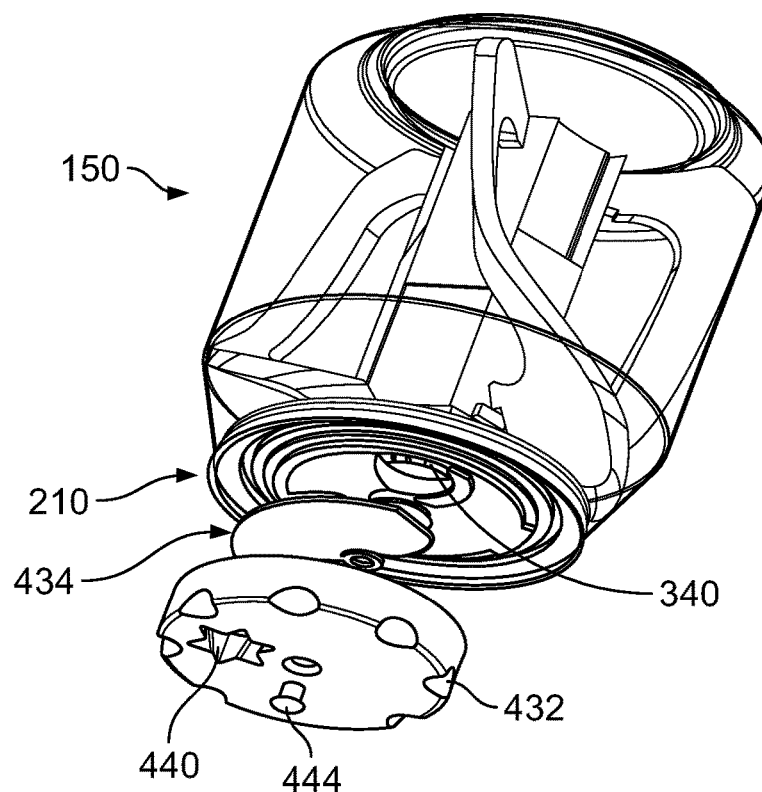

FIGS. 21B and 21C are exploded views of the pod 150, cap 432, and slider 434 aligned to be in the closed position. The cap 432 includes a recess 442 that holds the slider 434. The cap 432 and slider 434 are attached to the second end first end 210 of the pod 150 using a bolt 444. The slider 434 and cap 432 are rotatable relative to each other and relative to the bolt 444.

Figure 21D:
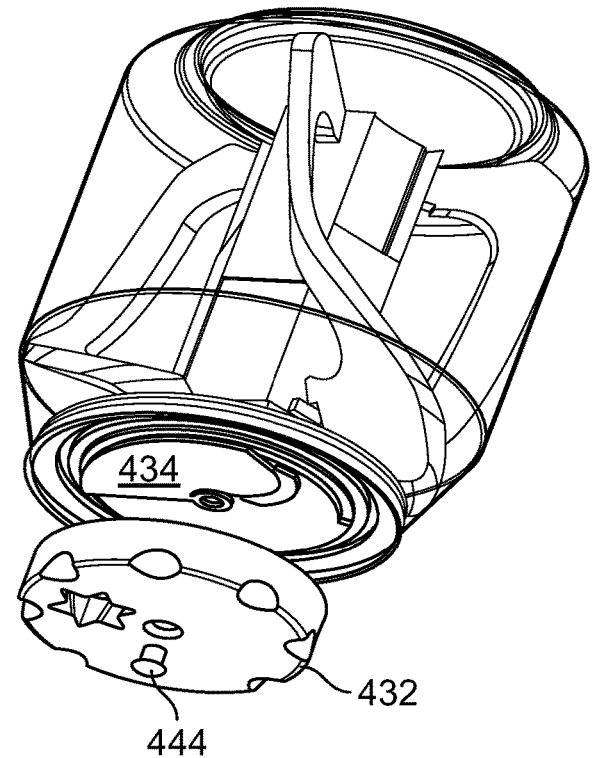
FIGS. 21D and 21E show the plug portion of the slider in the dispensing port.
Figure 21E:
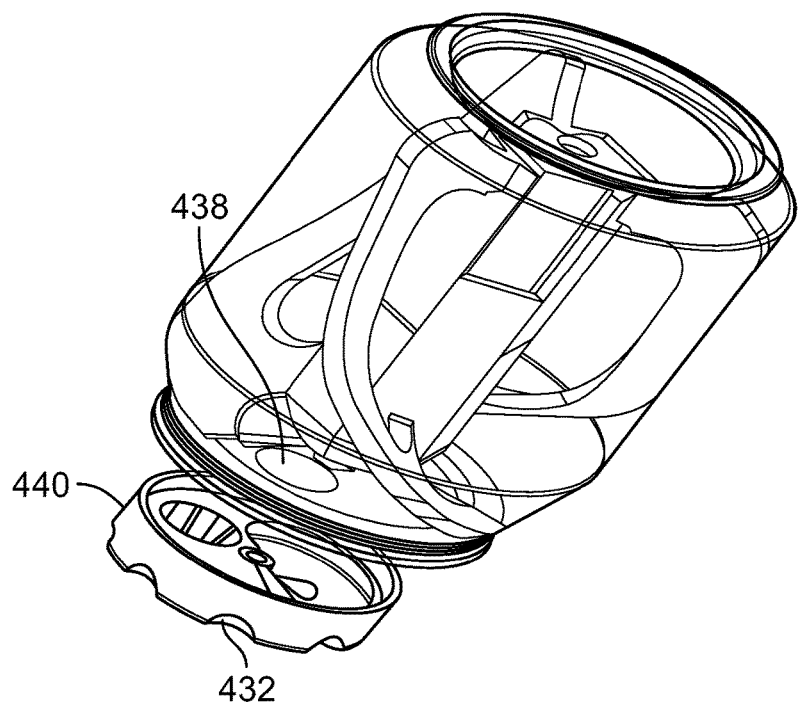

FIGS. 21D and 21E show the closed position with the plug portion 438 of the slider 434 in the dispensing port 340. The cap 432 is shown apart from the pod 150 for ease of viewing.

Figure 21F:
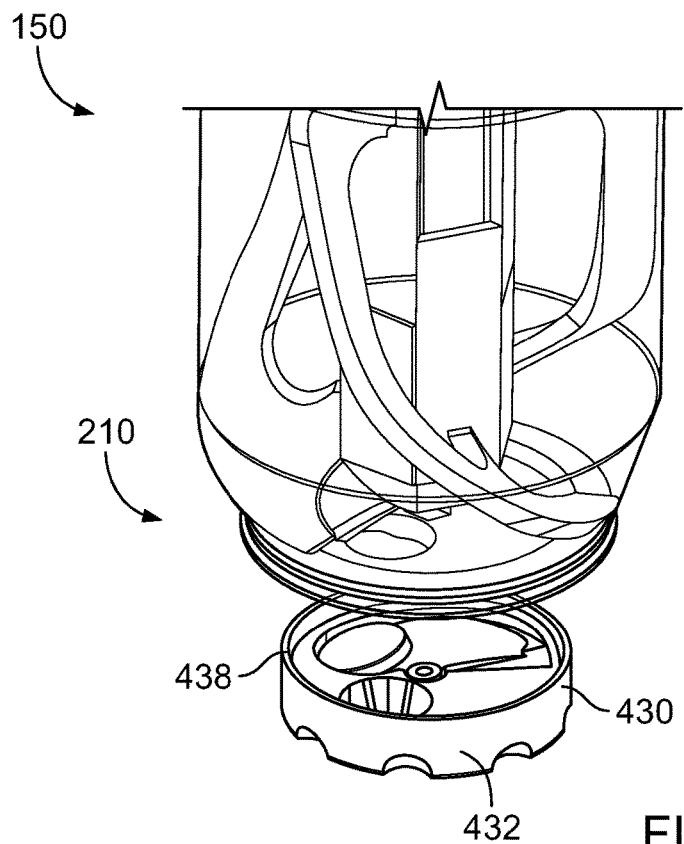
FIGS. 21F and 21G are, respectively, an exploded view and a bottom view of the cap and slider in their open position.
Figure 21G:
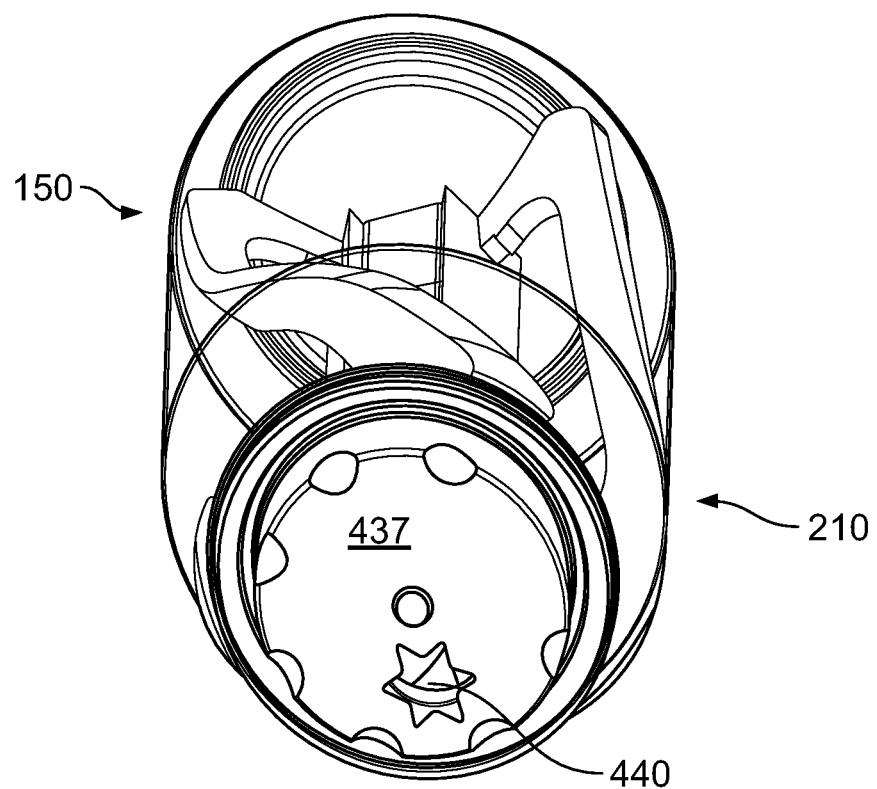

FIGS. 21F and 21G show an exploded view and a bottom view of the cap 432 and slider 434 in the open position. The cap 432 rotates to move the slider 434 between the open and closed position. As the cap 432 continues to rotate, the slider 434 tucks into the recess 442 of the cap 432, the sliding plug 438 is removed from the dispensing port 340, and the aperture 440 of the cap 432 aligns with the dispensing port 340. This configuration can be reversed into the closed position by rotating the cap 432 in the opposite direction, sliding plug 438 up and into the dispensing port 340 to reseal it.

Figure 22A:
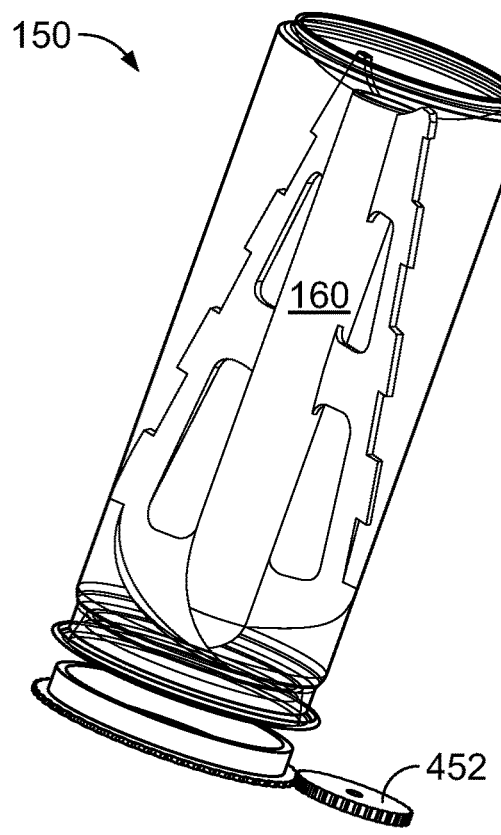
FIGS. 22A and 22B are schematic views of a pod engaged with a rotator.
Figure 22B:
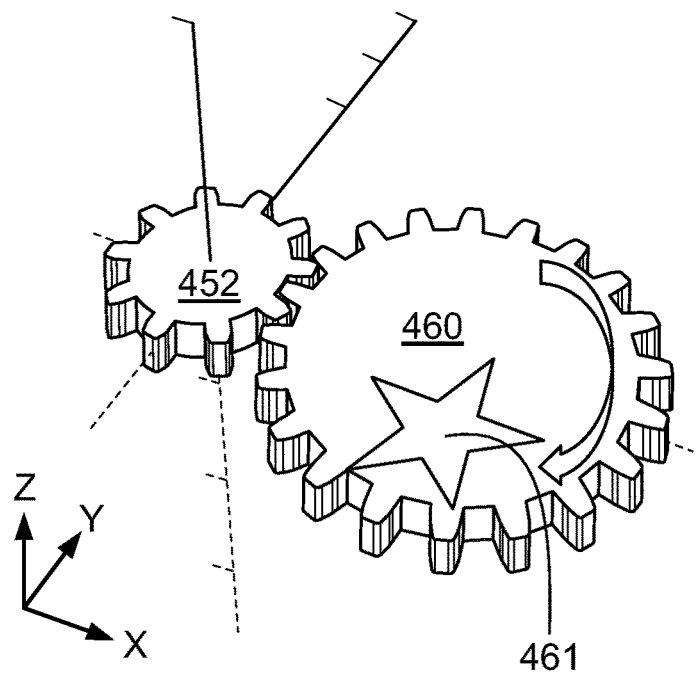

FIGS. 22A and 22B are schematic views of a pod 150 engaged with a gear wheel 450. The gear wheel 452 engages a plate or cap (e.g., the plates of FIGS. 17A, 18A, 19A, 20A, or the cap of FIG. 21A) of the pod 150 when the pod 150 is inserted into a machine. The gear wheel 452 is attached to a motor (not shown) that drives the gear wheel 452. Rotation of the gear wheel 452 rotates the plate or cap of the pod 150. When it is time to dispense cooled food or drink from the pod 150, the motor is activated to rotate the gear wheel to rotate the plate or cap and open the cover of the pod 150 to dispense its contents.

When the pod 150 is inserted into the evaporator 108 of the machine 100 a plate or cap attached to the first end 210 of the pod rests against the gear wheel 452. In some rotators, the gear wheel is shaped as a circular donut or a roller. To dispense cooled food or drink, the motor 454 is activated by a controller and rotates the gear wheel 452 via the rod 456. The gear wheel 452 engages the plate or cap, moving the plate or cap into the open position from the closed position. By reversing the motor 454, the gear wheel 452 can moving the plate or cap into the closed position from the open position. Some gear wheels can be activated manually by the machine user.

Figure 23A:
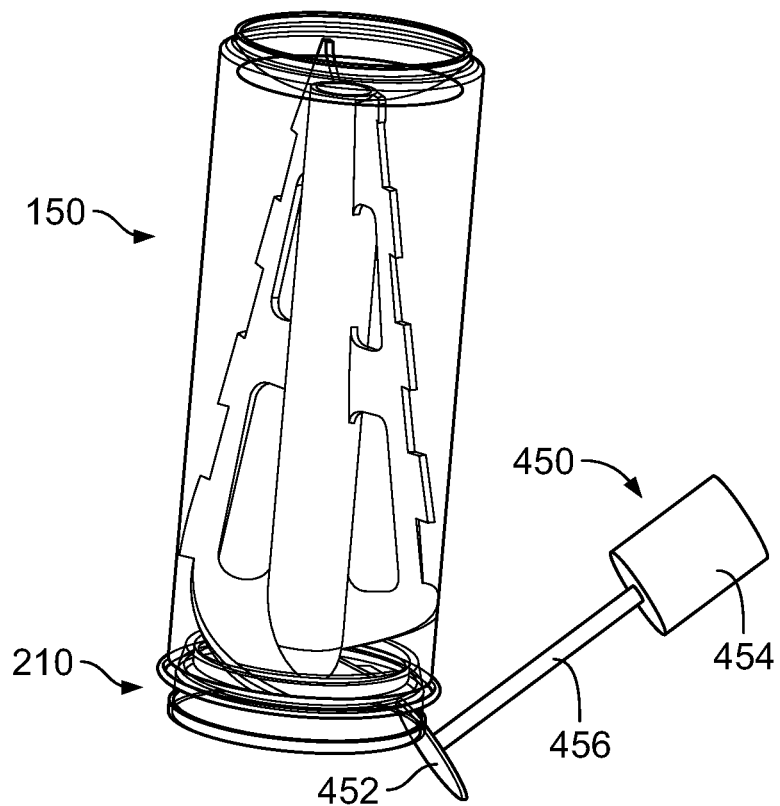
FIGS. 23A and 23B are schematic views of a pod engaged with a rotator.
Figure 23B:
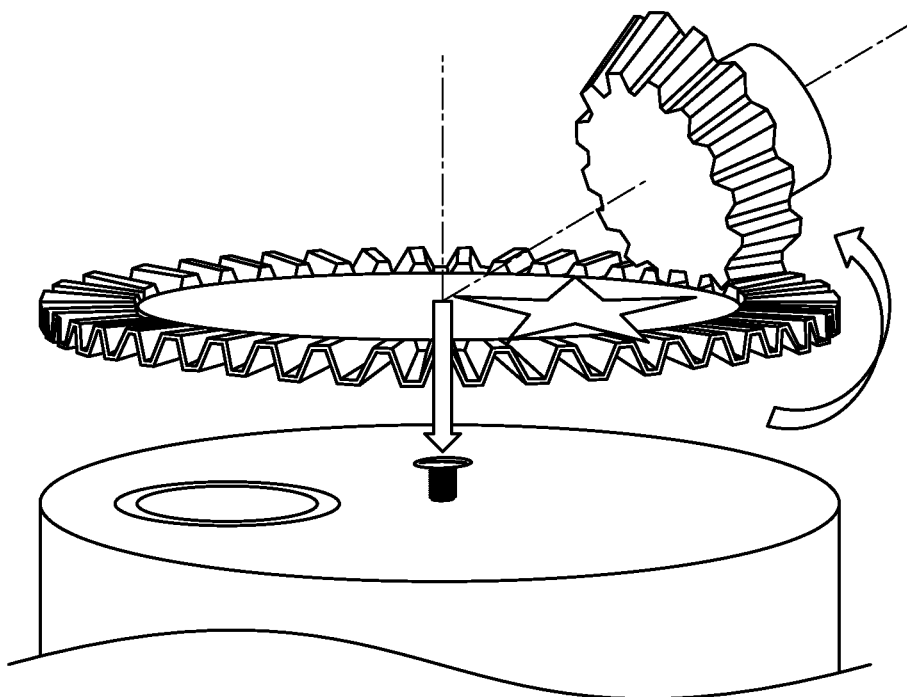

FIGS. 23A and 23B are schematic views of a pod 150 engaged with a gear wheel 452. The gear wheel 452 that engages a plate or cap and is coupled to a motor 454 that drives the gear wheel 452 via a rod 456. Rotation of the gear wheel 452 rotates the plate or cap of the pod 150. When it is time to dispense cooled food or drink from the pod 150, the motor is activated to rotate the gear wheel to rotate the plate or cap and open the cover of the pod 150 to dispense its contents.

Figure 24A:
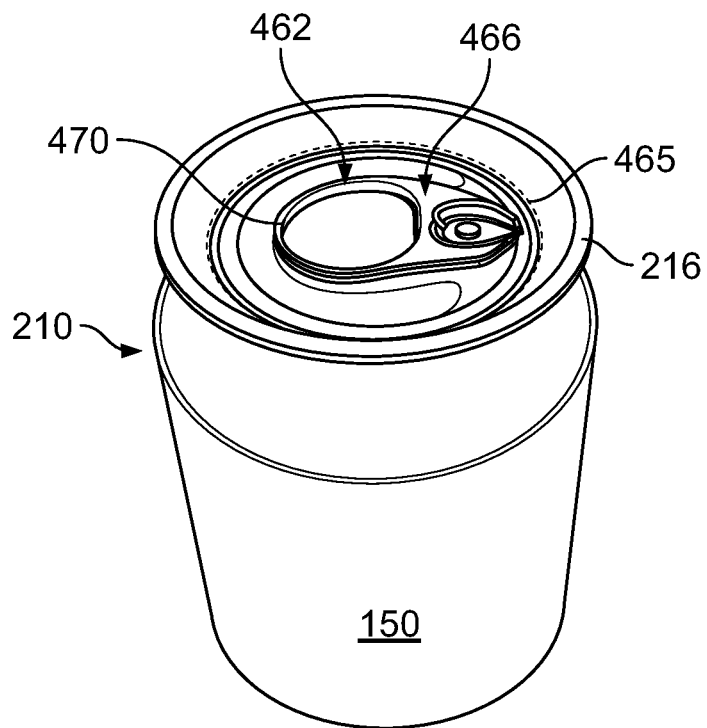
FIGS. 24A and 24B are perspective views of a removable lid that covers an end of a pod.
Figure 24B:
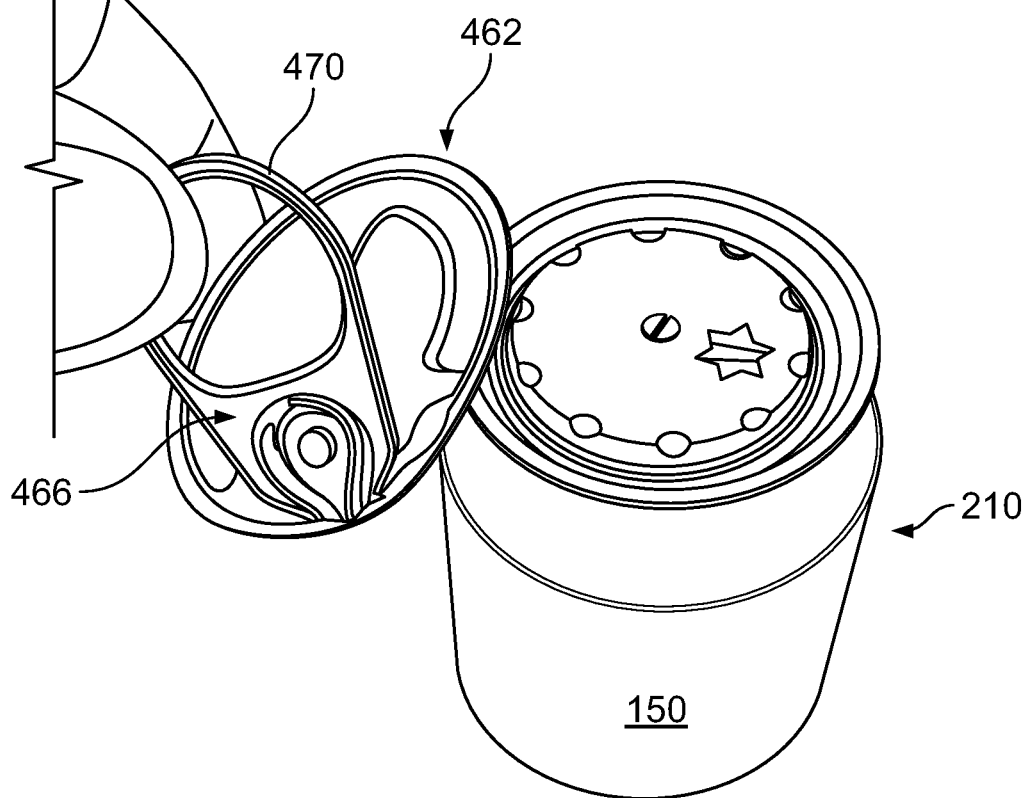

FIGS. 24A and 24B are perspective views of a removable lid 464 that covers an end of a pod 150. The removable lid 462 is integrally formed with the pod 150 and has an edge 465 that defines a weakened area of aluminum where the removable lid 462 meets the first neck 216. The removable lid 462 further includes a tab 466 with a puncturing surface 468, aligned with the edge 465 and a ring 470 on the side opposite the puncturing surface 468. The removable lid 462 is removed by lifting the ring 470 thereby pressing the puncturing surface 468 into the weakened area. The puncturing surface 468 punctures the weakened area and the user pulls the removable lid 462 away from the pod 150 using the ring 470. The removable lid 462 covers the dispensing assembly. The removable lid 462 helps maintain the integrity of the pod during the sterilization process and helps the pod 150 maintain sterility of its contents following the sterilization process.

The weakened section is produced in manufacturing by scoring the edge 465 of the removable lid 464. The edge 465 may be created by a laser or stamping with a punch and die. In some embodiments, the weakened section is a section that is thinner than the walls of the pod. In some embodiments, the removable lid is adhesively attached or mechanically attached to the pod. The dispensing assembly may be any of the configurations described with respect to FIGS. 17A-21G.

Figure 25A:
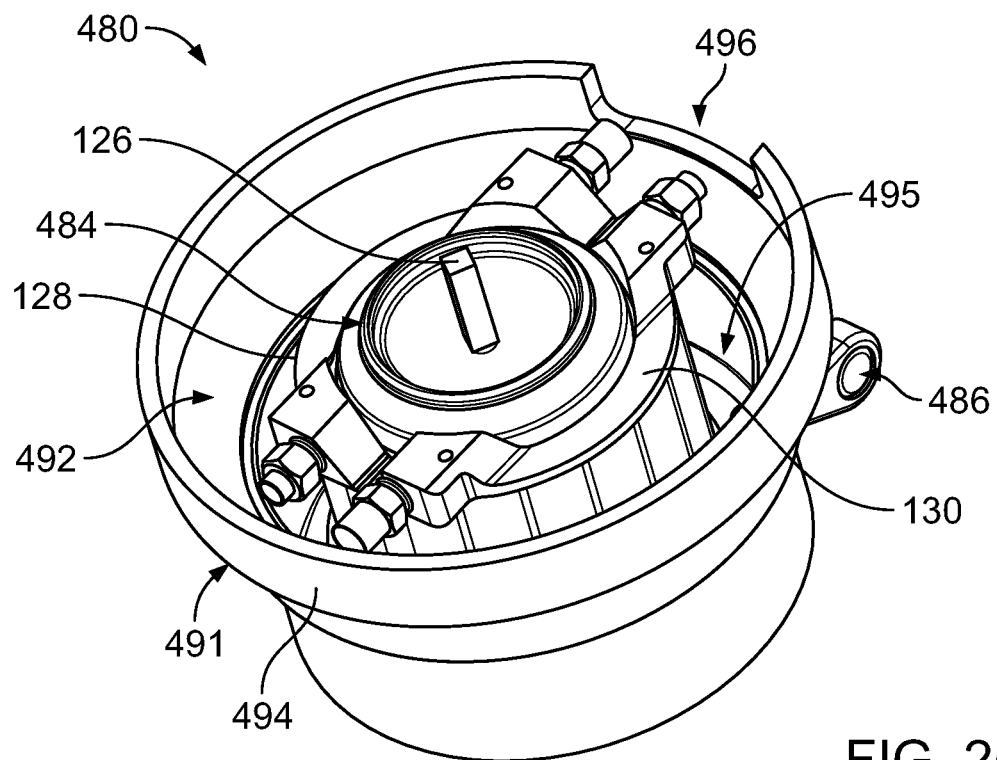
FIGS. 25A-25C are, respectively, a perspective view, a cross-sectional view, and a top-down view of a pod-machine interface with an evaporator.
Figure 25B:
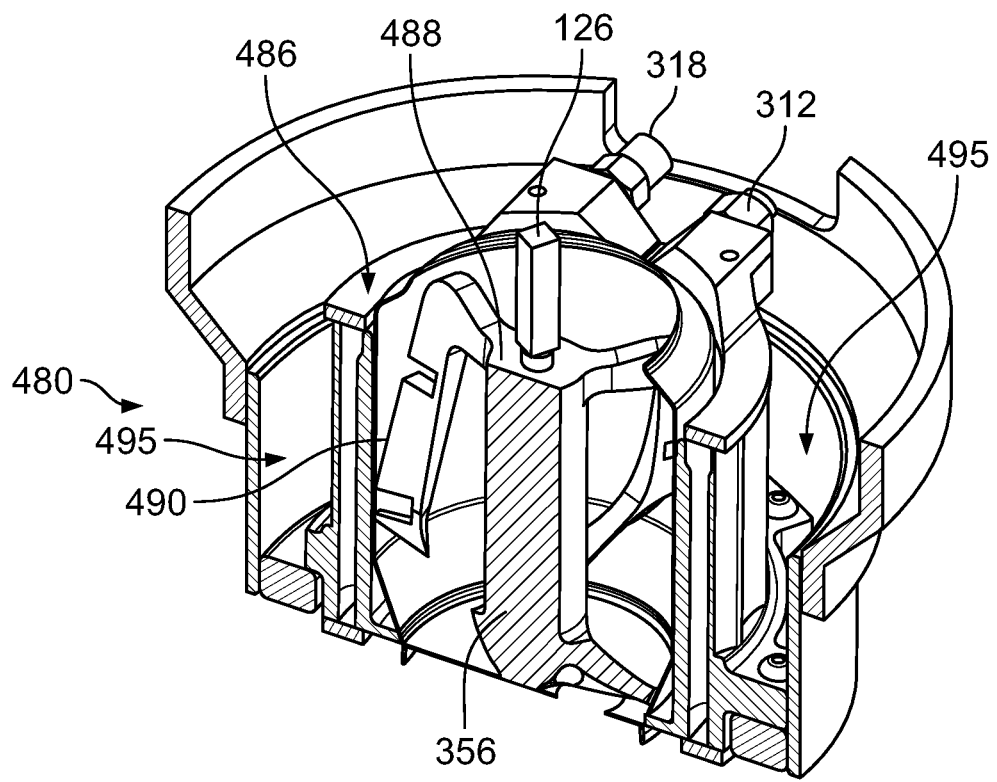
Figure 25C:
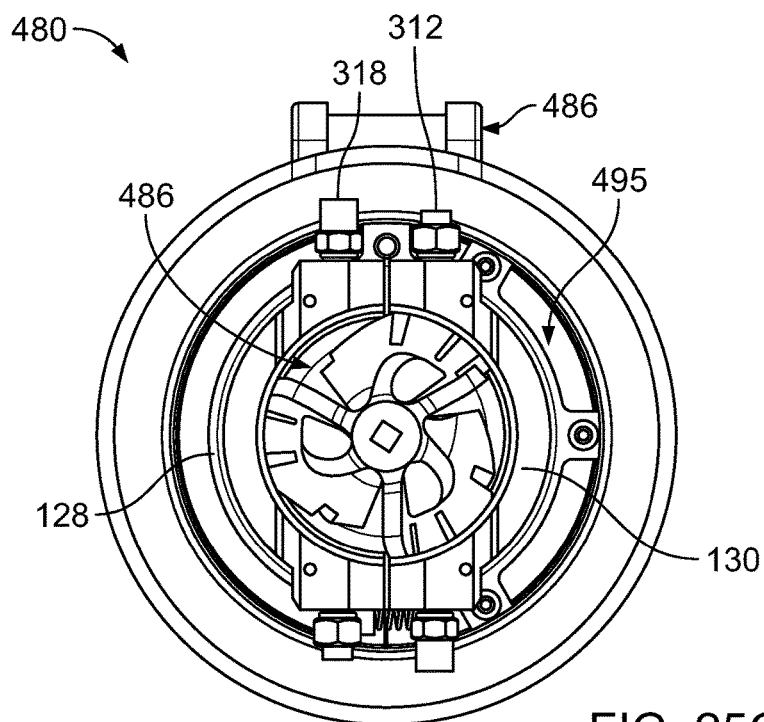

FIGS. 25A-25C are a perspective, a cross-sectional, and a top-down view of a pod-machine interface 480 with an evaporator 108 as described with respect to FIG. 15A. The pod-machine interface 480 has a bore 486 for hingeably attaching the pod-machine interface 480 to the body of a machine for rapidly cooling food or drinks. The drive shaft 126 is the only component of the machine 100 shown.

The evaporator 108 is in its closed position holding the pod 150. The drive shaft 126 engages with the pod 150 to rotate the mixing paddle 486. The mixing paddle 486 is a three-blade paddle with blades that have large openings adjacent a stem 488 of the paddle 486. The angle of inclination of the blades 490 relative to a plane extending along an axis of pod 484 varies with distance from the end of the pod 150. The outer edges of the blades 490 define slots that can receive a rim of the pod 484 during assembly.

The pod-machine interface 480 includes a housing 491 with a ledge 492 and a wall 494 that extends upward from the ledge 492. The ledge 492 and the wall 494 guide and support refrigerant fluid lines (not shown) attached to the evaporator 108. The fluid lines extend from a recess 496 that is defined in the wall 494 to the first fluid inlet port 312 and the second fluid outlet port 318 of the evaporator 108 on the side of the evaporator 108 opposite the recess 496. The evaporator 108 has two inlet ports and two outlet ports because the first portion 128 of the evaporator 108 and the second portion 130 of the evaporator 108 define two separate flow paths.

The evaporator 108 is disposed in the pod-machine interface 480 such that an annular space 495 is defined between the outer wall of the evaporator 108 and the inner wall of the casing of the pod-machine interface 480. The annular space 495 is filled with an insulating material to reduce heat exchange between the environment and the evaporator 108. In the pod-machine interface 480, the annular space 495 is filled with an aerogel (not shown). Some machines use other insulating material, for example, an annulus (such as an airspace), insulating foams made of various polymers, or fiberglass wool.

Figure 26A:
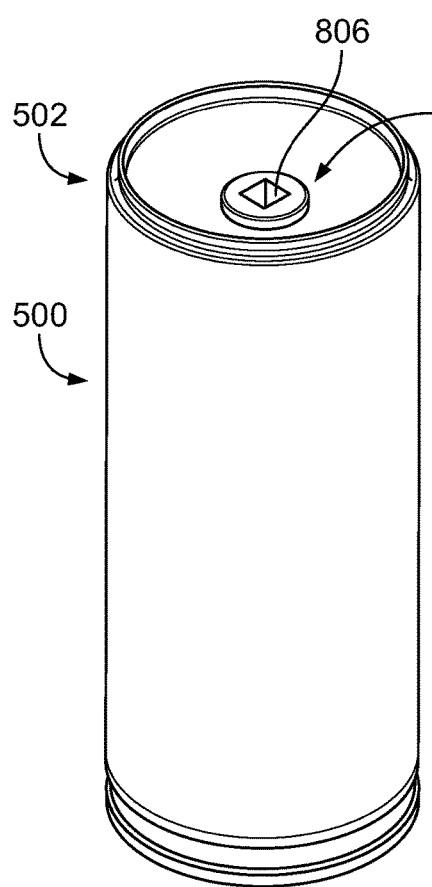
FIGS. 26A and 26B are, respectively, a perspective view and a cutaway view of a pod.
Figure 26B:
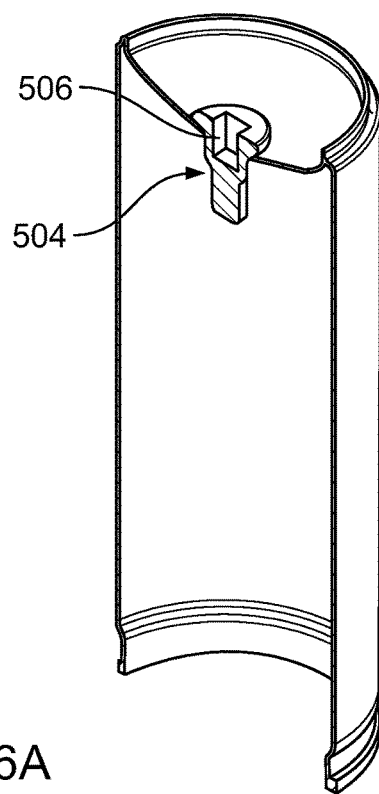

FIGS. 26A and 26B are perspective views of a pod 502. The pod 502 is substantially similar to the pod 150 shown in FIGS. 6A and 7A. However, the pod 502 includes a plug 504 that engages the drive shaft 126 of the machine 100 and facilitates the flow of gas into the pod 502 during either the manufacturing process or during the cooling process in the machine. Gas (for example, nitrogen, nitrous oxide, carbon dioxide, argon, or a combination of these gases) can be injected into the pod 502 through the plug 504 during manufacturing. Typical pressure that the pod experiences during the retort sterilization process is between 20-100 psi. The plug 504 pops out of the pod 502 if the internal pressure exceeds 100 psi. To prepare the pod 502 for the plug 504, the second end 212 of the pod 502 is deep drawn (e.g., by stretching or forming the base dome of the can during manufacturing while also punching or drawing the hole out of the center with the forming dies) during manufacturing of the pod 502.

The plug 504 defines a central opening or recess 506 that receives the drive shaft from the lid 112 of the machine 100. The recess 506 is shaped to rotationally lock the grommet to the drive shaft 126. The plug 504 has flat surfaces that mate with the central opening or recess of the mixing paddle (not shown). The central opening or recess has the same flat surface configuration. The plug 504 rotates relative to the pod 502 when the motor and the drive shaft 126 engage the plug 504. In some grommets, the drive shaft penetrates the grommet to engage the paddle. The plug 504 accepts the drive shaft and engages the mixing paddle. Gas can be injected into the pod 150 through the grommet to maintaining pressure in the pod 150 during the refrigeration cycle and control the texture of the contents of the pod during the refrigeration cycle.

A variety of mixing paddles can be used with the pods described in this specification. The mixing paddles described with respect to the following figures can be used in any of the pods described in this specification. Generally, the mouth of the pod is smaller than the major diameter of the pod. The internal mixing paddle needs to be either flexible to squeeze smaller for entry thru the mouth of the can and expand large once in the can to be able to scrape the wall or the blades need to be slotted. In some cases, the blades of mixing paddles give rigidity to the thin wall pod during packaging and shipping and give outward structure to the pod when a clamshell evaporator closes against it.

Figure 27:
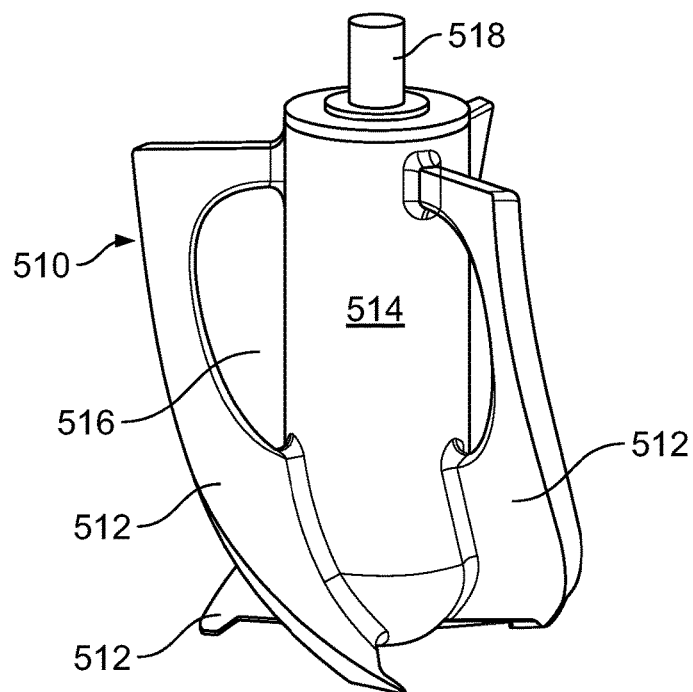
FIG. 27 is a perspective view of a mixing paddle.

FIG. 27 is a perspective view of a mixing paddle 510 with three blades 512 that extend along the length of a central stem 514. The blades 512 define large openings 516 through which the contents of the pod 150 flow during mixing. The paddle 510 also includes a projection 518 that extends out of the second end 212 of the pod 150. As the second end 212 of the pod 150 is concave, the projection 518 is shorter than an upper lip of the pod 150. In some embodiments, the projection mates with a female drive shaft inserted into the pod rather than projecting out of the pod.

Figure 28:
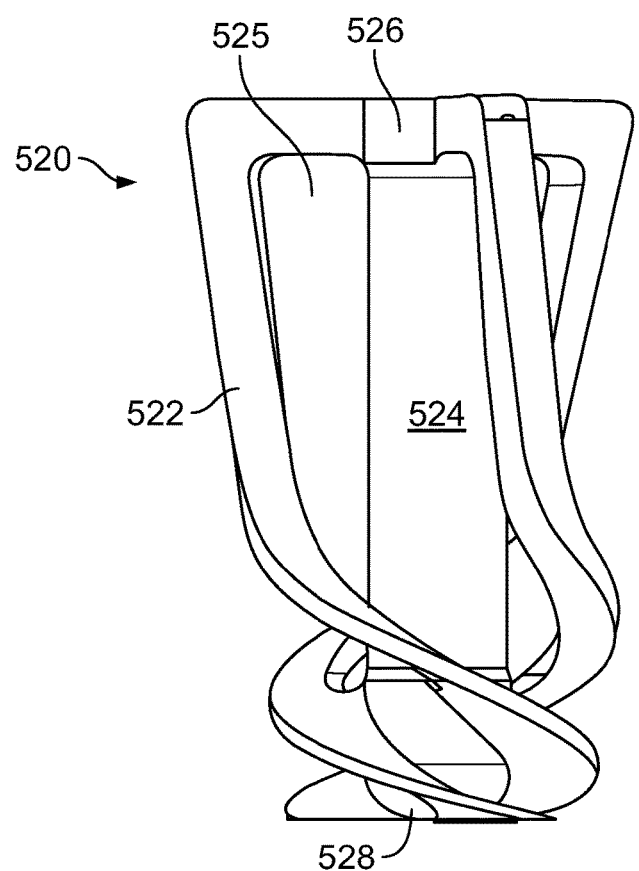
FIG. 28 is a perspective view of a mixing paddle.

FIG. 28 is a perspective view of a mixing paddle 520 with three blades 522 that wind along the length of a central stem 524 at a pitch that varies with distance along an axis of the paddle. The blades 522 define large openings 525 that extend from a first end 526 of the blade 522 to a second end 528 of the blade 522. The pitch of the blades increases with distance from the first end 526 of the pod 150. The portions of the blades 522 with a shallow pitch remove frozen confection that otherwise would build up on the inner surface of the walls of the pod 150 during freezing. The portions of the blades 522 with a steeper pitch churn the frozen confection while lifting the frozen confection from the floor of the pod 150. The portions of the blades 522 with a steep pitch also presses the frozen confection out of the end 210 of the pod when rotated in the opposite direction and the first end 210 of the pod 150 is opened.

Figure 29A:
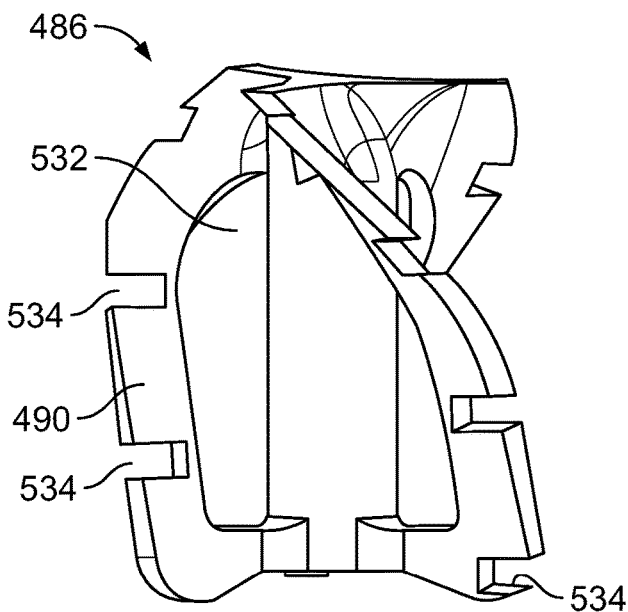
FIG. 29A is a perspective view of a mixing paddle.

FIG. 29A is a perspective view of a mixing paddle 486. The paddle 486 has three helical blades 490 that have large openings 532 adjacent a stem 488 of the paddle 486. The angle of inclination of the blades 490 relative to a plane extending along an axis of pod 484 varies with distance from the end of the paddle. The outer edges of the blades 490 define slots 534 that can receive a rim of the pod 484 during assembly. The slots 534 extend into the blades 490 which produces a flexible blade 490. A flexible blade is beneficial during assembly of the pod as the neck of the pod is generally smaller in diameter than the diameter of the paddles.

Figure 29B:
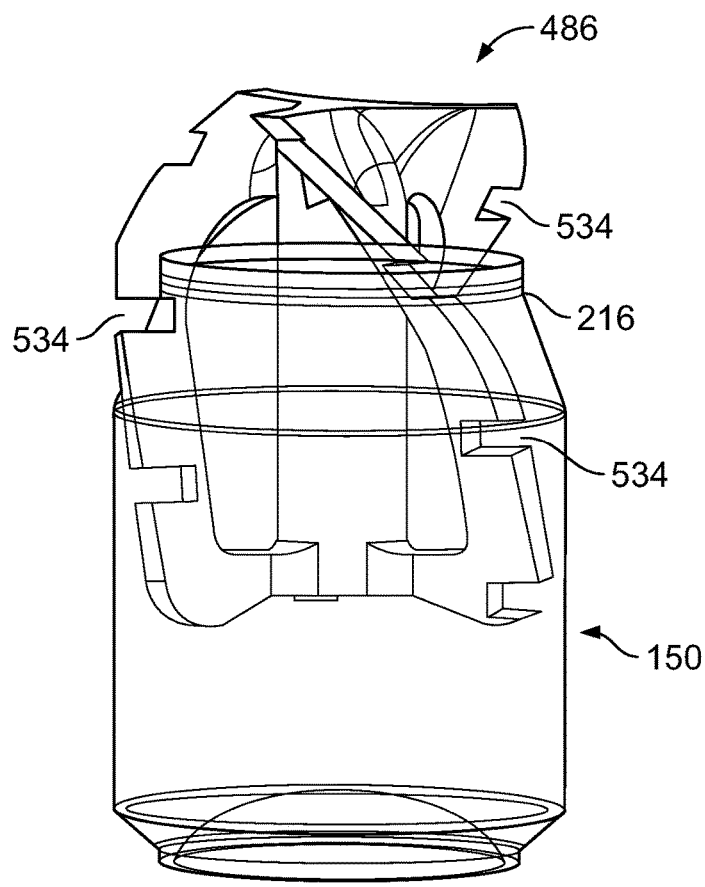
FIG. 29B is a schematic view illustrating insertion of the mixing paddle of FIG. 29A into a pod.

FIG. 29B is a schematic view illustrating insertion of the mixing paddle 486 into a pod 150. The slots 532 act as threads during manufacturing and allow a paddle with a wider diameter than the first neck 216 to enter the pod 150. As previously described with reference to FIGS. 6A and 6B, the pod 150 has a wider barrel 220 than mouth. The width of the paddle 486 touches or almost touches the sides of the barrel 220 to remove built up or frozen ingredients.

Figure 30A:
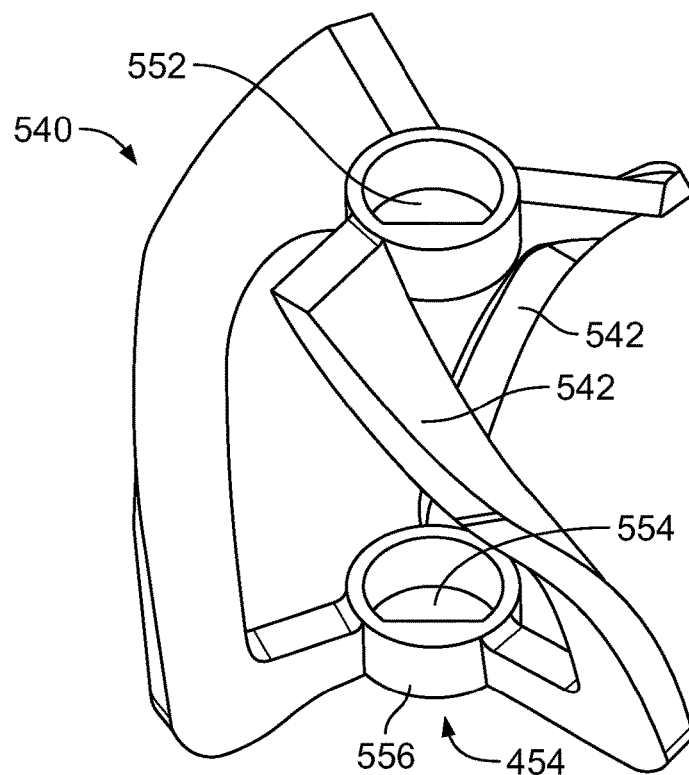
FIG. 30A is a perspective view of a mixing paddle.

FIG. 30A is a perspective view of a mixing paddle 540 that has three helical blades 542. A first end 454 of the blades 542 connect to a first unit 556 and the second end 548 of the blades 542 connect to a second unit 558. The first unit 546 and the second unit 550 have key-shaped openings that receive a central rod that is shaped to fit the openings. When the rod is received by the openings, the paddle 540 is rotationally coupled to the rod.

The paddle 540 is flexible and made of resilient material. The paddle 540 can be twisted clockwise to reduce the diameter of the paddle 540. The paddle 540 can be twisted counterclockwise to increase the diameter of the paddle 540. The paddle returns to the original diameter when the twisting force is removed. The diameter of the paddle 540 is typically larger than the diameter of the upper end DUE of the pod 150.

Figure 30B:
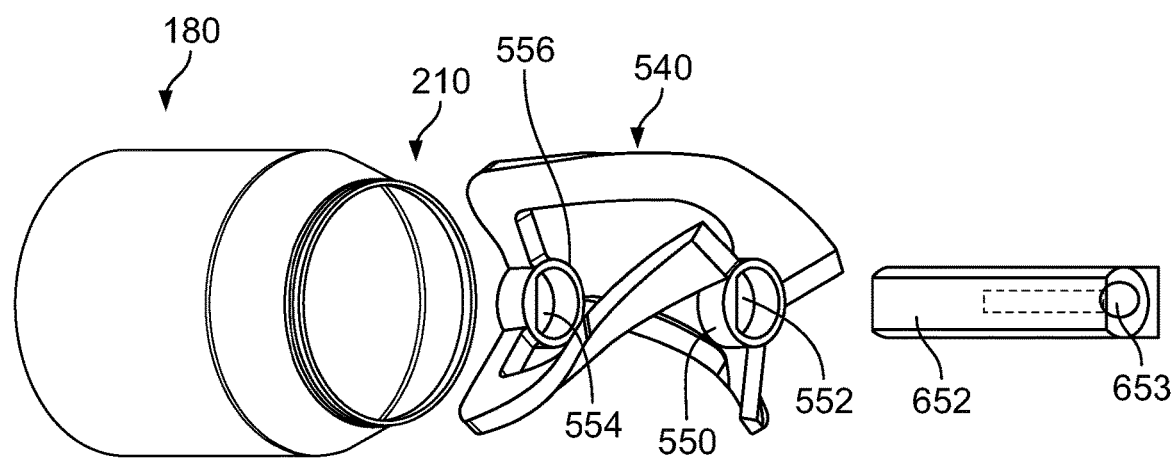
FIG. 30B is a schematic view illustrating insertion of the mixing paddle of FIG. 30A into a pod.

FIG. 30B is a schematic view illustrating insertion of the mixing paddle 540 and a complimentary rod 652 into a pod. The paddle 540 is also a flexible and resilient paddle 540. The paddle 540 is manipulated to fit though the second neck 218 and the rod 652 is then inserted through the second neck 218 and the openings 552, 554. Inserting the rod 652 through the openings 552, 554 causes blades to expand and sit flush with pod walls. The rod 652 abuts the first end 210 of the pod 150. A recess 653 is defined in the end of the rod 652 that abuts the first end 210. The recess 653 is sized to receive and rotationally couple to the drive shaft 126.

Figure 31:
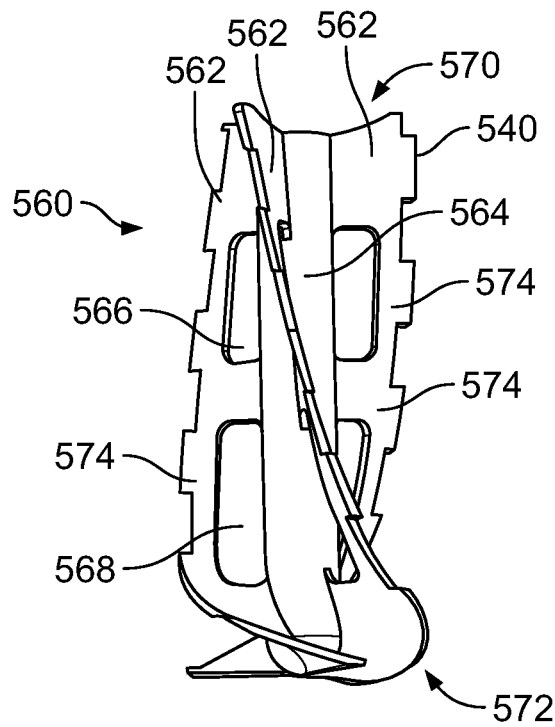
FIG. 31 is a perspective view of a mixing paddle.

FIG. 31 is a perspective view of a mixing paddle 560 that has three helical blades 562 that extend along the length of a central stem 564. Each blade 566 defines an upper opening 566 and a lower opening 568. The blades 562 increase in pitch as the blade 562 extends from an upper end 570 of the paddle 560 to a lower end 572 of the paddle 560. The blades 562 have protrusions 574 on edges of the blades 562. The protrusions 574 alternate to remove built up ingredients from the interior of the pod 150. The protrusions 574 are arranged such that the entire surface area of the barrel 220 is wiped or cleaned by the protrusions 574 of the three blades 562.

Figure 32A:
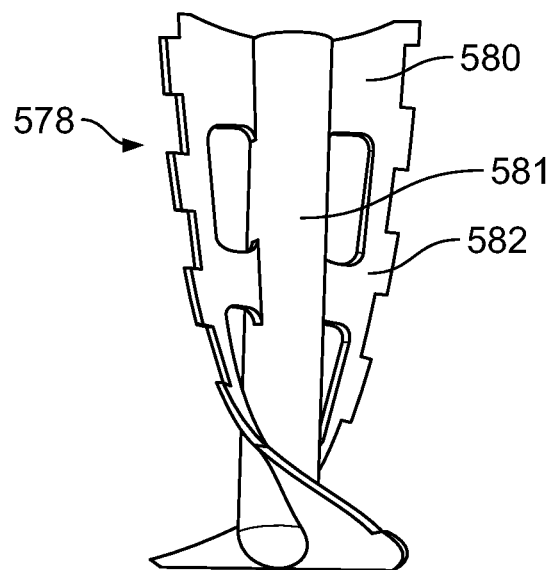
FIG. 32A is a perspective view of a mixing paddle.

FIG. 32A is a perspective view of a mixing paddle 578 that has two helical blades 580 that extend along the length of the central stem 581. The paddle 578 is substantially similar to the paddle 560. However, the paddle 578 has two blades rather than three blades 562. The blades 580 includes alternating notches 582 that cover the entire interior surface area of the barrel of the pod 150. The notches 582 perpendicularly project from edges of the blades 580. In some mixing paddles, the outer diameter of the mixing paddle is narrower at one end to increase the ease of insertion into the pod during assembly and to maintain the paddle is a concentric position within the pod during the refrigeration cycle.

Figure 32B:
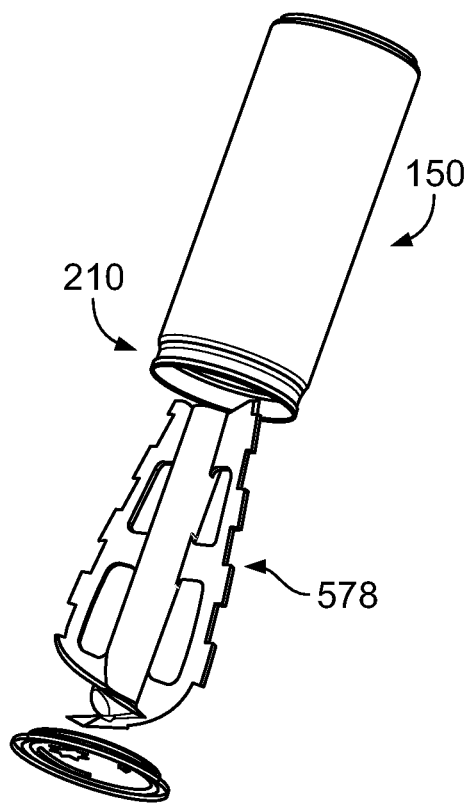
FIGS. 32B and 32C are schematic views illustrating insertion of the mixing paddle of FIG. 32A into a pod.
Figure 32C:
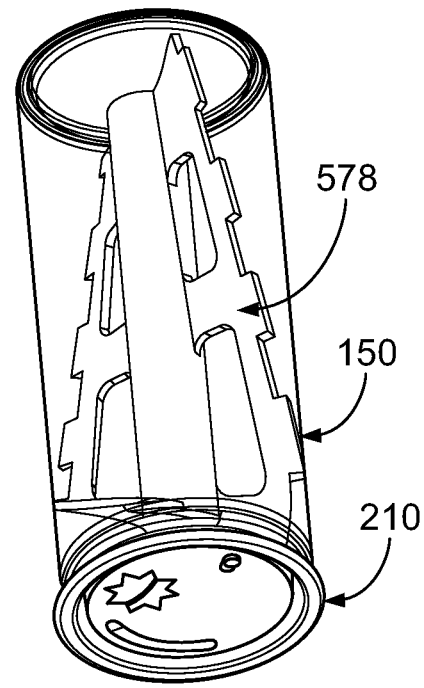

FIGS. 32B and 32C are schematic views illustrating insertion of the mixing paddle 578 into a pod. The paddle 578 is worked into the pod 150 by wiggling the paddle 578 though the first neck 216 or by rotating the paddle through the first neck 216. FIG. 30B shows the paddle 578 fully inserted into the pod 150. The plate 390 is attached to the first end 210 of the pod 150.

Figure 33:
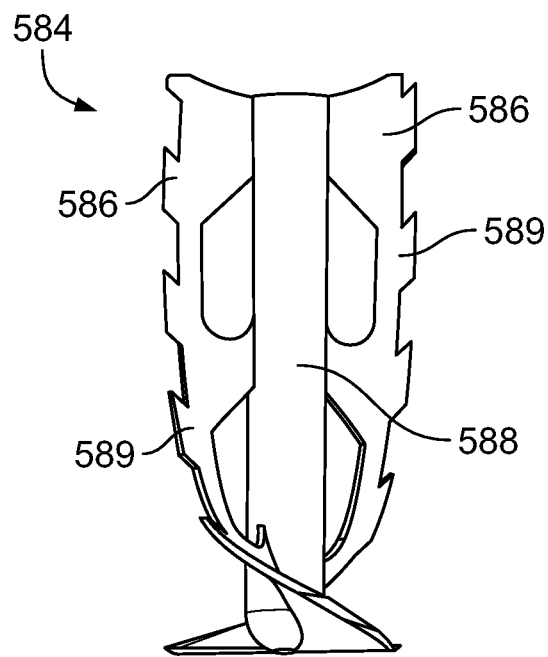
FIG. 33 is a perspective view of a mixing paddle.

FIG. 33 is a perspective view of a mixing paddle 584 that has two helical blades 586 that extend along the length of the central stem 588. The paddle 584 is substantially similar to paddle 578. However, paddle 584 has angled notches 589 and angled notches 582. These notches help to facilitate the insertion of the paddle 584 into the pod without catching on a cornered notch.

In some mixing paddles, components are stamped in two or more pieces from flat aluminum sheet and fixably nested to achieve a mixing paddle with a central stem with mixing blades. Some mixing paddles are first stamped and then welded to produce a central stem.

Figure 34A:
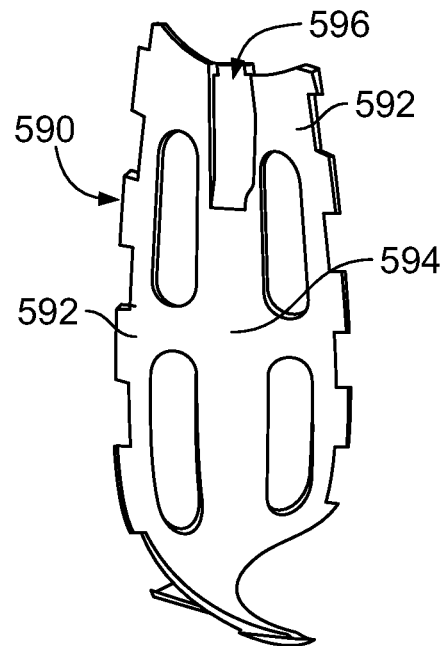
FIG. 34A is a perspective view of a mixing paddle.

FIG. 34A is a perspective view of a mixing paddle 590 that has two helical blades 592 that extend along the length of a central stem 594. The paddle 590 is otherwise substantially similar to the paddle 578. The paddle 578 can be formed from a single piece of sheet metal. The central stem is a stamped recess 596 for receiving the drive shaft 126.

Figure 34B:
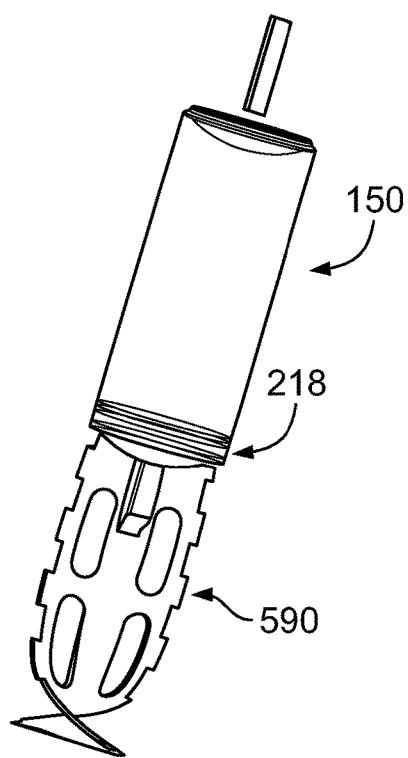
FIGS. 34B-34D are schematic views illustrating insertion of the mixing paddle of FIG. 34A into a pod.
Figure 34C:
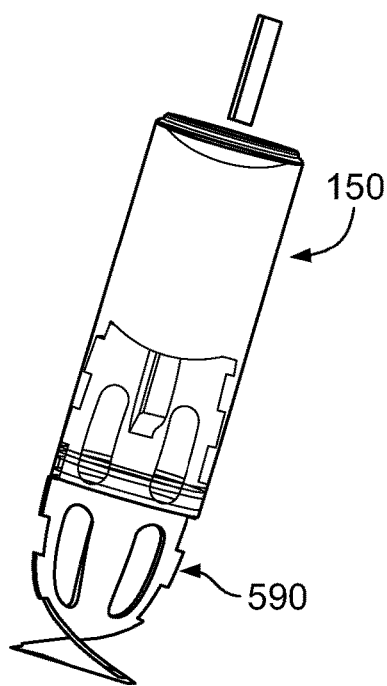
Figure 34D:
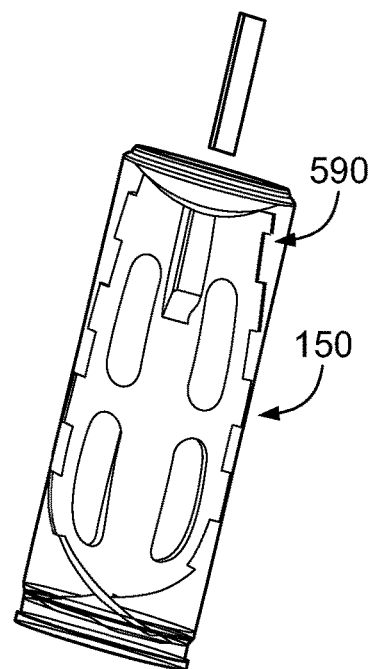

FIGS. 34B-34D are schematic views illustrating insertion of the mixing paddle 590 into a pod. The blades 592 are notched to help insertion into a pod 150 through the first neck 216. The blades 592 have alternating notches. This allows the paddle 578 to pass through the first neck 216 during manufacturing and maintain contact with the inner wall of the barrel 220. Some paddles 578 do not contact the inner wall of the barrel, but are sufficiently close to the inner wall of the barrel 220 to remove the ingredients of the pod that freeze and stick to the inner wall of the barrel 220. The paddle may be, for example, 5-500 microns away from the inner wall of the barrel 220.

Figure 35:
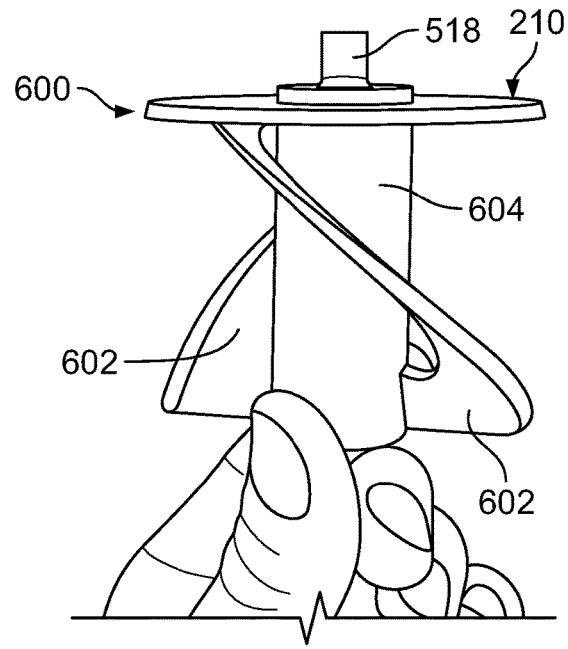
FIG. 35 is a perspective view of a mixing paddle.

FIG. 35 is a perspective view of a mixing paddle 600 that includes two helical blades 602 that extend along a central axis 604. The helical blades 602 have a uniform pitch. The paddle 600 is substantially similar to paddle 510, shown in FIG. 28A. However, paddle 600 is integrally formed with the second end 210 of the pod 150. Paddle 600 has a smooth blade without notches. A projection 518 extends from the main stem of the paddle 510. Some paddles have a central opening or recess to receive the drive shaft 126 of the machine.

Figure 36A:
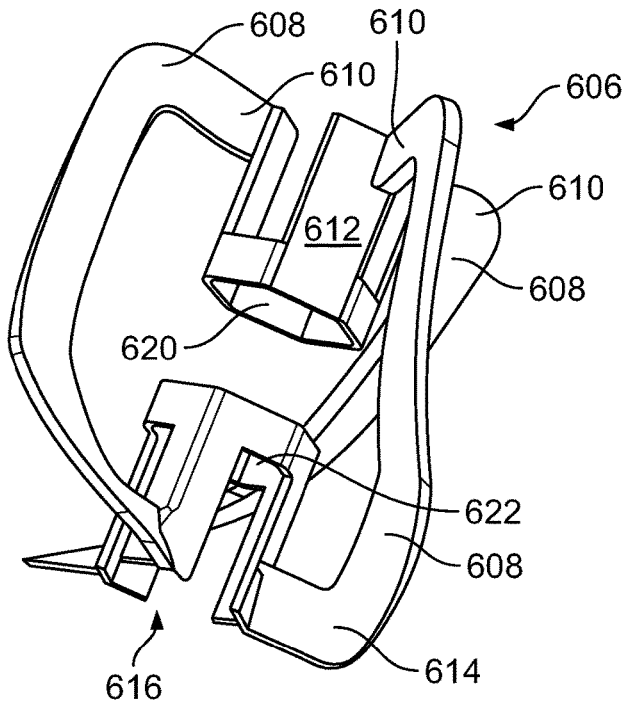
FIG. 36A is a perspective view of a mixing paddle.

FIG. 36A is a perspective view of a mixing paddle 606 that has three helical blades 608. A first end 610 of the blades 608 connect to a first unit 612 and the second end 614 of the blades 608 connect to a second unit 616. The first unit 612 and the second unit 616 have key-shaped openings 620, 622. The key-shaped openings 620, 622 receive a central rod (not shown) that is shaped to fit the openings 620, 622. When the rod is received by the openings 620, 622, the paddle 606 is rotationally coupled to the rod.

The paddle 606 is flexible and is made of resilient material. The paddle 606 can twist clockwise to reduce the diameter of the paddle 606. The paddle 606 can be twisted counterclockwise to increase the diameter of the paddle 606. The paddle returns to the original diameter when the twisting force is removed. The diameter of the paddle 606 is approximately larger than the diameter of the upper end $D_{UE}$ of the pod 150 and smaller than the diameter of the barrel $D_B$ of the pod 150.

In some paddles, the diameter of the central rod is larger than the diameter of the openings. Openings are made of either a resilient material and/or designed to expand when the central rod is inserted into the openings. When the central rod is inserted into the openings, the diameter of the paddle increases.

Figure 36D:
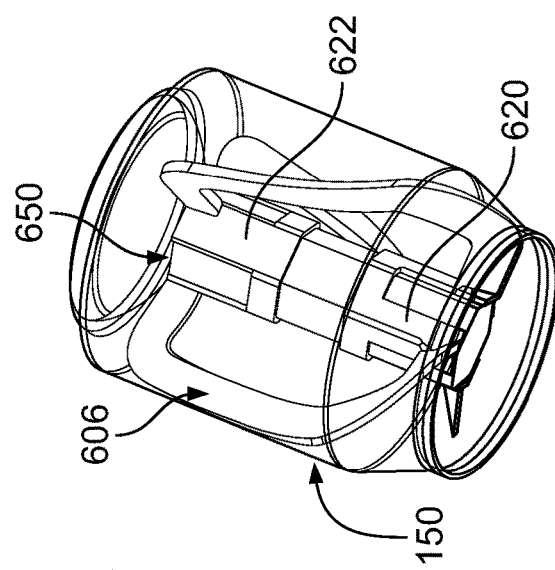
FIGS. 36B-36D are schematic views illustrating insertion of the mixing paddle of FIG. 36A into a pod.
Figure 36C:
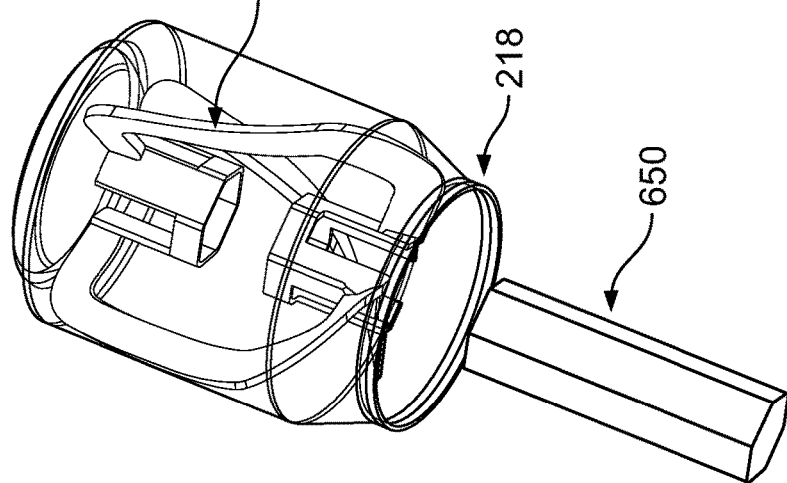
Figure 36B:
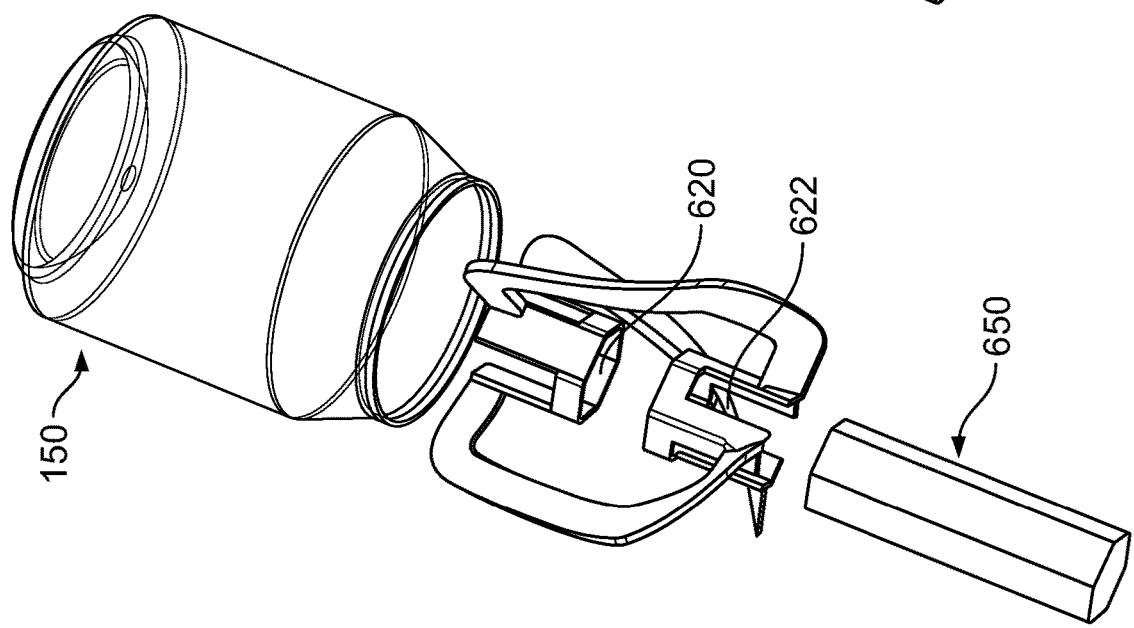

FIGS. 36B-36D are schematic views illustrating insertion of the mixing paddle 606 into a pod. The openings 620, 622 are sized to receive the complimentary rod 650. The rod 650 and the openings 620, 622 are shaped so that when the rod 650 engages the openings 622, 620 the rod 650 and paddle 606 are rotationally coupled. In FIG. 36A, both the rod 650 and the paddle 606 are outside the pod 150. The paddle 606 is first inserted into the first end 210 of the pod 105. The paddle is flexible and can be manipulated (e.g. twisted or compressed) to fit through the second neck 218. Once the paddle 606 is inside the interior of the pod 150, as shown in FIG. 36B, the rod 650 is inserted through the opening 620, 622. FIG. 36C shows the paddle 606 and rod 650 within the interior of the pod. The rod 650 abuts the first end 210 of the pod 150. A recess 651 is defined in the end of the rod 650 that abuts the first end 210. The recess 651 is sized to receive and rotationally couple to the drive shaft 126.

Figure 37A:
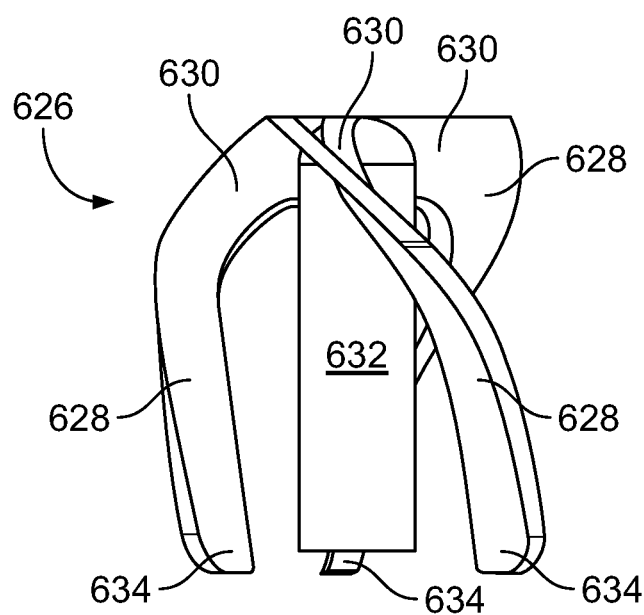
FIG. 37A is a perspective view of a mixing paddle.

FIG. 37A is a perspective view of a mixing paddle 626 that includes three helical blades 628 that attach on a first end 630 to a central stem 632. A second end 634 of the blades 628 is free. The second ends 634 of the blades 628 are is easily compressed when the free ends of transverse mechanical forces are applied to the second ends 634 during manufacturing.

Figure 37B:
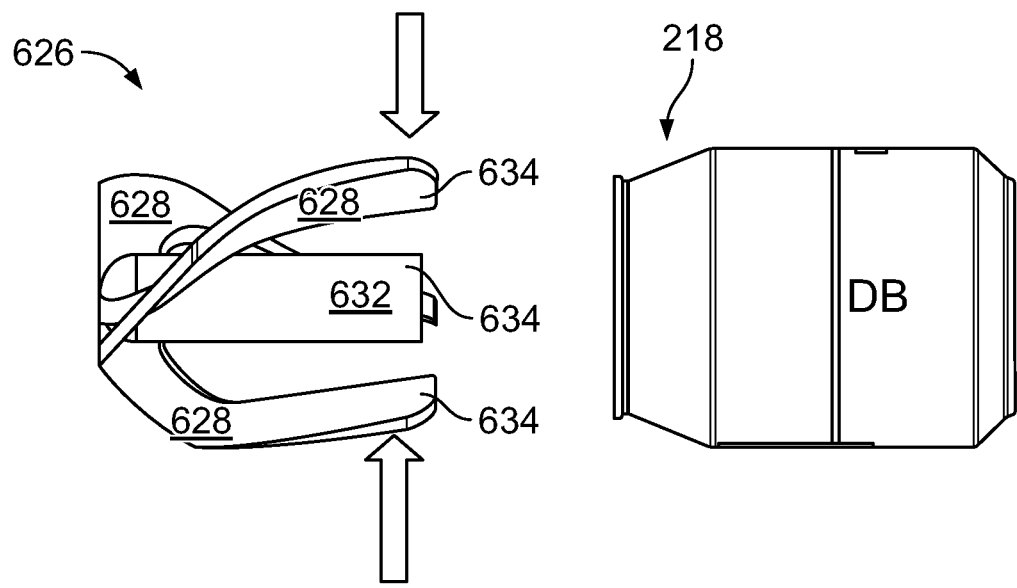
FIG. 37B is a schematic view illustrating insertion of the mixing paddle of FIG. 37A into a pod.

FIG. 37B is a schematic view illustrating insertion of the mixing paddle 626 into a pod. To insert the paddle 626, the second end 634 blades 628 are pressed towards the central stem 632. The paddle 626 is inserted into the second neck 218 of the pod 150. Once in the pod 150, the blades 628 are released and return to their original diameter, which is equal to or slightly smaller than the diameter of the barrel $D_B$.

Figure 38:
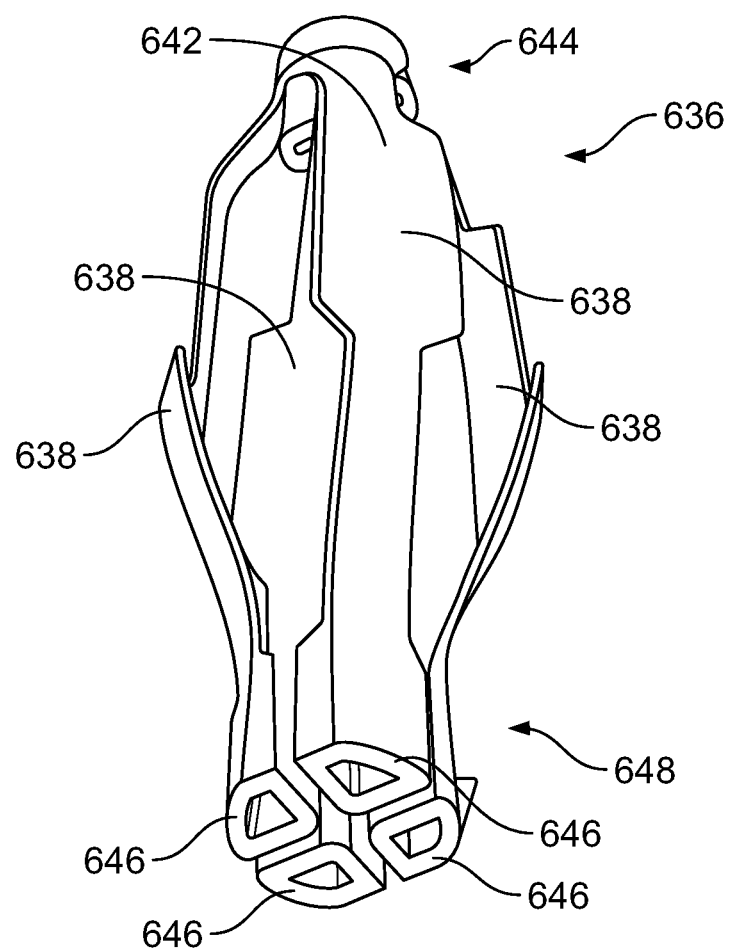
FIG. 38 is a perspective view of a mixing paddle.

FIG. 38 is a perspective view of a mixing paddle 636 that includes four bowed blades 638 that connect first end 642 to a first hub 644 and at a second end 646 to a second hub 648. The blades 638 are made of a resilient material deforms when force is applied to the top and bottom of the paddle. The bow of the blades 638 can increase when the ends of the paddle are pressed together. In the undeployed position, the blades 638 are slightly bowed. In the deployed position, the blades 638 bow out. The paddle 636 is inserted into the pod 150 in the undeployed position. When the paddle 636 is in the interior of the pod 150, a compressive force is applied to the first hub 644 of the paddle 363 and the blades 638 bow outwards. Some paddles include a lock that prevent the paddle from returning to the undeployed configuration. In some paddles, the compressive force permanently deforms the blades 638 into the deployed position.

Figure 39:
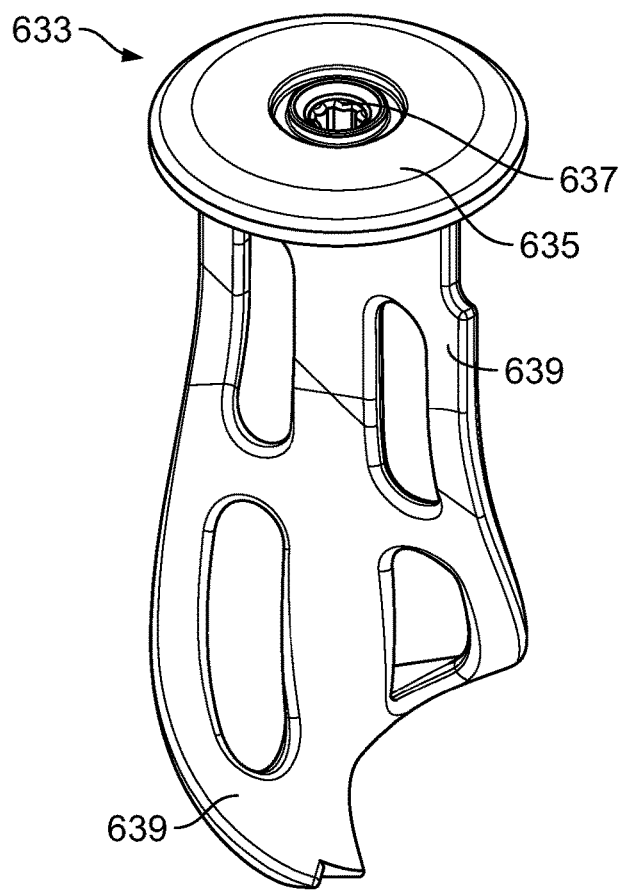
FIG. 39 is a perspective view of a mixing paddle.

FIG. 39 is a perspective view of a mixing paddle 633 with a head 635 that extends to sidewalls of the pod. The head 635 is disc-shaped and helps maintains the paddle 633 in concentric position with the pod. The paddle 633 is substantially similar to paddle 600 shown in FIG. 28I but has a female connection 637 rather than a male protrusion. A driveshaft of a machine receiving the pod is inserted into the female connection 637 during use. The head 635 rotates as blades 639 rotate to churn the contents of the pod. This configuration increases the likelihood that the driveshaft remains sterile and does not contact the contents of the pod.

Figure 40:
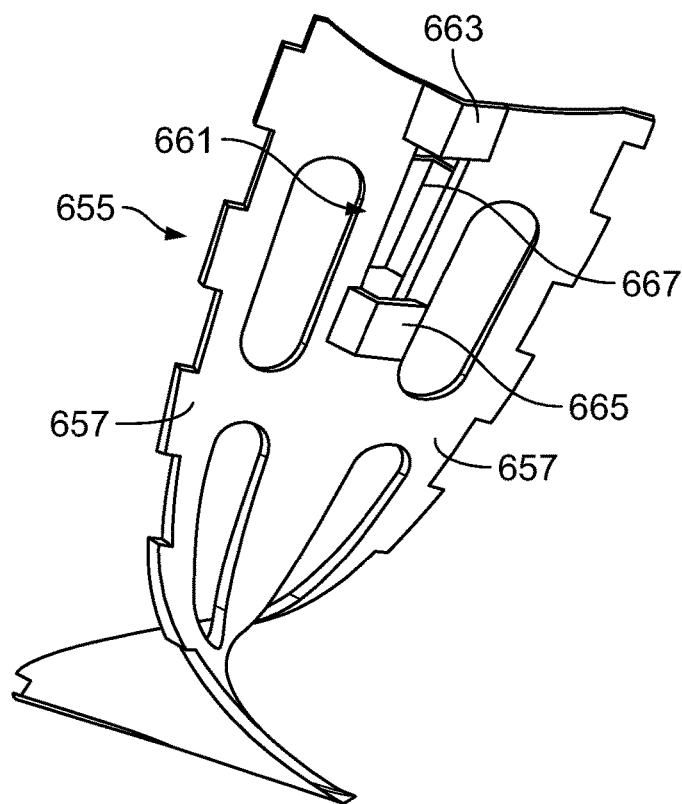
FIG. 40 is a perspective view of a mixing paddle.

FIG. 40 is a perspective view of a mixing paddle 655 that has two helical blades 657 that extend along the length of a central stem. The paddle 655 can be formed from a single piece of sheet metal. The central stem is a stamped recess 661 for receiving the drive shaft 126. The stamped recess 661 has an upper section 663 and a lower section 665 that are stamped in a first direction. The stamped recess also has a middle section 667 that is stamped in a second direction, opposite the first direction. The stamping approach can provide reduced manufacturing costs relative to welding-based approaches.

Figure 41:
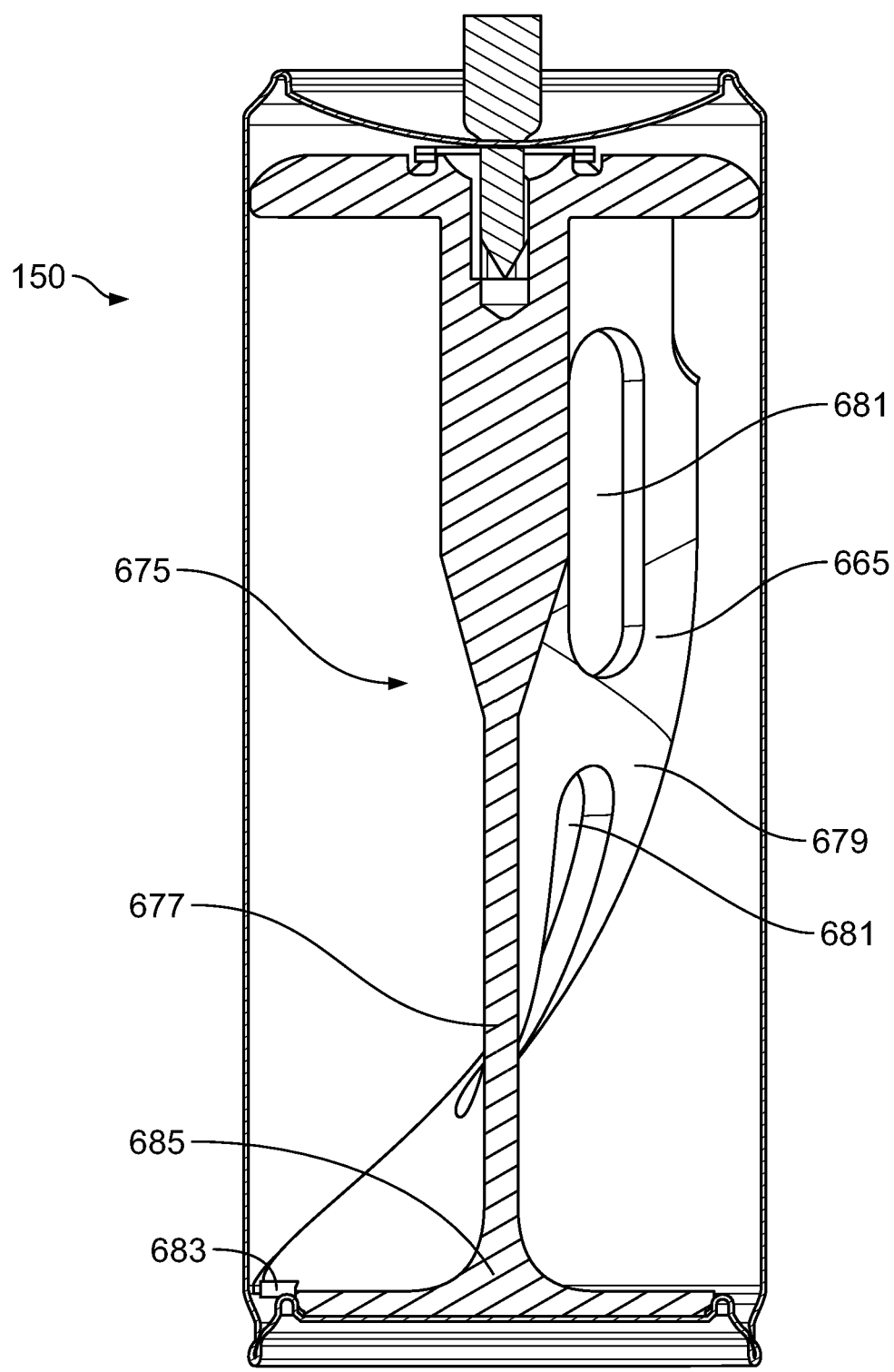
FIG. 41 is a perspective view of a mixing paddle in a pod.

FIG. 41 is a perspective view of a mixing paddle 675 in the pod 150. The paddle 675 has a central stem 677 and a blade 679 that extends from the stem 677. The blade 679 has openings 681 and a notch 683 at a dispensing end 685 of the blade 679. When the paddle 675 rotates to mix the contents of the pod 150, the notch 783 scoops the contents of the pod from the bottom and prevents the contents at the bottom of the pod 150 freezing into ice.

A custom "filling head" is used to mate with, or altogether avoid, the mixing paddles during the filling process. This approach allows the filling head to enter into the pod and dispense liquid contents into the pod without splash up. Additionally, to account for the additional volume required for the confectionery overrun, there is more "headspace" (i.e., open space) left at the top of the pod then with a traditionally filled can. The filling process is adapted for this additional headspace during pressurization process.

Figure 42A:
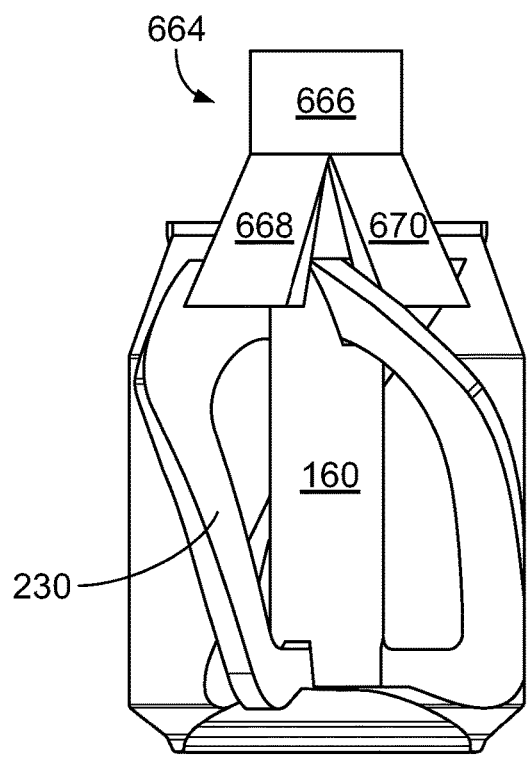
FIGS. 42A and 42B illustrate an approach to filling a pod.
Figure 42B:
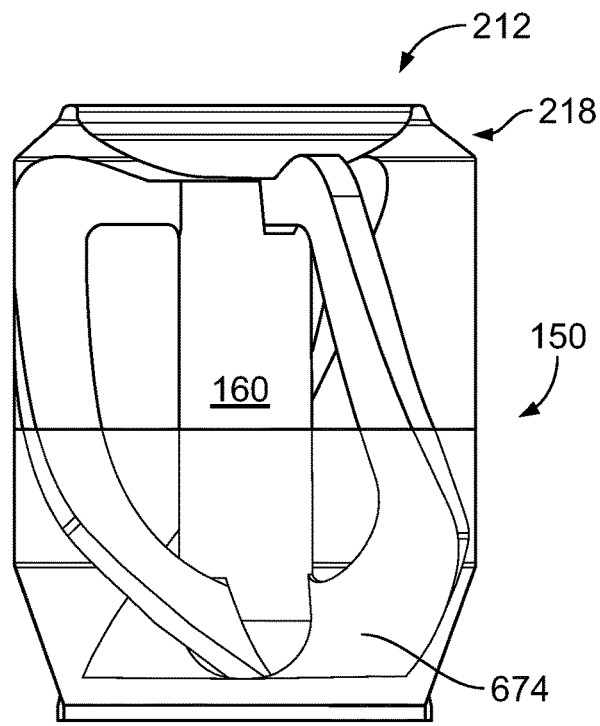

FIGS. 42A and 42B illustrate an approach to filling a pod 150 with ingredients. The manufacturing machinery 664 includes a spout 666 that has a first head 668, a second head 670, and a third head 672. The heads 668, 670, 672 are sized to fit between the blades 230 of the paddle. FIG. 36A shows the spout 666 engaged with the pod 150. The heads 668, 670, 672 flow liquid ingredients into the pod 150. The spout 666 is a reversed funnel that fills the pods without being inserted into the pod. Once the spout 666 is removed from the first neck 216 of the pod 150, the pod 150 closed. The pod 150 is sterilized with ingredients 674 in the interior of the pod 150. Some pods are filled using a counter pressure filling system using a hose.

Some pods can be recycled. For example, some pods have a fully removable can end. After the freezing cycle is complete, the user removes the pod from the machine, removes the entire can end (can end includes the sub-component exit port mechanism), removes the plastic mixing paddle from the pod, and separates the plastic and metal components for easy recyclability.

Figure 43A:
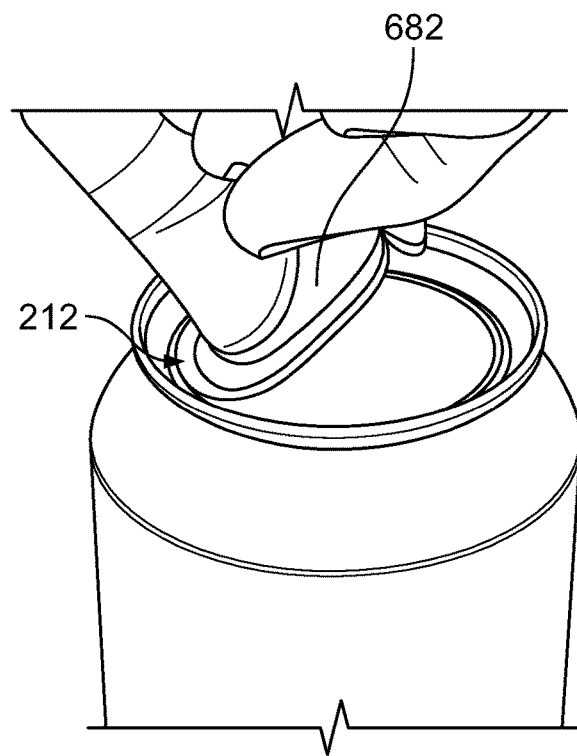
FIGS. 43A and 43B shows a pod with a removable internal paddle.
Figure 43B:
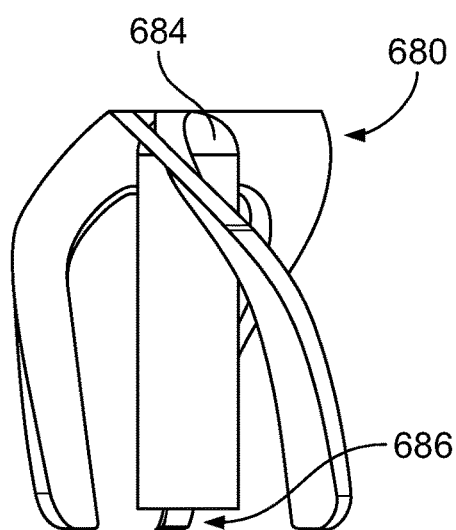
Figure 43B:
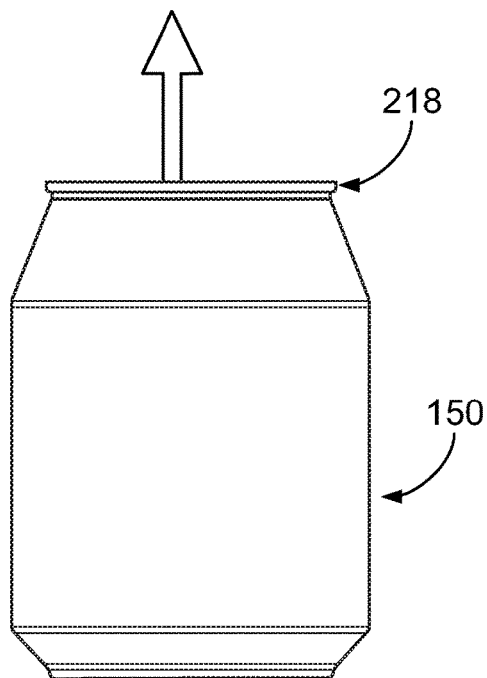

FIGS. 43A and 43B shows a pod with a removable internal paddle 680. The removable paddle 680 is substantially similar to the paddle 626 shown in FIG. 37A. However, the removable paddle 680 is removable from the pod 150. The user removes a lid 682 of the second end 212 of the pod 150. The lid 682 can be removed, for example by the techniques and configuration shown in FIGS. 43A and 43B. Opening the first end 210 of the pod 150 exposes the removable paddle 680. The user then grabs the paddle 680 by a first end 684 of the paddle 680. A second end 686 of the paddle 680 compresses to exit through the second neck 218. The paddle can be reused in a different pod or reused within the same pod.

Figure 44A:
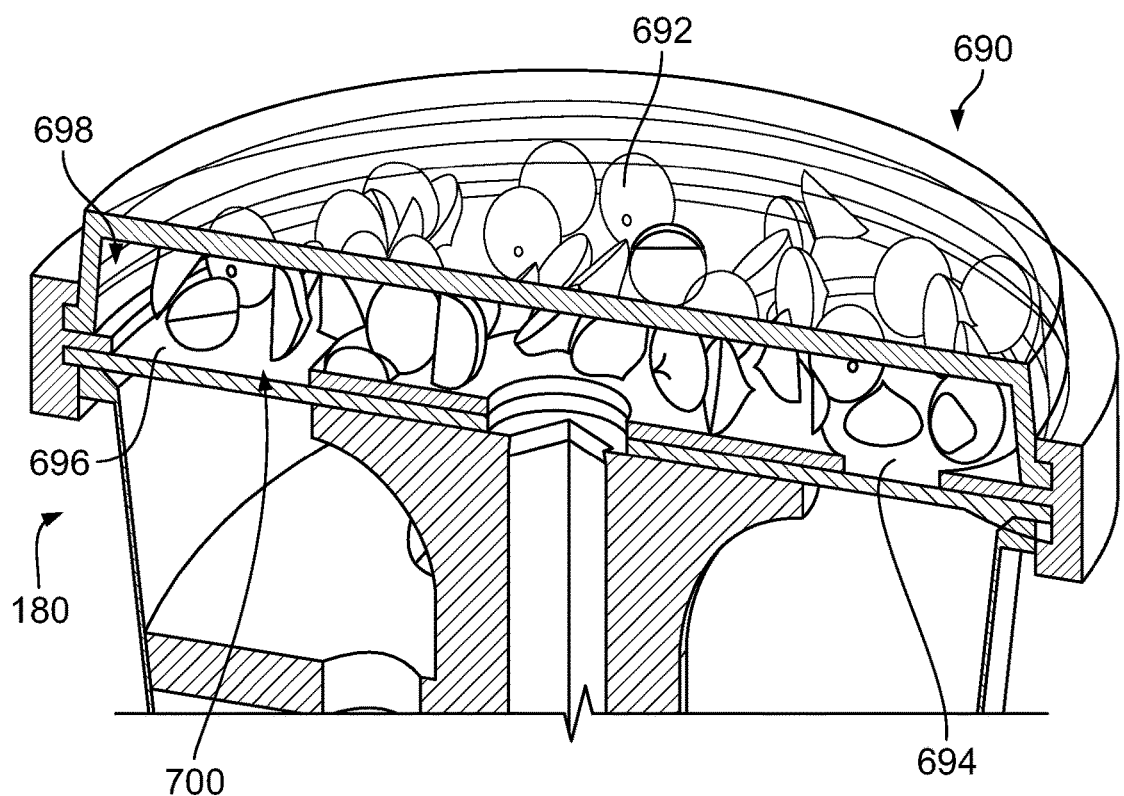
FIGS. 44A and 44B show a pod with an upper casing for storing toppings.
Figure 44B:
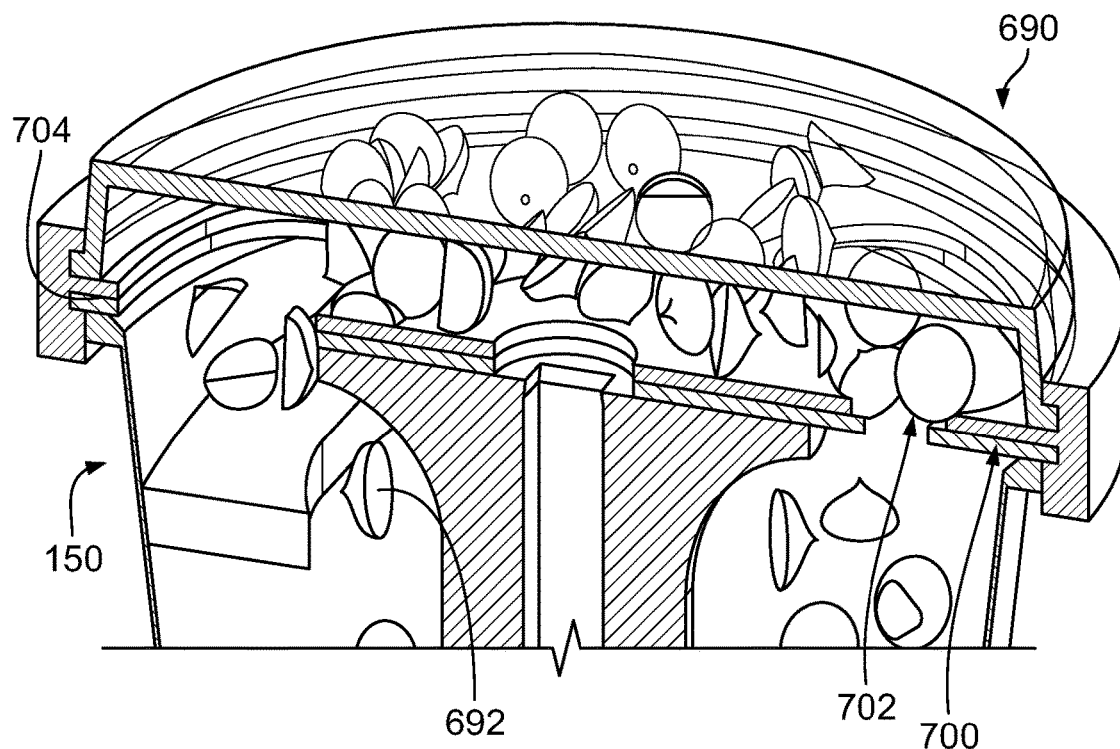

FIGS. 44A and 44B show a pod with an upper casing 690 for storing toppings 692. The upper casing 690 includes a first opening 694 and a second opening 696 that provides a conduit between the interior of the pod 150 and an interior 698 of the casing 690. A rotatable plate 700 covers the openings 694, 696 and prevents the toppings 692 from mixing with the contents of the pod 150. In the final stages of freezing, for example 10 second prior to dispensing, the plate 700 is rotated and a first aperture 702 of the plate 700 aligns with the first opening 694. A second aperture 704 of the plate 700 aligns with the second opening 696. The toppings 692 fall into and are mixed with the contents of the pod 150 and are dispensed with the contents of the pod 150. FIG. 38A shows chocolate chips as a topping. Some other toppings includes sprinkles, cookie crumps, syrups, jellies, fruit pieces, freeze dried fruit pieces, batters, creams, or small or crushed candies. The plate 700 can be coupled to the driveshaft extending from the lid such that the plate rotates to its open position when the driveshaft starts to rotate the mixing paddle.

Figure 45A:
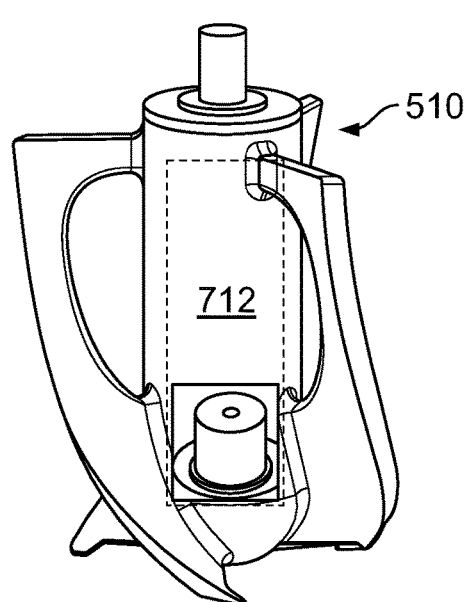
FIGS. 45A and 45B show a gas-releasing disk housed, respectively, in a paddle and in a pod.
Figure 45B:
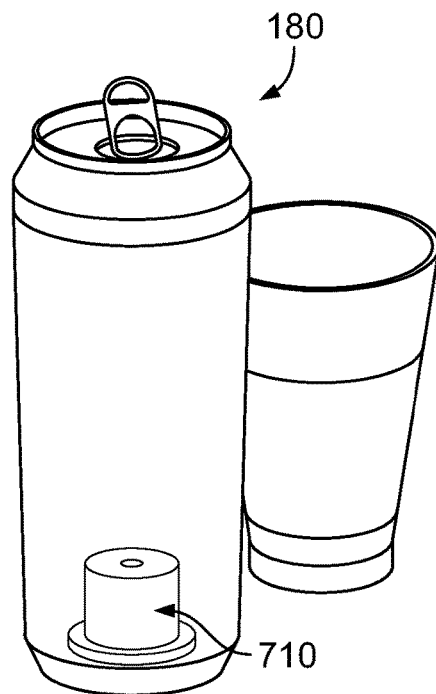

FIGS. 45A and 45B show a gas-releasing disk 710 housed, respectively, in a paddle and in a pod. FIG. 45A shows the paddle 510 of FIG. 28A having a hollow central stem 712. The central stem 712 is made of a gas permeable material. The gas-releasing disk 710 releases gas when the pod 150 is opened. Opening the pod 150 releases pressurized gas initially stored in the pod 150. Depressurizing the pod 150 generates a pressure difference. The gas from the gas-releasing disk 710 flows out of the disk and into the contents of the pod 150 due to the pressure difference. FIG. 45B shows a pod 150 the gas-releasing disk 710 disposed at the first end 210 of the pod 150.

In both configurations, the gas-releasing disk 710 slowly releases a gas into the ingredients of the pod 150 while the paddle 510 rotates and the evaporator 108 chills the ingredients. Slowly releasing gas into the ingredients while freezing creates a beverage or food product with velvety, lofty, smooth texture with desirable overrun. The gas-releasing disk 710 may release nitrogen, nitrous oxide, carbon dioxide, argon, or a combination of these gases.

In some machines, nitrogen, nitrous oxide, argon or a combination of these gases are pumped into the pod via the drive shaft and/or mixing paddle during the refrigeration process. A portion of this gas (e.g., nitrogen) may be diverted to refrigeration system of the machine (e.g., the evaporator) to for chilling and/or freezing purposes.

Figure 46A:
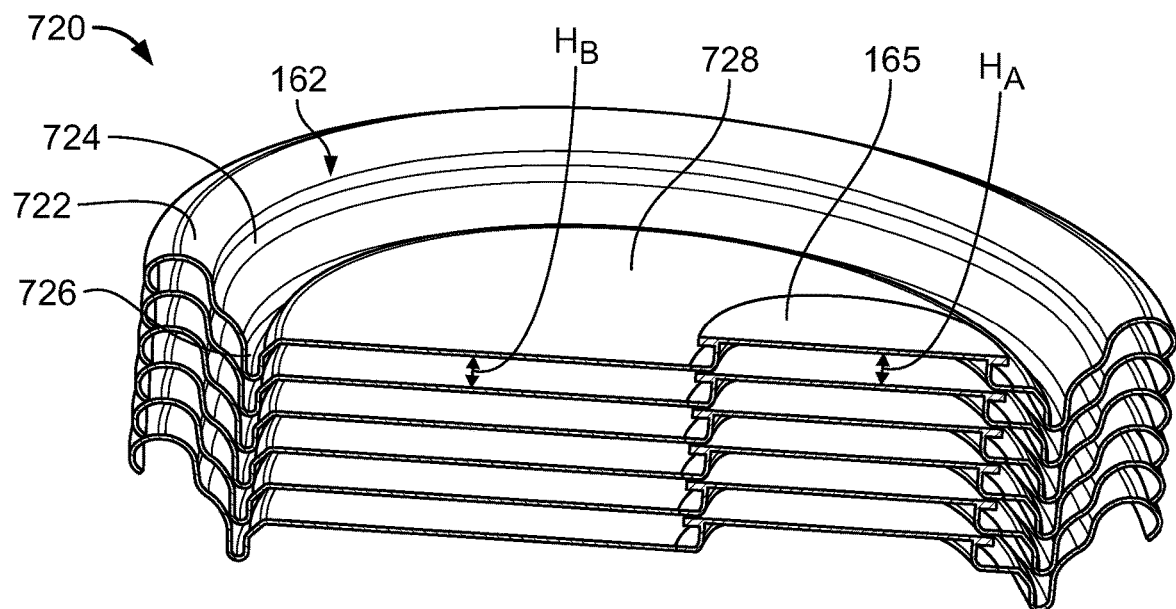
FIGS. 46A, 46B, and 46C are, respectively, a perspective cutaway view, a side view, and an exploded view of a stack of bases.
Figure 46B:
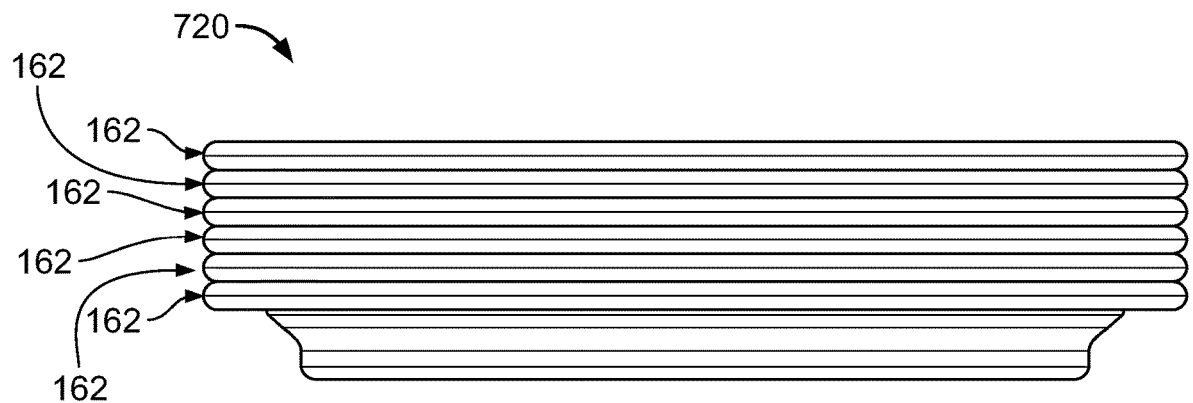
Figure 46C:
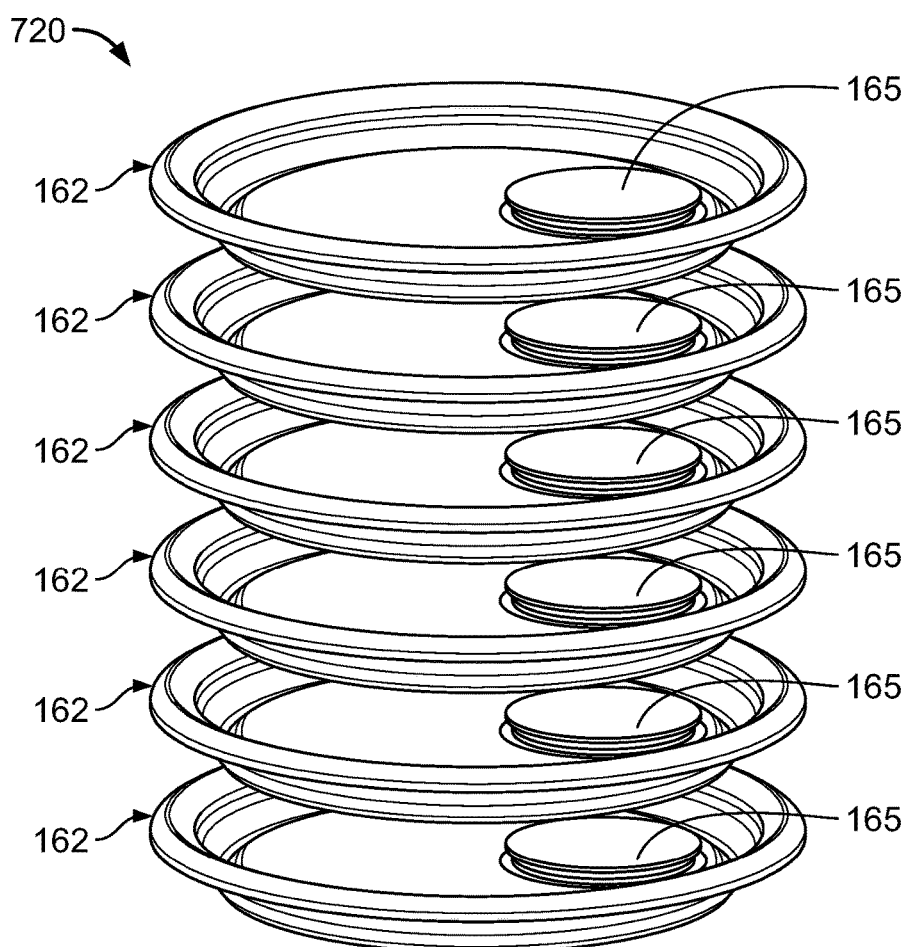

FIGS. 46A, 46B, and 46C are, respectively, a perspective cutaway view, a side view, and an exploded view of a stack 720 of bases 162 during manufacturing. The base 162 is previously described with reference to FIG. 8. The base 162 includes an outer shelf 722, an inner shelf 724, a circumferential valley 726, the protrusion 165, and a flat area 728. The base 162 is proportioned so that when stacking, the outer shelf 722 of a base 162 abuts the outer shelf 722 of a different base 162 and the inner shelf 724 of the base 162 abuts the inner shelf 724 of another base 162. The protrusion 165 is a height $H_A$ from the flat portion 128. $H_B$ is the height between the flat area 728 of a base 162 and the flat are 128 of another base 162 stacked on the initial base 162. The height $H_A$ is equal to or smaller than the height $H_B$. This configuration help prevent the stack 720 of bases 162 from leaning or tilting during manufacturing. The stack of bases 162 are used in a manufacturing line to close the open ends of can bodies after the can bodies have been filled.

The pods and accompanied components described in this specification may be made to be either single-use disposable system or reusable systems.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A machine for reducing the temperature of ingredients in a pod comprising a protrusion extending outward relative to adjacent portions of a base of the pod, the protrusion of the pod having a stem that extends between a head and a foot, the stem having a smaller cross-section than the head and the foot, the base comprising a weakened section extending around the protrusion of the pod, the machine comprising:
 a refrigeration system comprising:
  an evaporator defining a receptacle sized to receive the pod;
  a compressor; and
  a condenser; and
 a dispenser configured to apply a force to the protrusion of the pod in the receptacle of the evaporator to remove the protrusion.

2. The machine according to claim 1, further comprising a motor mechanically connected to the dispenser, the motor operable to rotate at least a part of the dispenser.

3. The machine according to claim 1, wherein the dispenser is arranged at a floor of a pod machine interface.

4. The machine according to claim 1, wherein a cap comprises a cutting knife aligned with the stem of the protrusion to separate the protrusion from the base when the cap is rotated by the dispenser.

5. The machine according to claim 1, wherein the dispenser is sized and positioned to engage and lift the protrusion of the base to break the weakened section and separate the protrusion from the adjacent portions of the base when the dispenser engages the pod.

6. The machine according to claim 1, wherein the pod comprises a cutting knife aligned with the stem of the protrusion to separate the protrusion from the base when the dispenser engages the pod.

7. The machine according to claim 1, wherein the dispenser applies an axial force to the protrusion of the pod when a motor rotates the dispenser.

8. The machine according to claim 7, wherein the force is between 5 pounds and 75 pounds.

9. The machine according to claim 1, wherein a cap has a ramp adjacent an opening extending through the cap, the ramp sized and positioned to lift the protrusion and break the weakened section to separate the protrusion from the adjacent portions of the base when the cap is rotated by the dispenser.

10. The machine according to claim 9, wherein the cap is mounted on the pod.

11. The machine according to claim 10, wherein the dispenser engages the cap.

12. The machine according to claim 1, wherein the dispenser comprises an engagement surface for mechanically engaging the pod.

13. The machine according to claim 12, wherein the dispenser comprises a flat gear parallel the base of the pod, and teeth of the gear are the engagement surface.

14. The machine according to claim 12, wherein the dispenser comprises a gear wheel set at an angle to the base of the pod, and teeth of the gear wheel are the engagement surface.

15. The machine according to claim 12, wherein the dispenser comprises a worm gear in toothed engagement with a gear wheel.

16. The machine according to claim 15, wherein the protrusion of the pod is a first d wherein the gear wheel has an annular member and second protrusions that extend from the annular member.

17. The machine according to claim 16, wherein the second protrusions are the engagement surface of the dispenser.

18. The machine according to claim 16, wherein the second protrusions are dowel-shaped protrusions.

19. A machine for reducing the temperature of ingredients in a pod containing the ingredients and a mixing paddle, the machine comprising:
- an evaporator of a refrigeration system, the evaporator defining a receptacle sized to receive the pod;
- a dispenser configured to engage with the pod in the receptacle and operable to open the pod; and
- a motor mechanically connected to the dispenser, the motor mechanically connected to the dispenser to operate the dispenser to open the pod;
- wherein the dispenser applies a force to a protrusion on the pod in the receptacle to open the pod.

20. The machine according to claim 19, wherein a base of the pod includes the protrusion which extends outward relative to adjacent portions of the base.

21. The machine according to claim 20, wherein the base of the pod comprises a weakened section extending around the protrusion.

22. The machine according to claim 20, the protrusion has a stem that extends between a head and a foot, the stem having a smaller cross-section than the head and the foot, the base comprising a weakened section extending around the protrusion.

23. The machine according to claim 22, wherein a cap comprises a cutting knife aligned with the stem of the protrusion to separate the protrusion from the base when the cap is rotated by the dispenser.

24. The machine according to claim 22, wherein the dispenser is sized and positioned to engage and lift the protrusion of the base to break the weakened section and separate the protrusion from the adjacent portions of the base when the dispenser engages the pod.

25. The machine according to claim 22, wherein the pod comprises a cutting knife aligned with the stem of the protrusion to separate the protrusion from the base when the dispenser engages the pod.

26. The machine according to claim 22, wherein a cap has a ramp adjacent an opening extending through the cap, the ramp sized and positioned to lift the protrusion and break the weakened section to separate the protrusion from the adjacent portions of the base when the cap is rotated by the dispenser.

27. The machine according to claim 26, wherein the cap is mounted on the pod.

28. The machine according to claim 26, wherein the dispenser engages the cap.

29. A machine for reducing the temperature of ingredients in a pod containing the ingredients, the machine comprising:
- an evaporator of a refrigeration system, the evaporator defining a receptacle sized to receive the pod;
- a dispenser configured to engage with the pod in the receptacle and operable to open the pod; and
- a motor mechanically connected to the dispenser, the motor mechanically connected to the dispenser to operate the dispenser to open the pod;
- wherein the dispenser applies a force to a protrusion on the pod in the receptacle to open the pod.

30. The machine according to claim 29, wherein the dispenser comprises an engagement surface for mechanically engaging the pod.

31. The machine according to claim 29, wherein the dispenser is arranged at a floor of a pod machine interface.

32. The machine according to claim 29, wherein a cap comprises a cutting knife aligned with a stem of the protrusion to separate the protrusion from a base of the protrusion when the cap is rotated by the dispenser.

33. The machine according to claim 29, wherein the dispenser is sized and positioned to engage and lift the protrusion from a base to break a weakened section around the protrusion and separate the protrusion from adjacent portions of the base when the dispenser engages the pod.

34. The machine according to claim 29, wherein the dispenser applies an axial force to the protrusion of the pod when a motor rotates the dispenser.

35. The machine according to claim 34, wherein the force is between 5 pounds and 75 pounds.

36. The machine according to claim 29, wherein a cap has a ramp adjacent an opening extending through the cap, the ramp sized and positioned to lift the protrusion and break a weakened section around a base of the protrusion to separate the protrusion from adjacent portions of the base when the cap is rotated by the dispenser.

37. The machine according to claim 36, wherein the cap is mounted on the pod.

38. The machine according to claim 36, wherein the dispenser engages the cap.

* * * * *